United States Patent
An et al.

(10) Patent No.: US 9,848,230 B2
(45) Date of Patent: Dec. 19, 2017

(54) VIDEO DISPLAY APPARATUS AND OPERATING METHOD THEREOF

(71) Applicant: LG ELECTRONICS INC., Seoul (KR)

(72) Inventors: Seungjoo An, Seoul (KR); Sejin Oh, Seoul (KR); Kyoungsoo Moon, Seoul (KR); Jinwon Lee, Seoul (KR); Jinpil Kim, Seoul (KR); Donghyun Kang, Seoul (KR); Jang Hun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 14/362,832

(22) PCT Filed: Feb. 19, 2014

(86) PCT No.: PCT/KR2014/001354
§ 371 (c)(1),
(2) Date: Jun. 4, 2014

(87) PCT Pub. No.: WO2014/129803
PCT Pub. Date: Aug. 24, 2014

(65) Prior Publication Data
US 2015/0222949 A1   Aug. 6, 2015

Related U.S. Application Data

(60) Provisional application No. 61/767,256, filed on Feb. 21, 2013.

(51) Int. Cl.
H04N 21/435 (2011.01)
H04N 21/439 (2011.01)
(Continued)

(52) U.S. Cl.
CPC ......... *H04N 21/435* (2013.01); *H04N 21/233* (2013.01); *H04N 21/23418* (2013.01);
(Continued)

(58) Field of Classification Search
CPC ........ H04H 60/37; H04H 60/56; H04H 60/59; H04N 21/44008; H04N 21/8532;
(Continued)

(56) References Cited

U.S. PATENT DOCUMENTS

2005/0108755 A1   5/2005   Nishikawa et al.
2006/0012709 A1*  1/2006   Yamada .................. H04N 5/04
                                                    348/515
(Continued)

FOREIGN PATENT DOCUMENTS

CA   2 814 196 A1   5/2012
EP   2 472 891 A1   7/2012
(Continued)

*Primary Examiner* — Junior Mendoza
*Assistant Examiner* — Anthony Bantamoi
(74) *Attorney, Agent, or Firm* — Birch, Stewart, Kolasch & Birch, LLP

(57) ABSTRACT

A video display device is provided. A receiving unit obtains an uncompressed audio and video content. A display unit displays the uncompressed audio and video content. A content recognition configuration management unit extracts a first characteristic information corresponding to a first characteristic information type from the uncompressed audio and video content, receives a first response to a first query which includes the first characteristic information, determines a second characteristic information type based on the first response, extracts a second characteristic information corresponding to the second characteristic information type from the uncompressed audio and video content, and receives a second response to a second query which includes the second characteristic information.

8 Claims, 35 Drawing Sheets

(51) Int. Cl.

| | | |
|---|---|---|
| *H04N 21/44* | (2011.01) | |
| *H04N 21/47* | (2011.01) | |
| *H04N 21/658* | (2011.01) | |
| *H04N 21/8352* | (2011.01) | |
| *H04N 21/8358* | (2011.01) | |
| *H04N 21/233* | (2011.01) | |
| *H04N 21/234* | (2011.01) | |
| *H04N 21/25* | (2011.01) | |
| *H04N 21/254* | (2011.01) | |
| *H04N 21/2665* | (2011.01) | |
| *H04N 21/431* | (2011.01) | |
| *H04N 21/466* | (2011.01) | |
| *H04N 21/478* | (2011.01) | |
| *H04N 21/81* | (2011.01) | |

(52) U.S. Cl.
CPC ......... *H04N 21/251* (2013.01); *H04N 21/254* (2013.01); *H04N 21/2665* (2013.01); *H04N 21/431* (2013.01); *H04N 21/4394* (2013.01); *H04N 21/44008* (2013.01); *H04N 21/4668* (2013.01); *H04N 21/47* (2013.01); *H04N 21/478* (2013.01); *H04N 21/6582* (2013.01); *H04N 21/8133* (2013.01); *H04N 21/8352* (2013.01); *H04N 21/8358* (2013.01)

(58) Field of Classification Search
CPC ............ H04N 21/233; H04N 21/2335; H04N 21/234; H04N 21/23406; H04N 21/2343; H04N 21/234309; H04N 21/234318; H04N 21/234327; H04N 21/234336; H04N 21/234345; H04N 21/234354; H04N 21/234363; H04N 21/234372; H04N 21/234381; H04N 21/4307; H04N 21/4341; H04N 5/08; H04N 19/142; H04N 21/44; H04N 21/44012; H04N 21/47217; H04N 5/144; H04N 5/147; G11B 27/00; G11B 27/002; G11B 27/10; G11B 27/11; G11B 27/327; G11B 27/328; G11B 27/329
See application file for complete search history.

(56) References Cited

U.S. PATENT DOCUMENTS

| | | |
|---|---|---|
| 2006/0041926 A1 | 2/2006 | Istvan et al. |
| 2010/0158488 A1 | 6/2010 | Roberts et al. |
| 2011/0211812 A1 | 9/2011 | Tzoukermann et al. |
| 2012/0117584 A1* | 5/2012 | Gordon ............... H04N 21/254 725/19 |
| 2012/0315014 A1* | 12/2012 | Shuster ............ G06F 17/30817 386/241 |
| 2013/0145414 A1 | 6/2013 | Yamagishi |
| 2013/0170813 A1* | 7/2013 | Woods ................. H04N 5/765 386/200 |
| 2013/0198768 A1 | 8/2013 | Kitazato |
| 2013/0205315 A1 | 8/2013 | Sinha et al. |

FOREIGN PATENT DOCUMENTS

| | | |
|---|---|---|
| EP | 2 645 730 A2 | 10/2013 |
| EP | 2 645 731 A2 | 10/2013 |
| EP | 2 645 732 A2 | 10/2013 |
| KR | 10-2011-0049280 A | 5/2011 |
| WO | WO 2010/137823 A2 | 12/2010 |
| WO | WO 2012/070901 A2 | 5/2012 |
| WO | WO 2012/070902 A2 | 5/2012 |
| WO | WO 2012/070903 A2 | 5/2012 |
| WO | WO 2013/021824 A1 | 2/2013 |

* cited by examiner

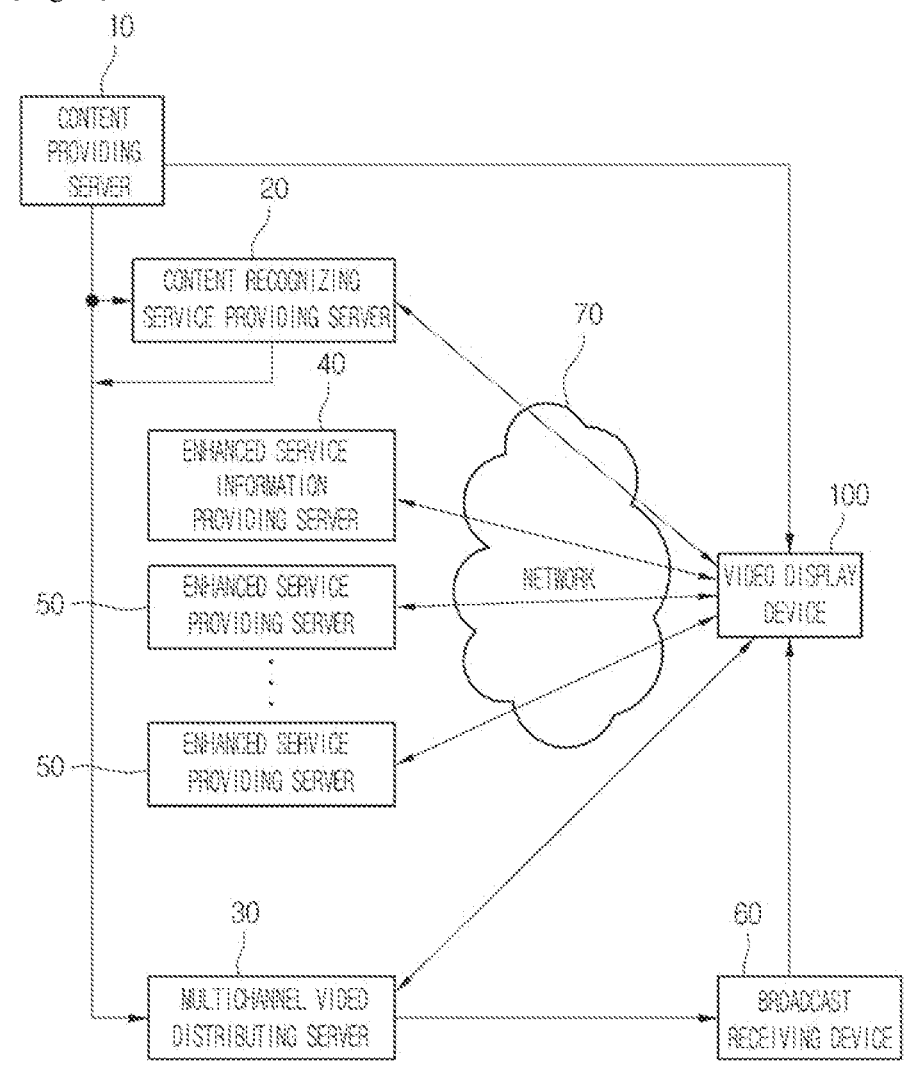
[Fig. 1]

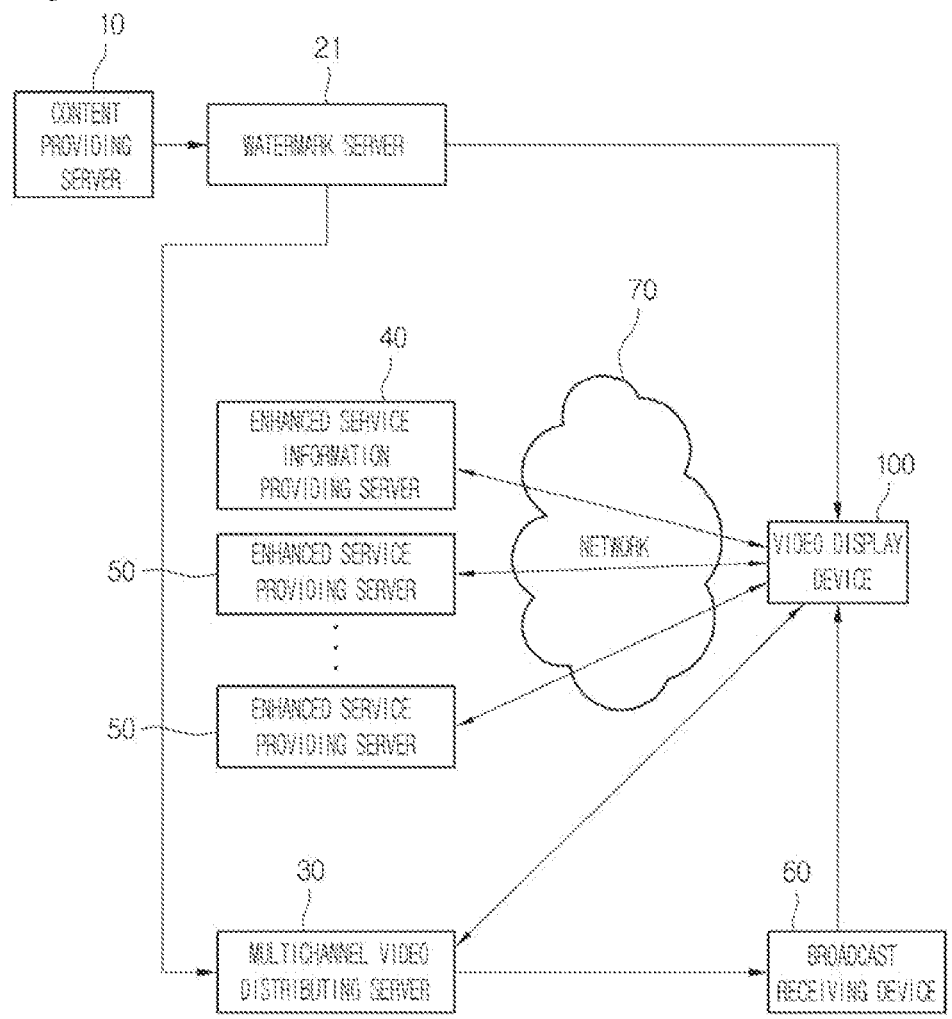
[Fig. 2]

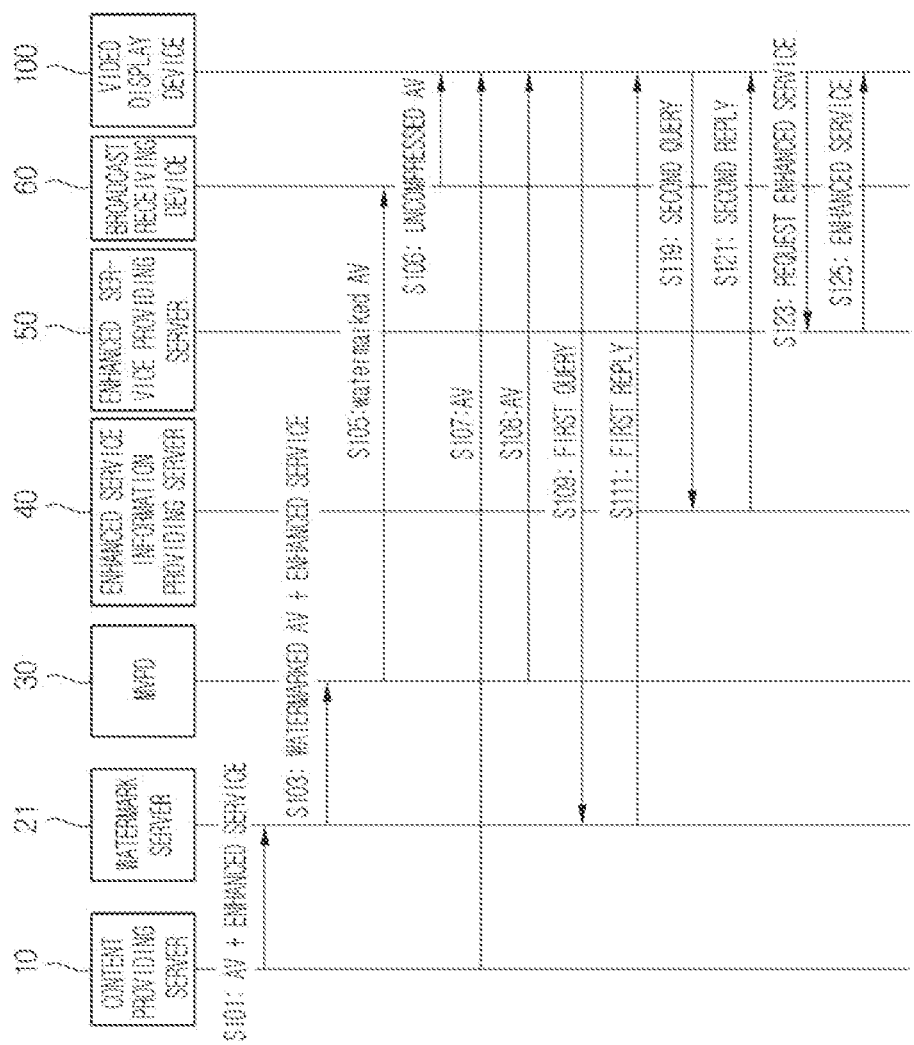
[Fig. 3]

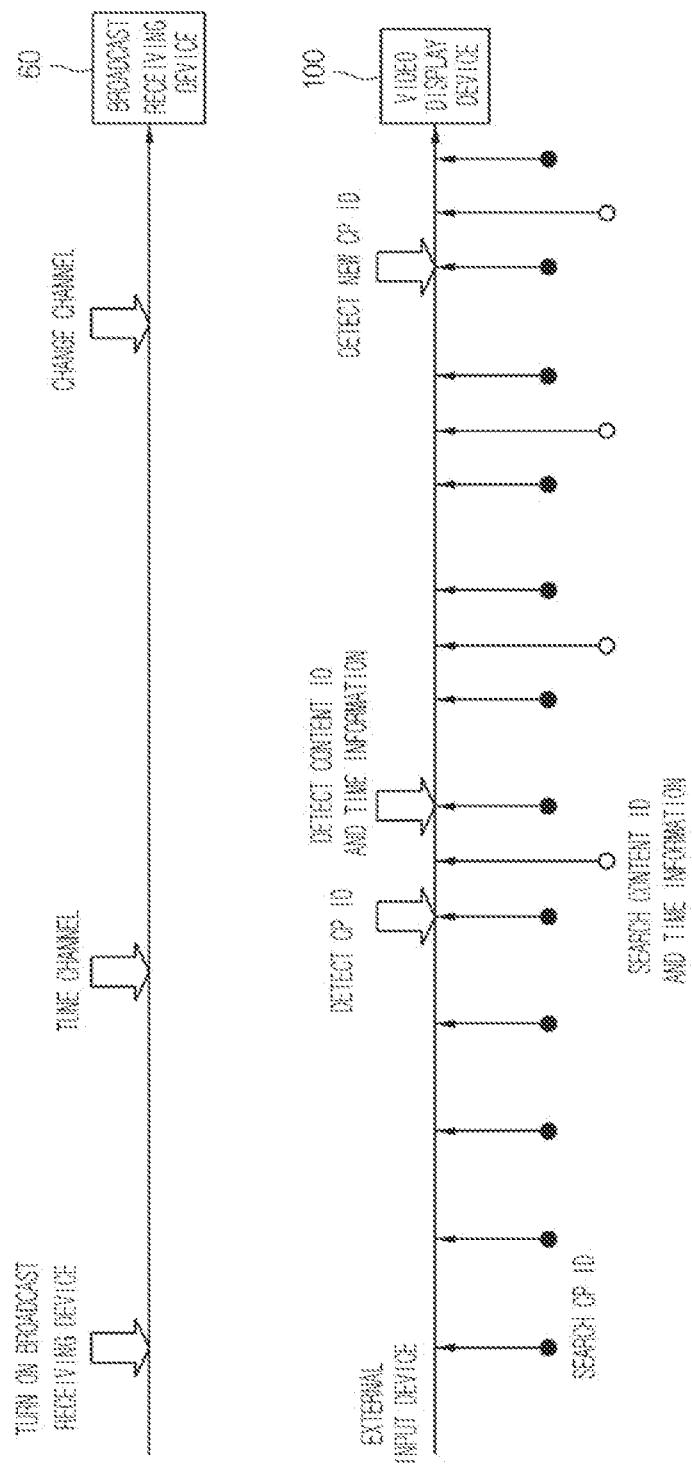

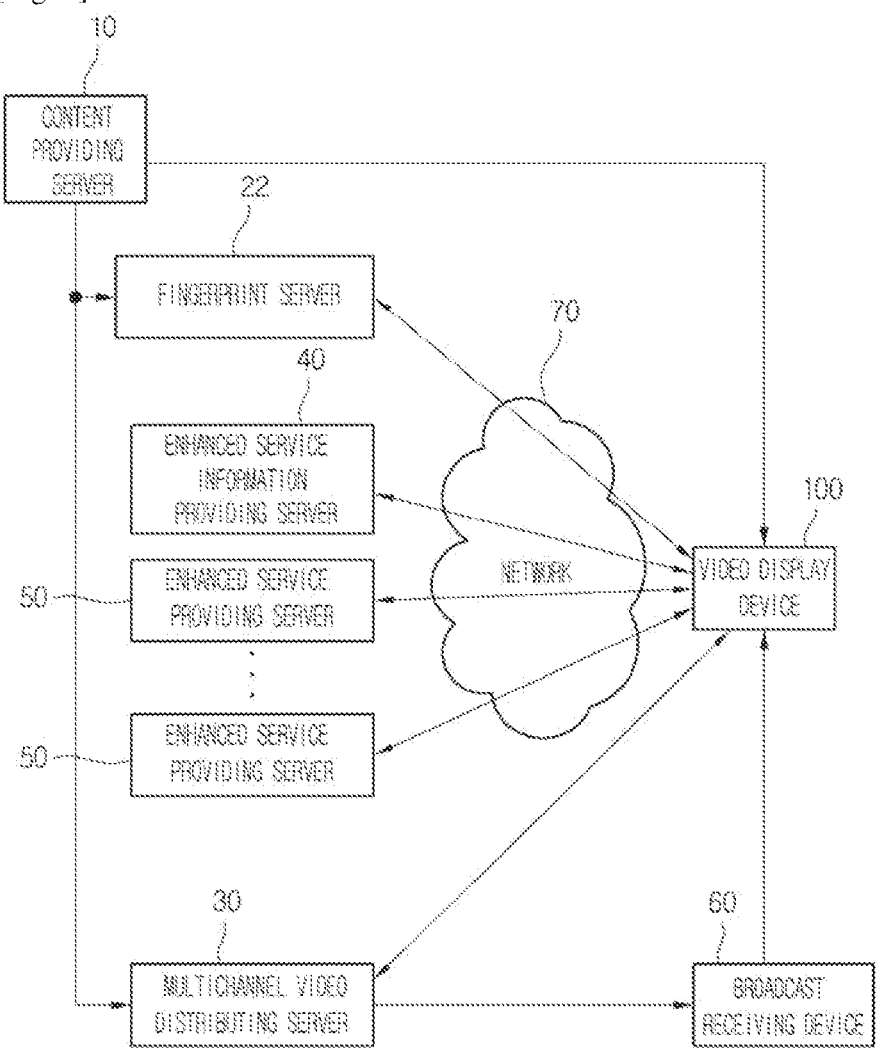
[Fig. 5]

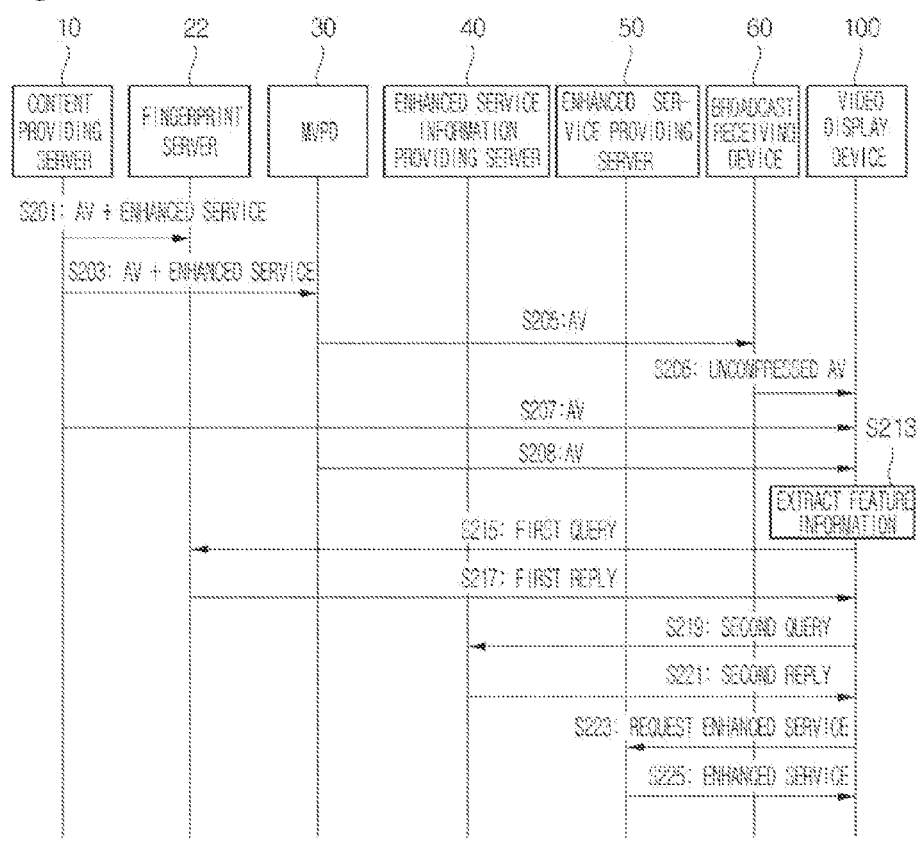
[Fig. 6]

[Fig. 7]
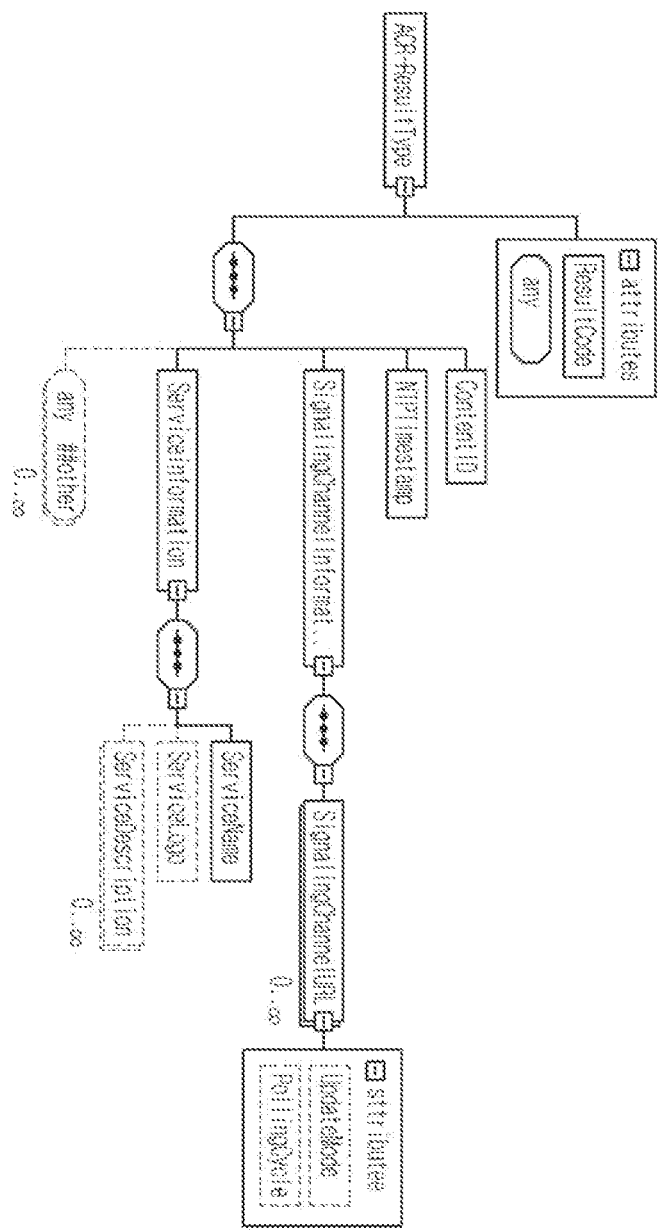

[Fig. 8]
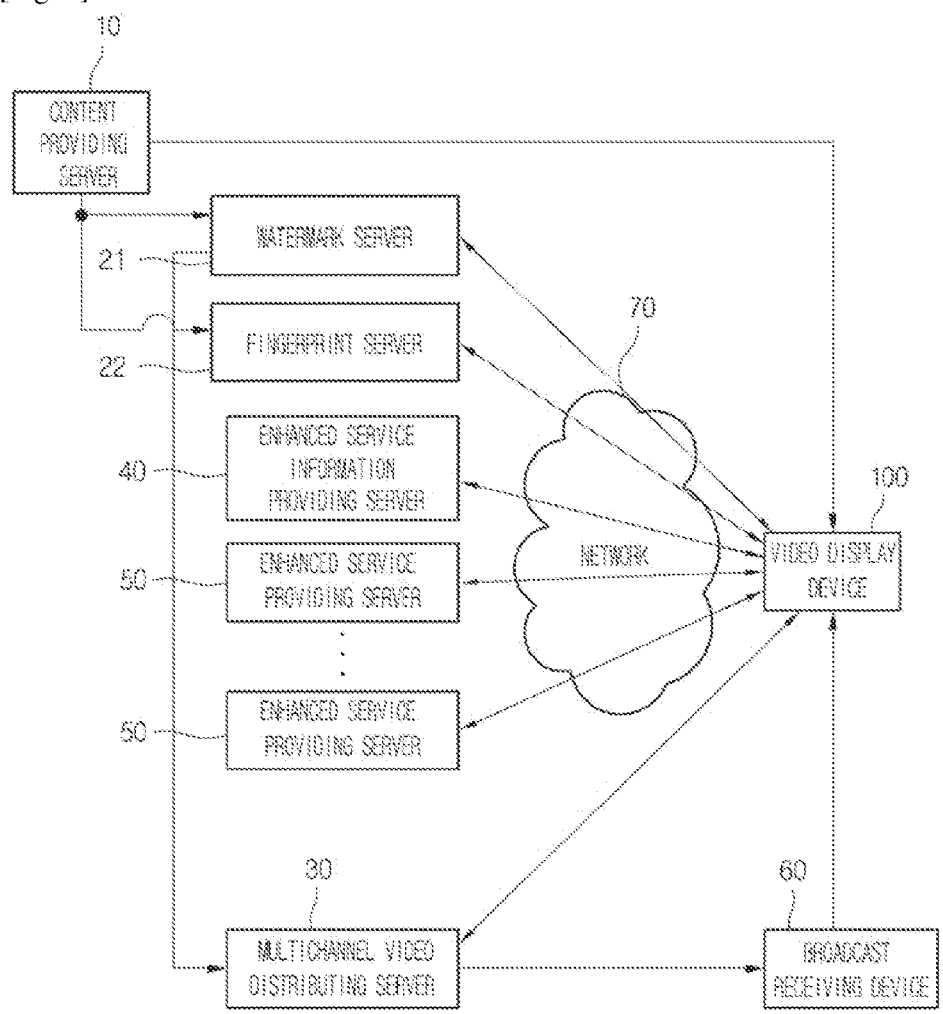

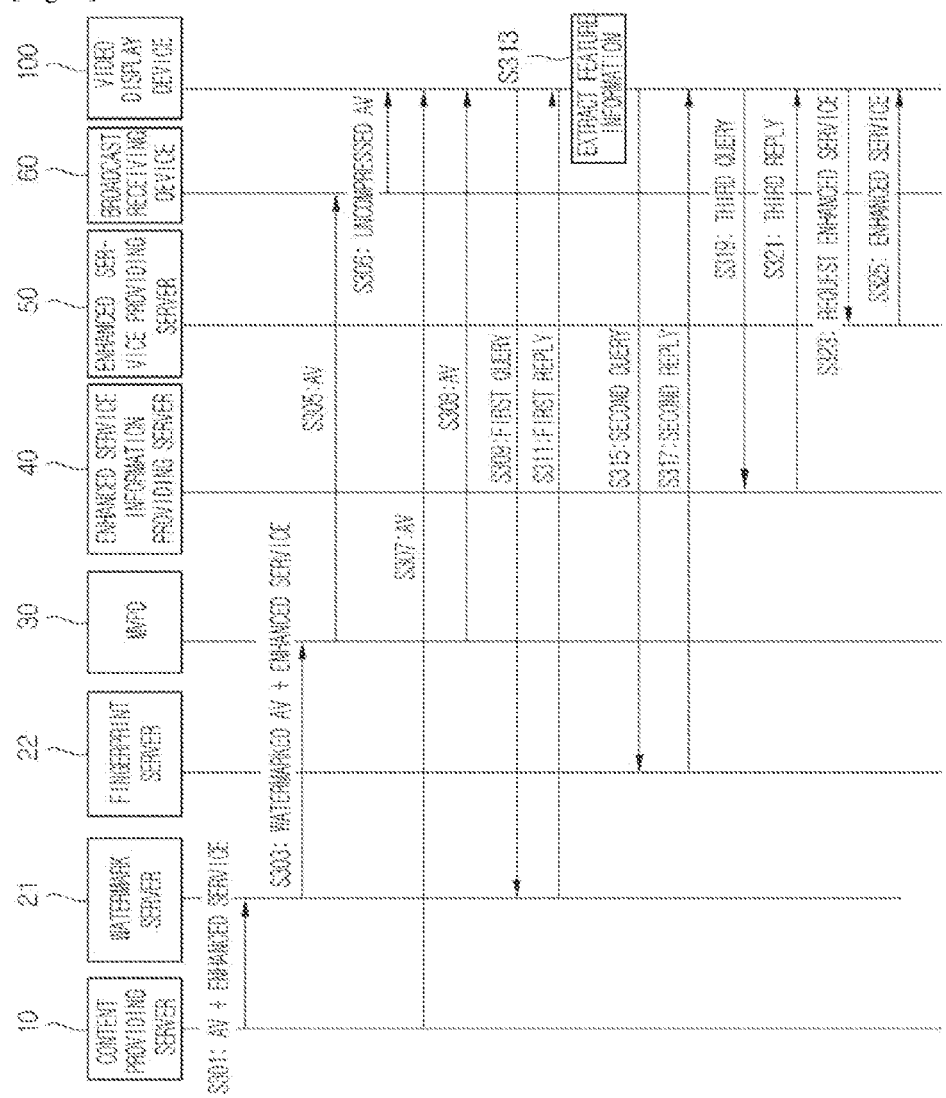
[Fig. 9]

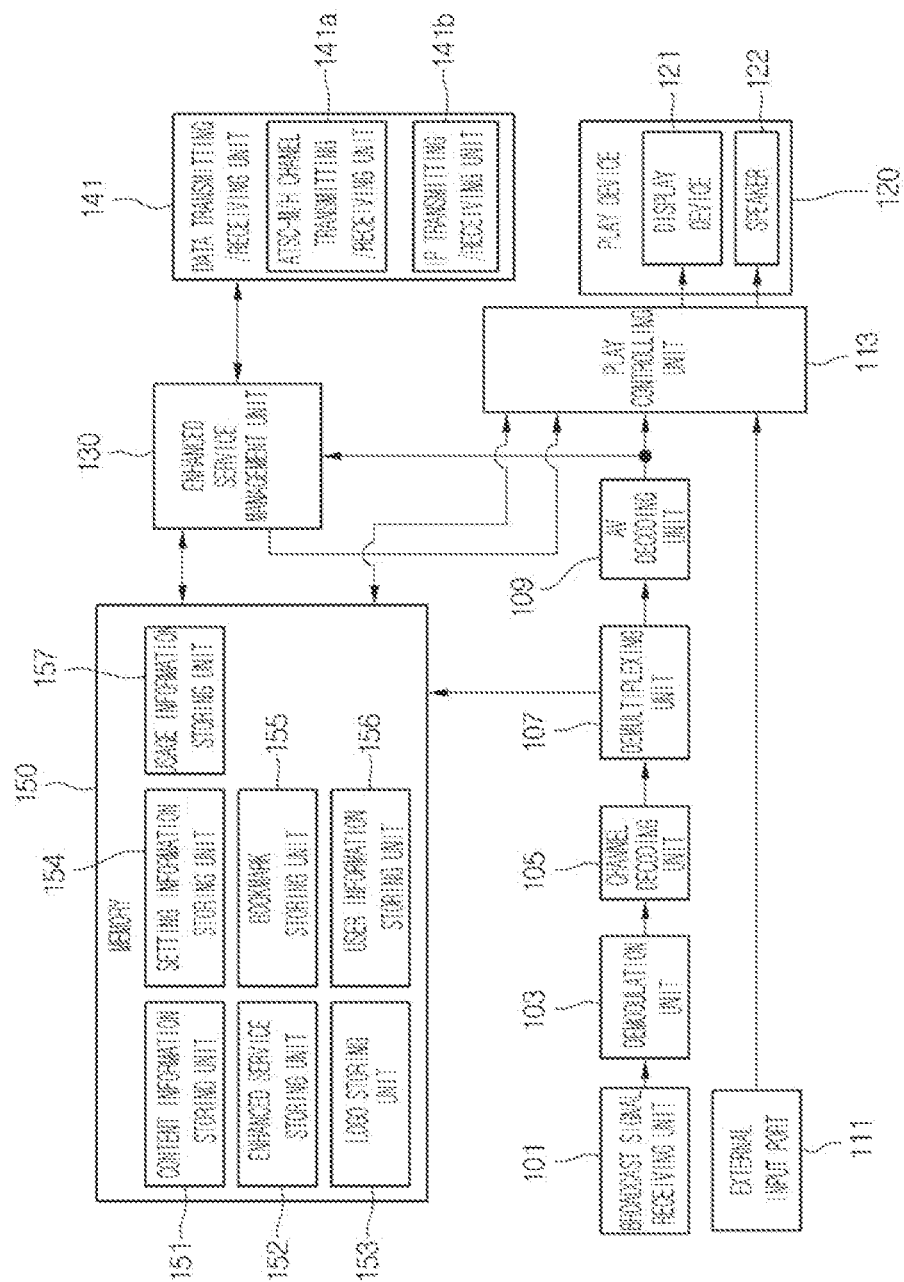
[Fig. 10]

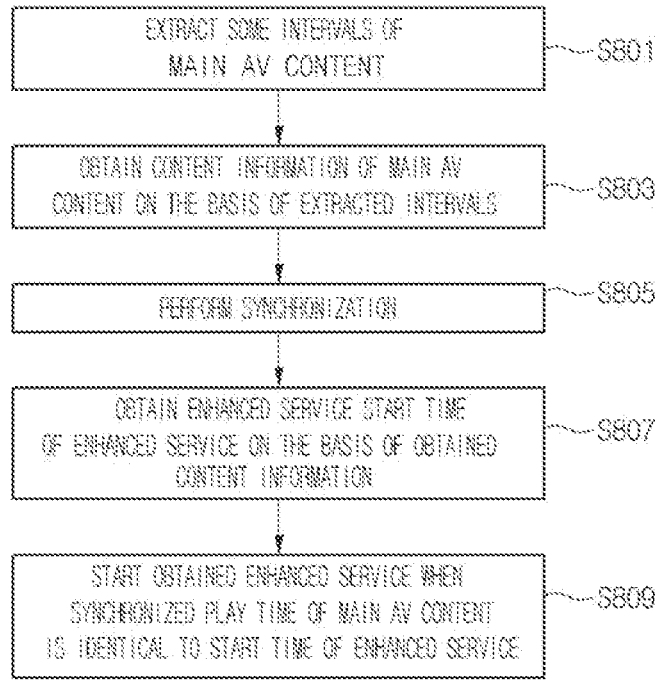
[Fig. 11]
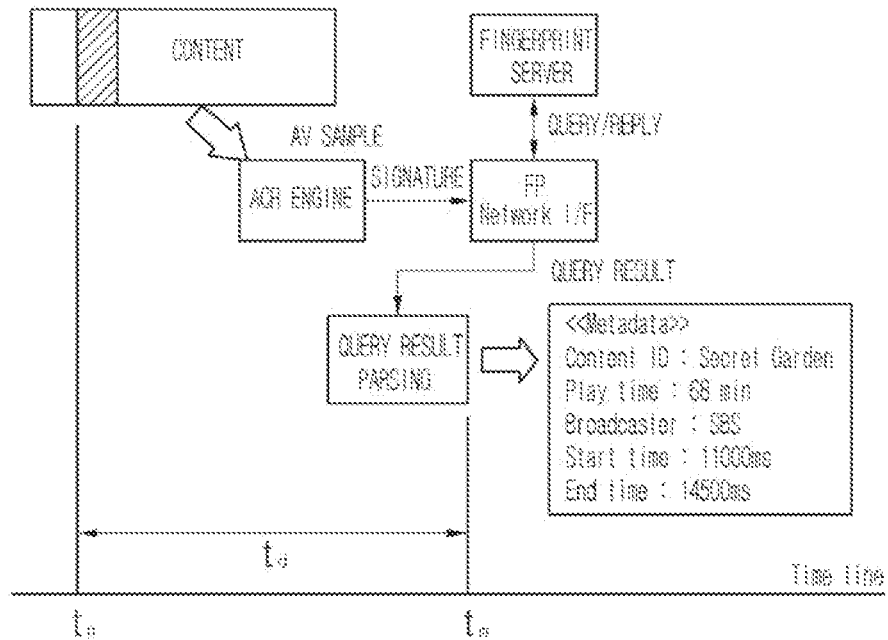
[Fig. 12]

[Fig. 13]
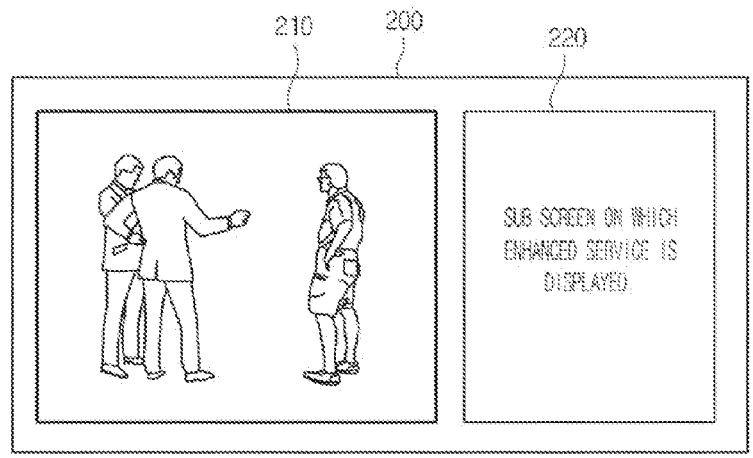
[Fig. 14]
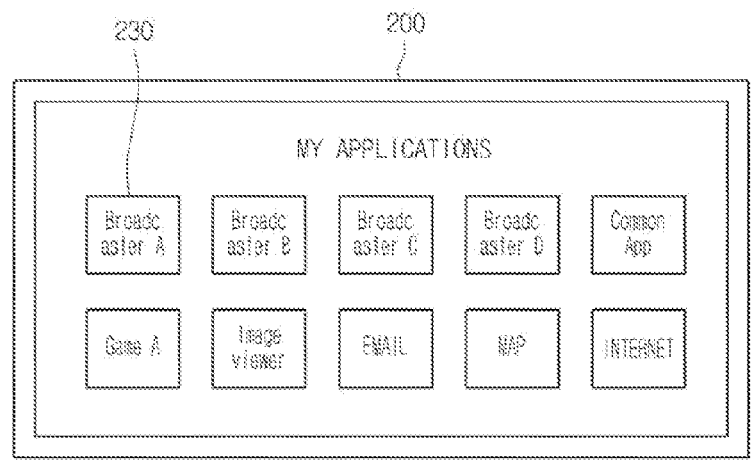
(A)
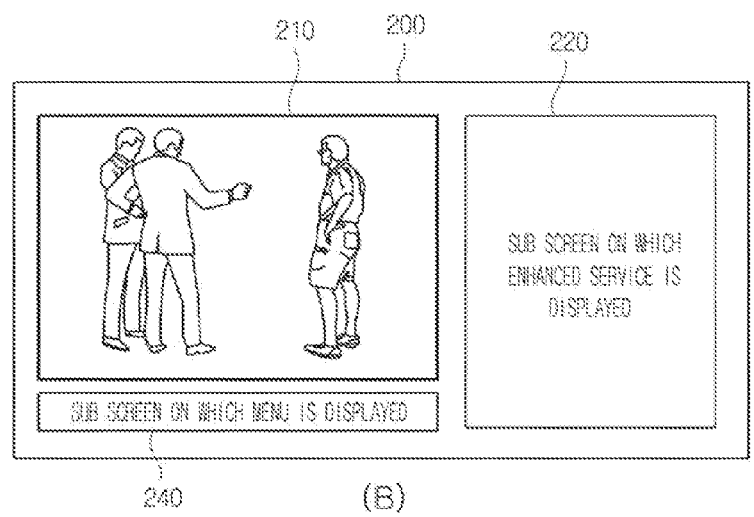
(B)

[Fig. 15]
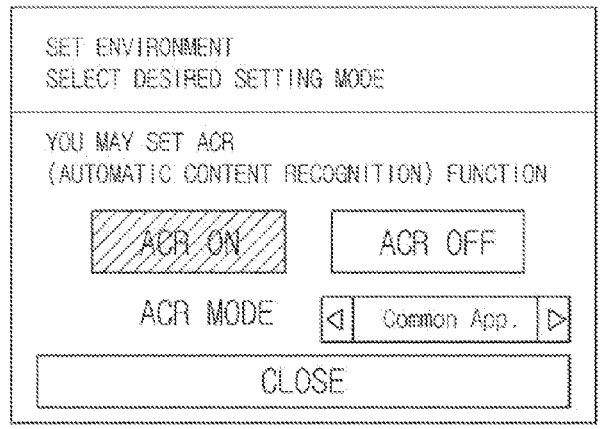
[Fig. 16]
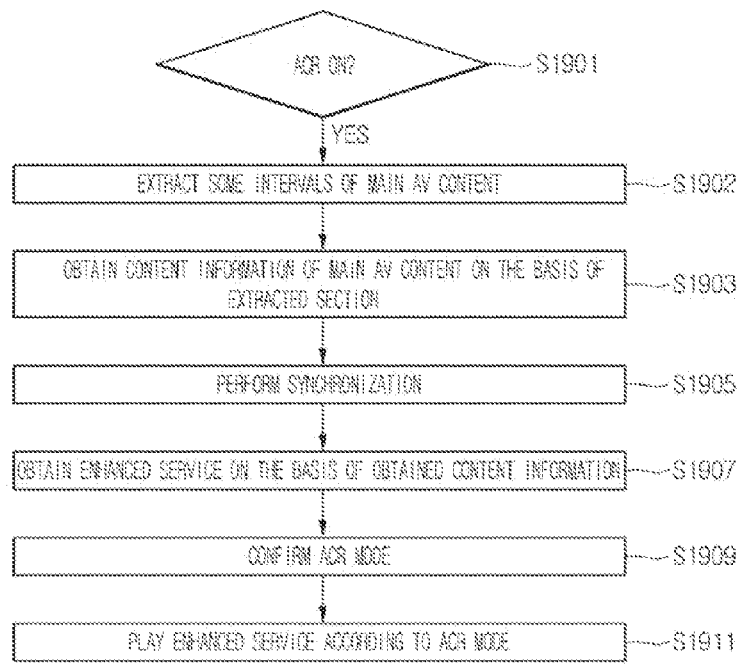
[Fig. 17]
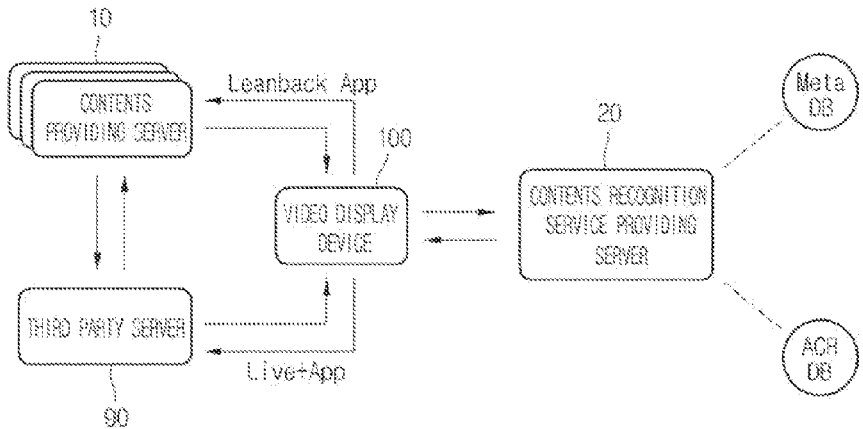

[Fig. 18]
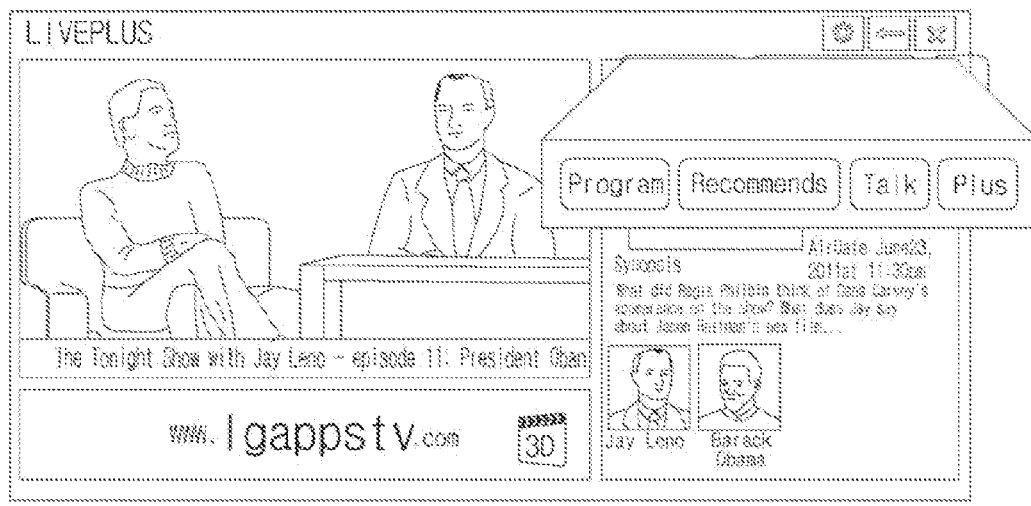

[Fig. 19]
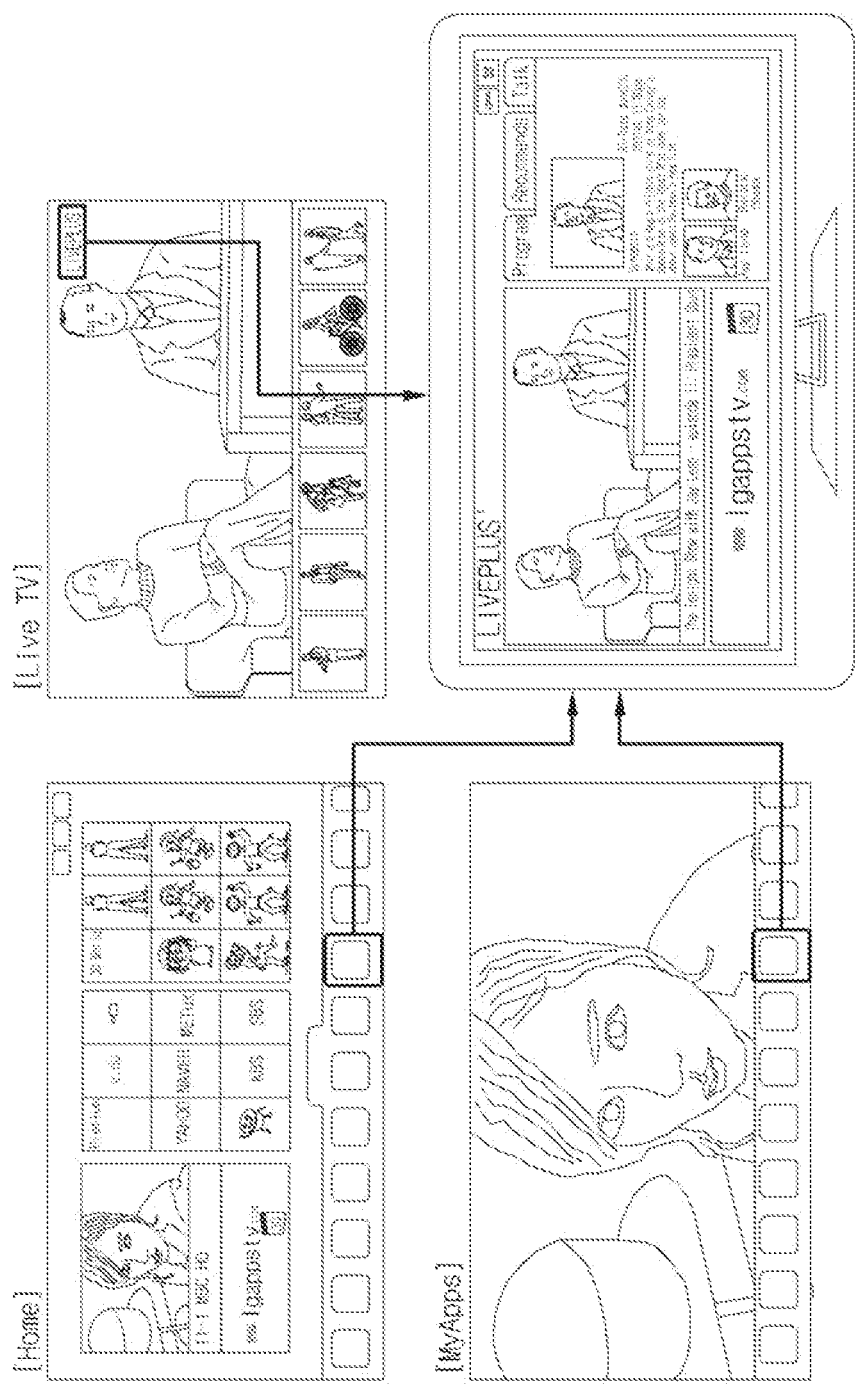

[Fig. 20]
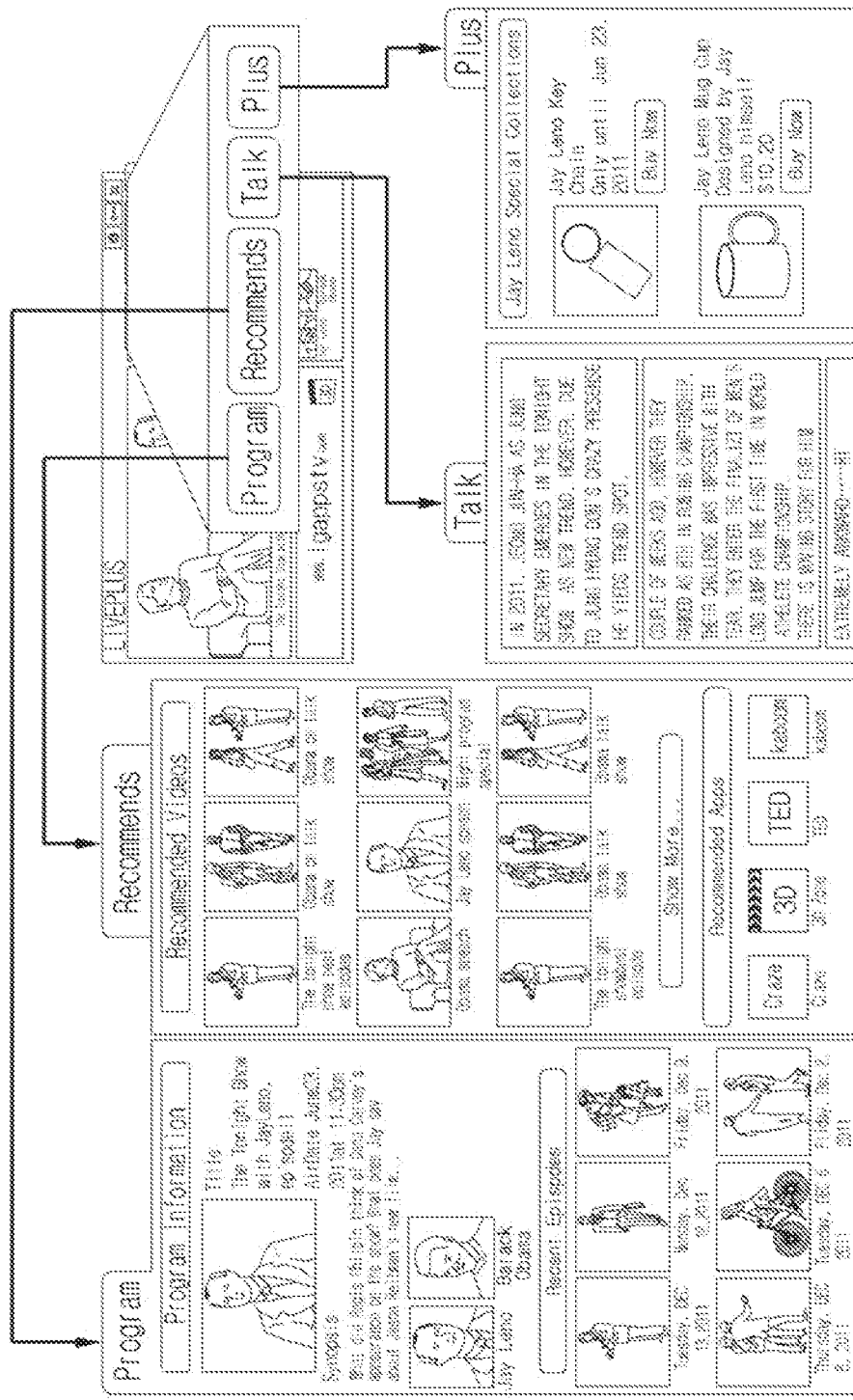

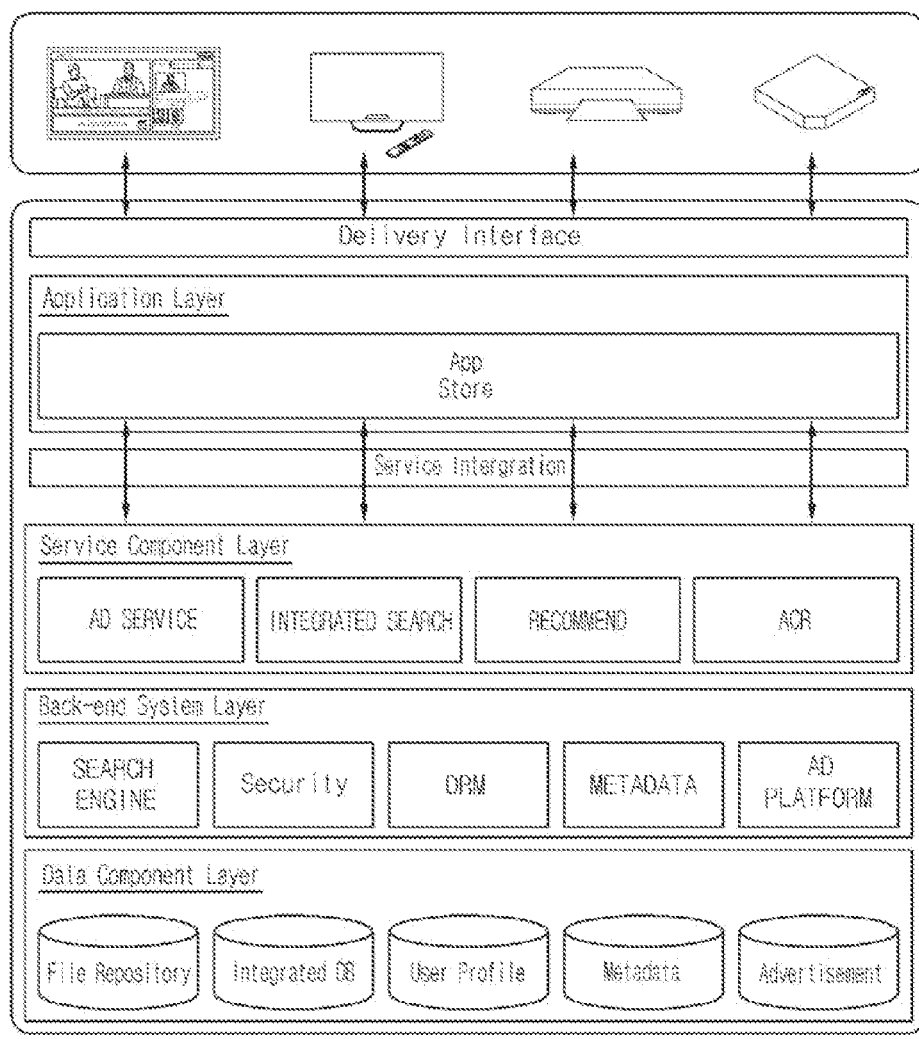
[Fig. 21]

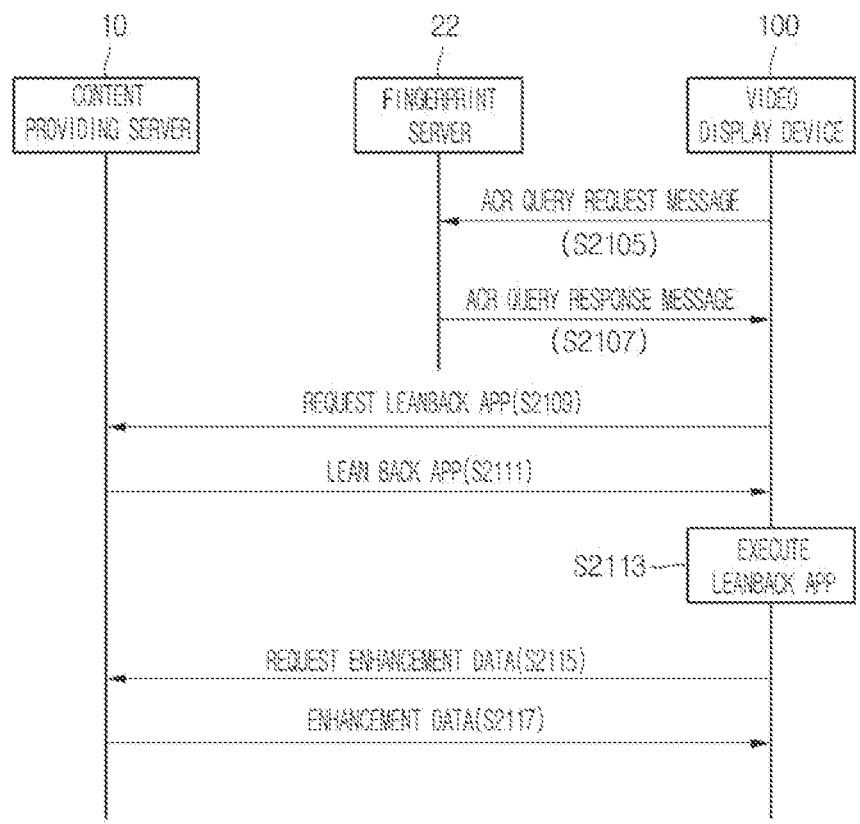

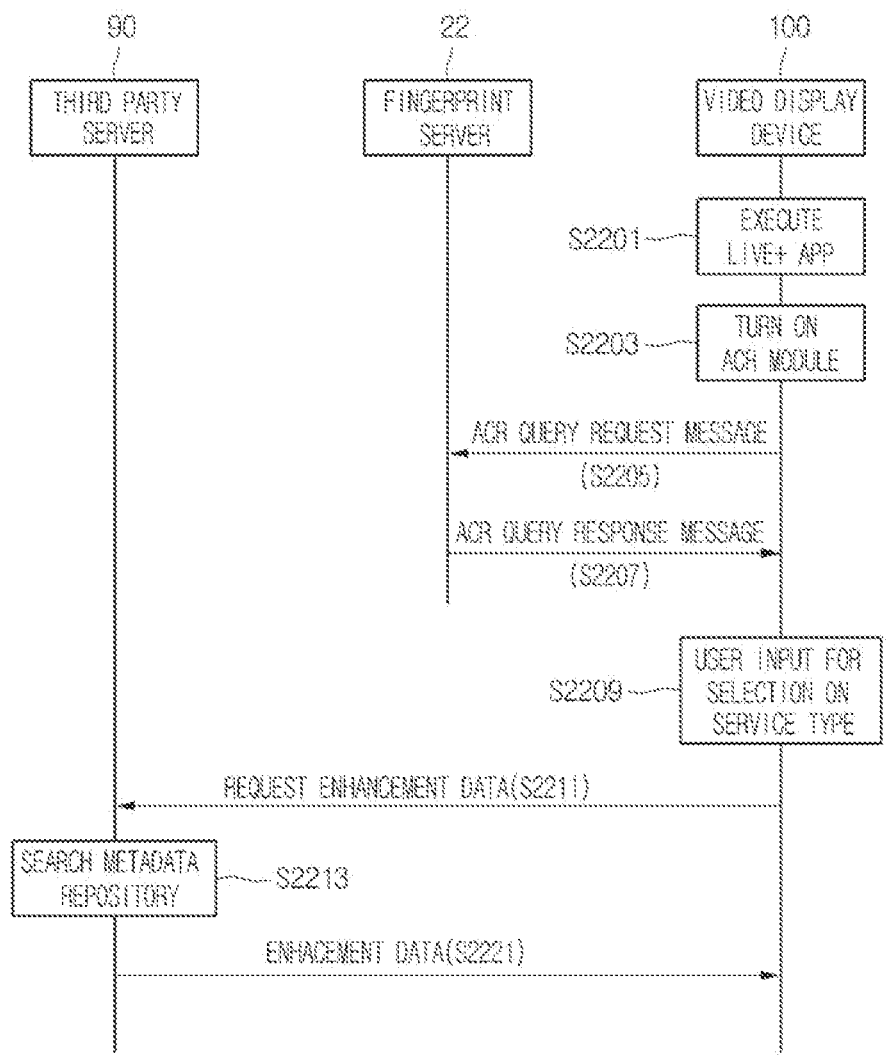
[Fig. 23]

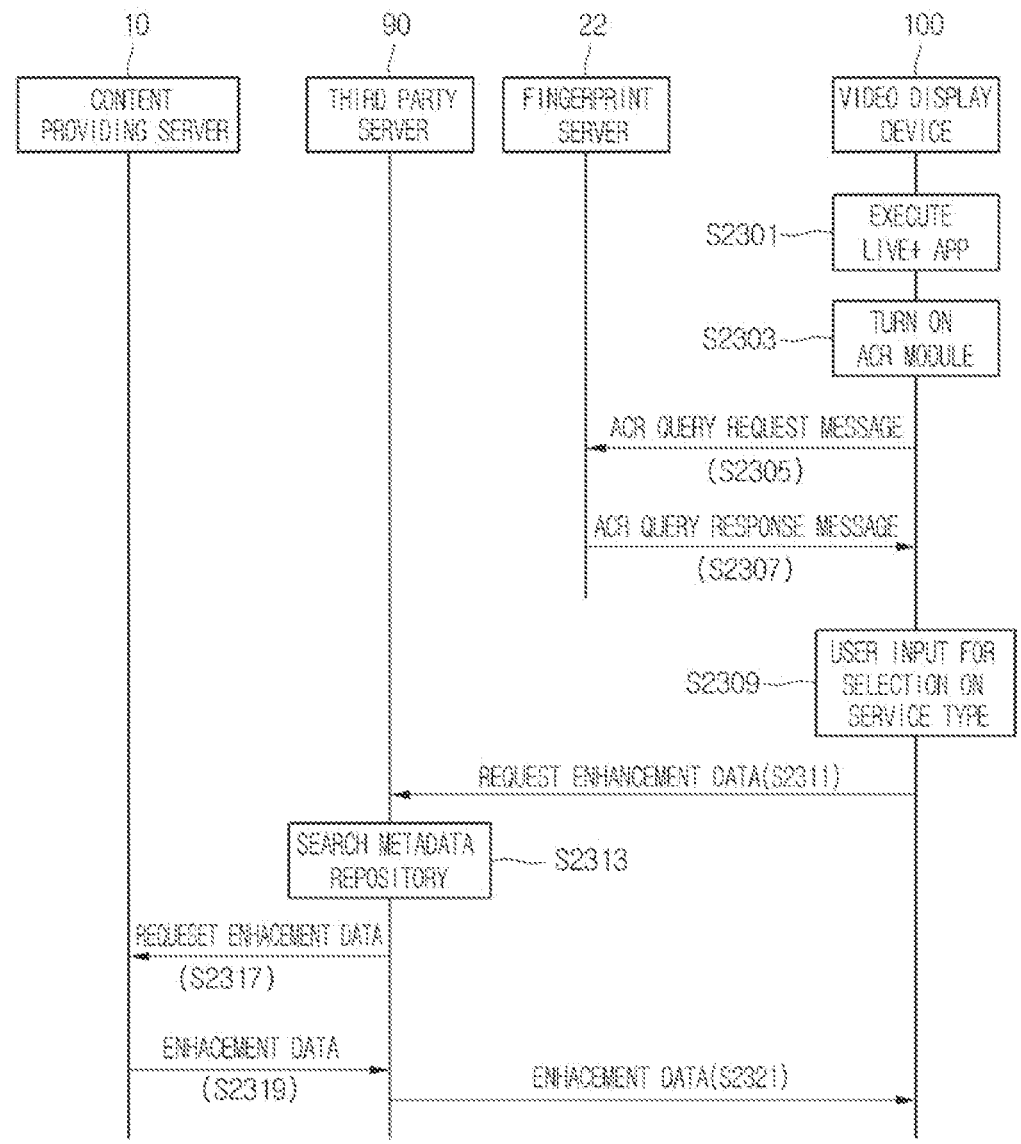
[Fig. 24]

[Fig. 25]
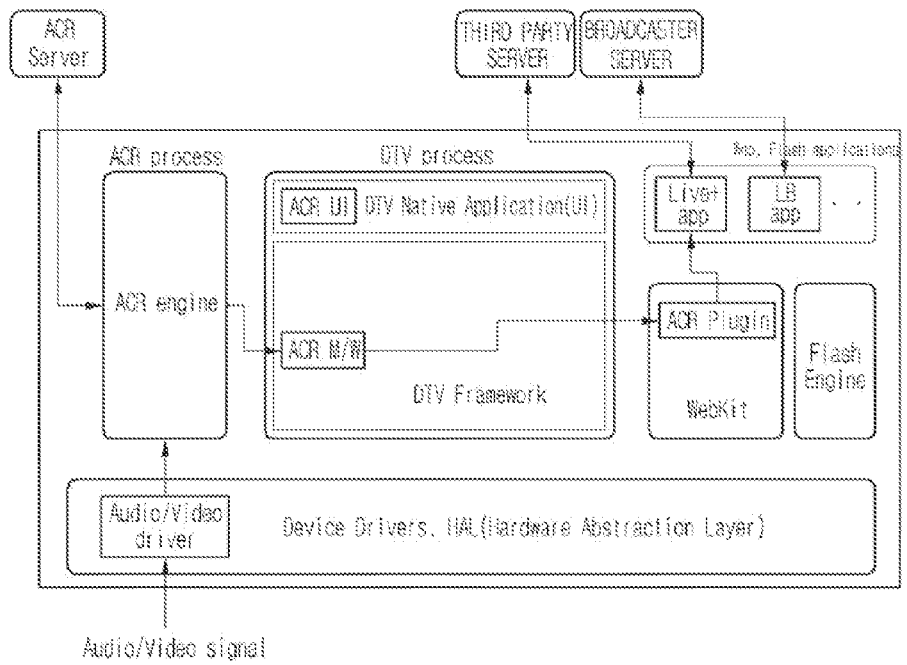
[Fig. 26]
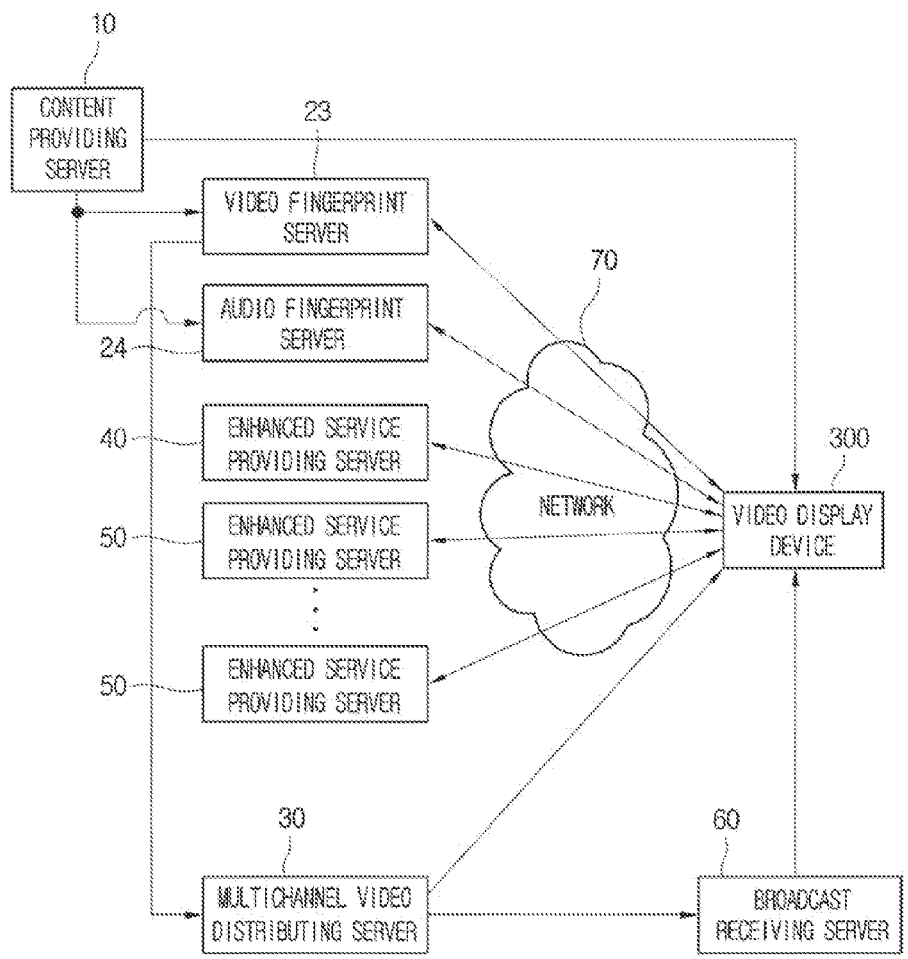

[Fig. 27]
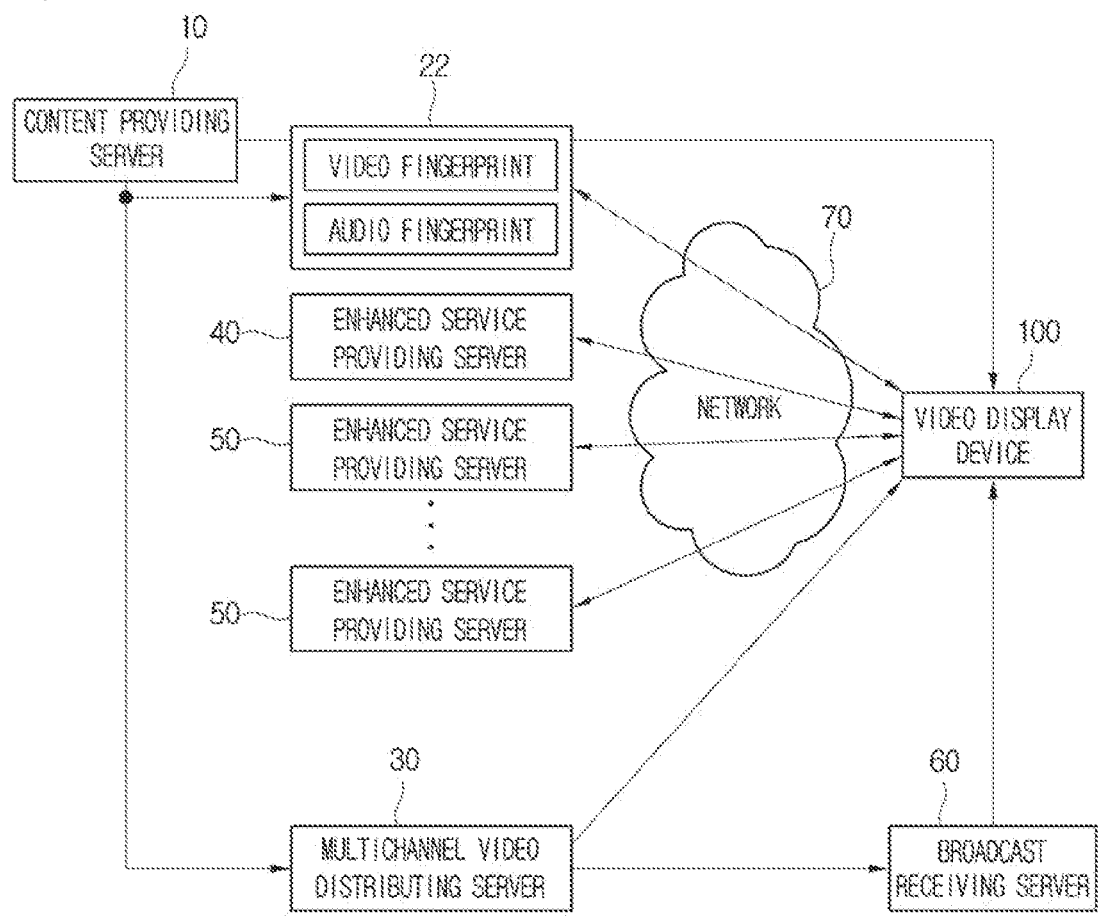

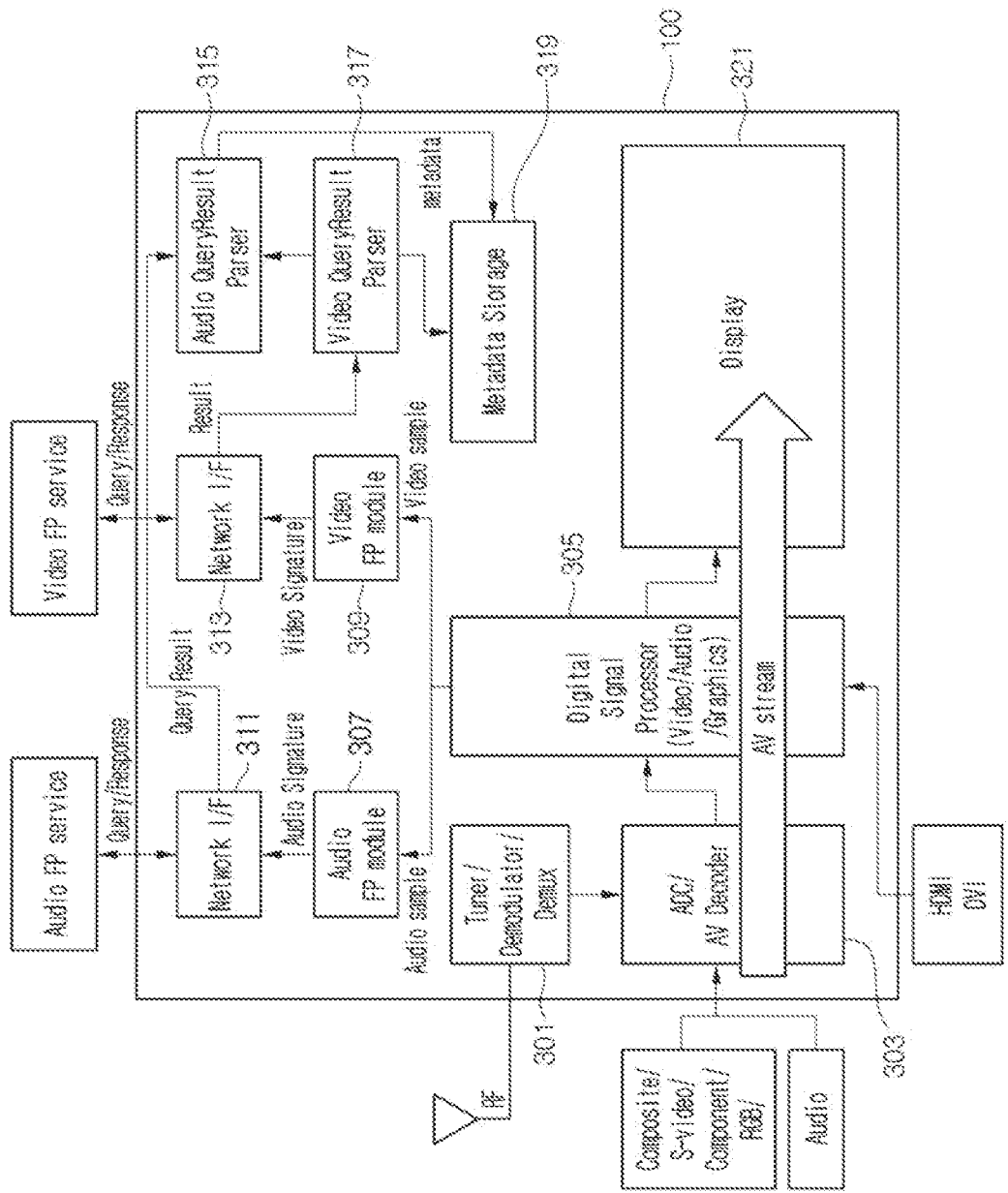
[Fig. 28]

[Fig. 29]
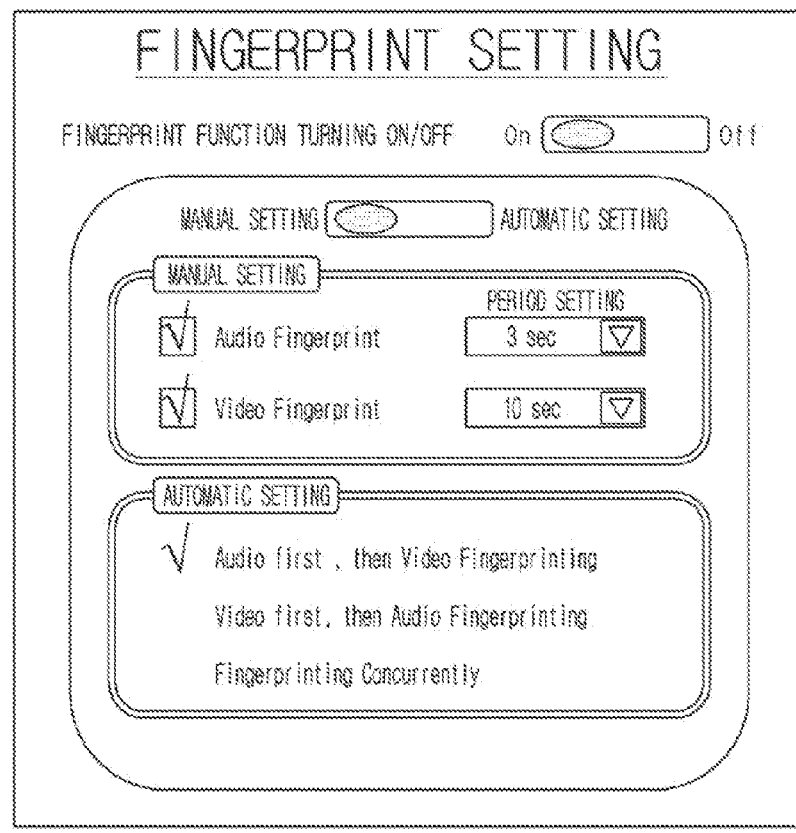
[Fig. 30]
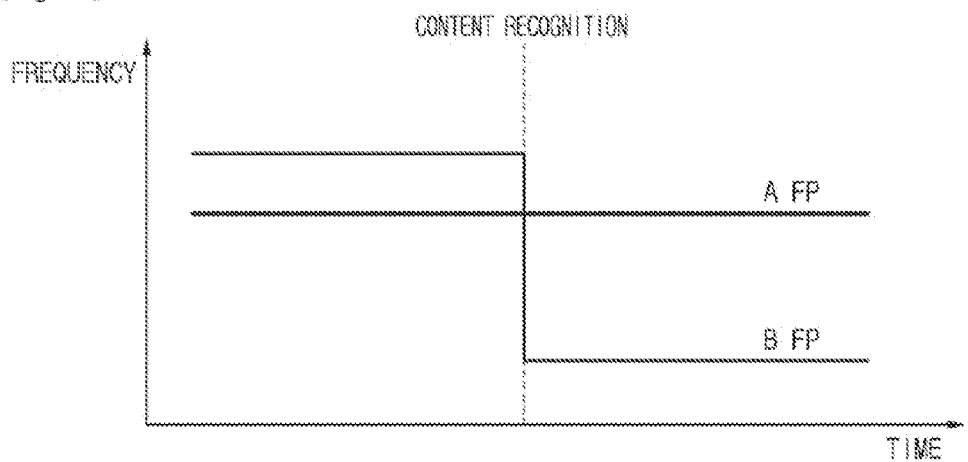

[Fig. 31]
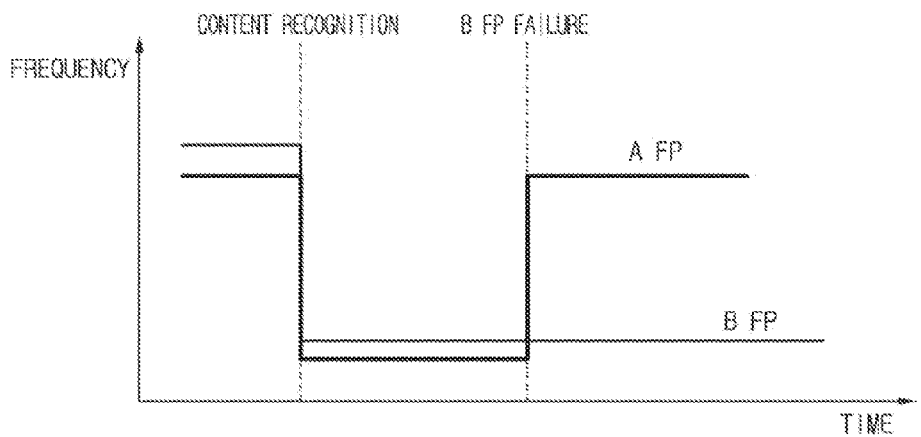
[Fig. 32]
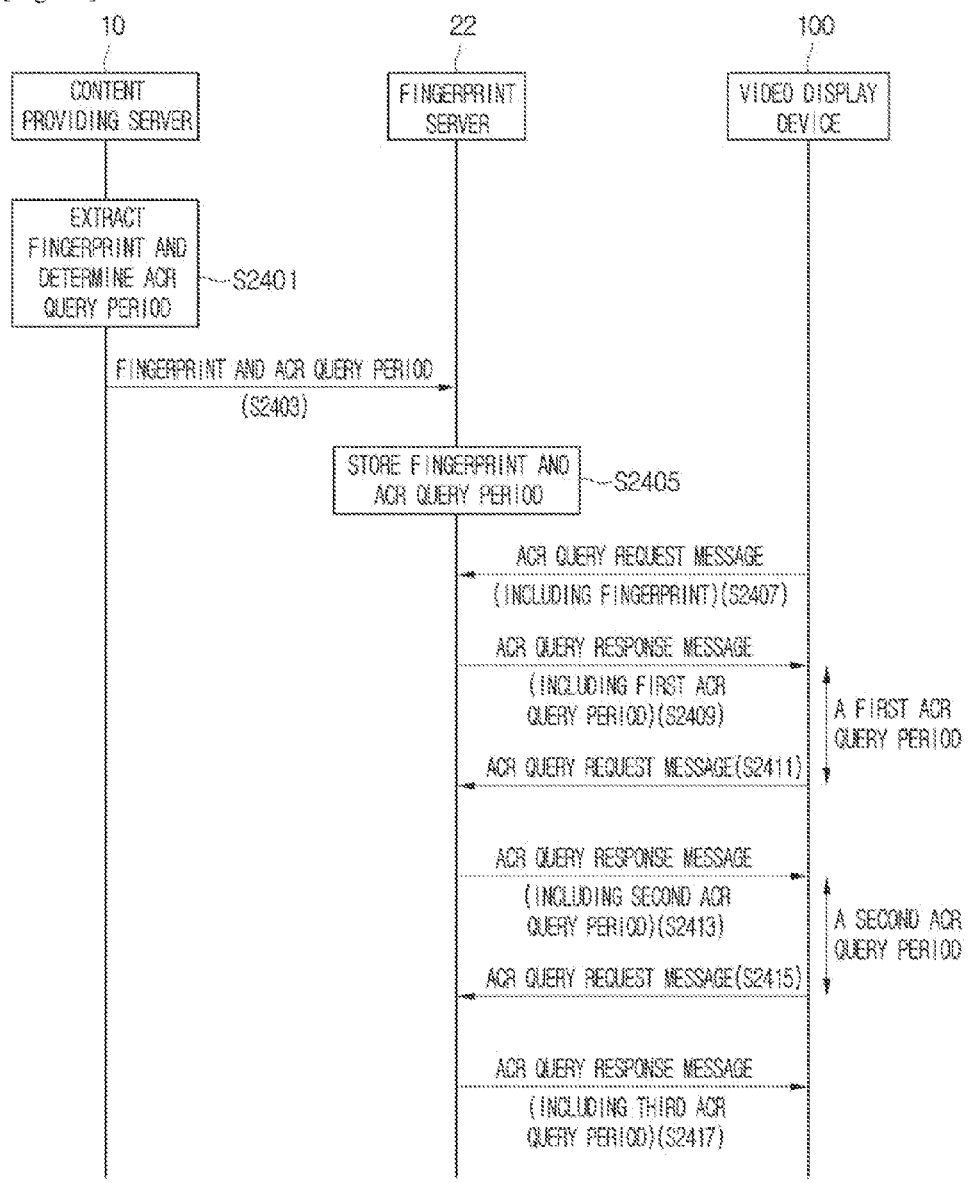

[Fig. 33]
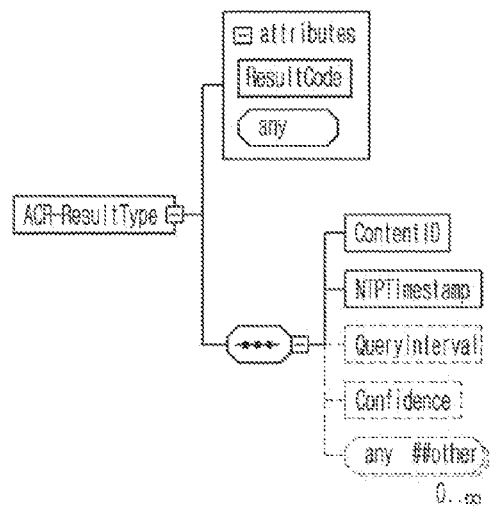
[Fig. 34]
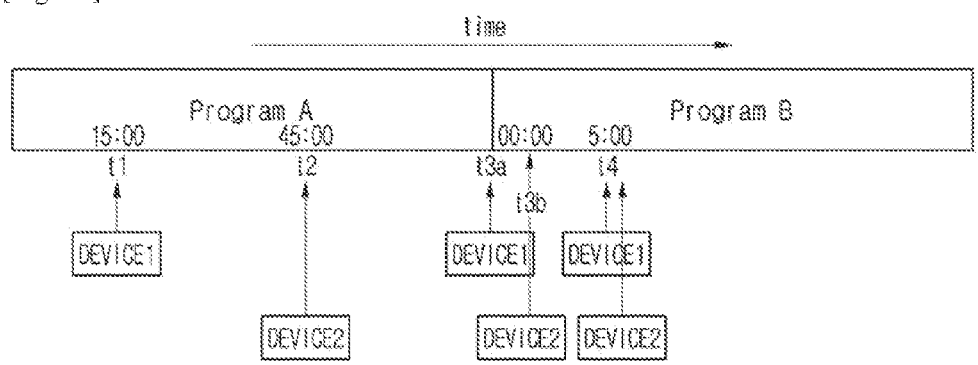

[Fig. 35]
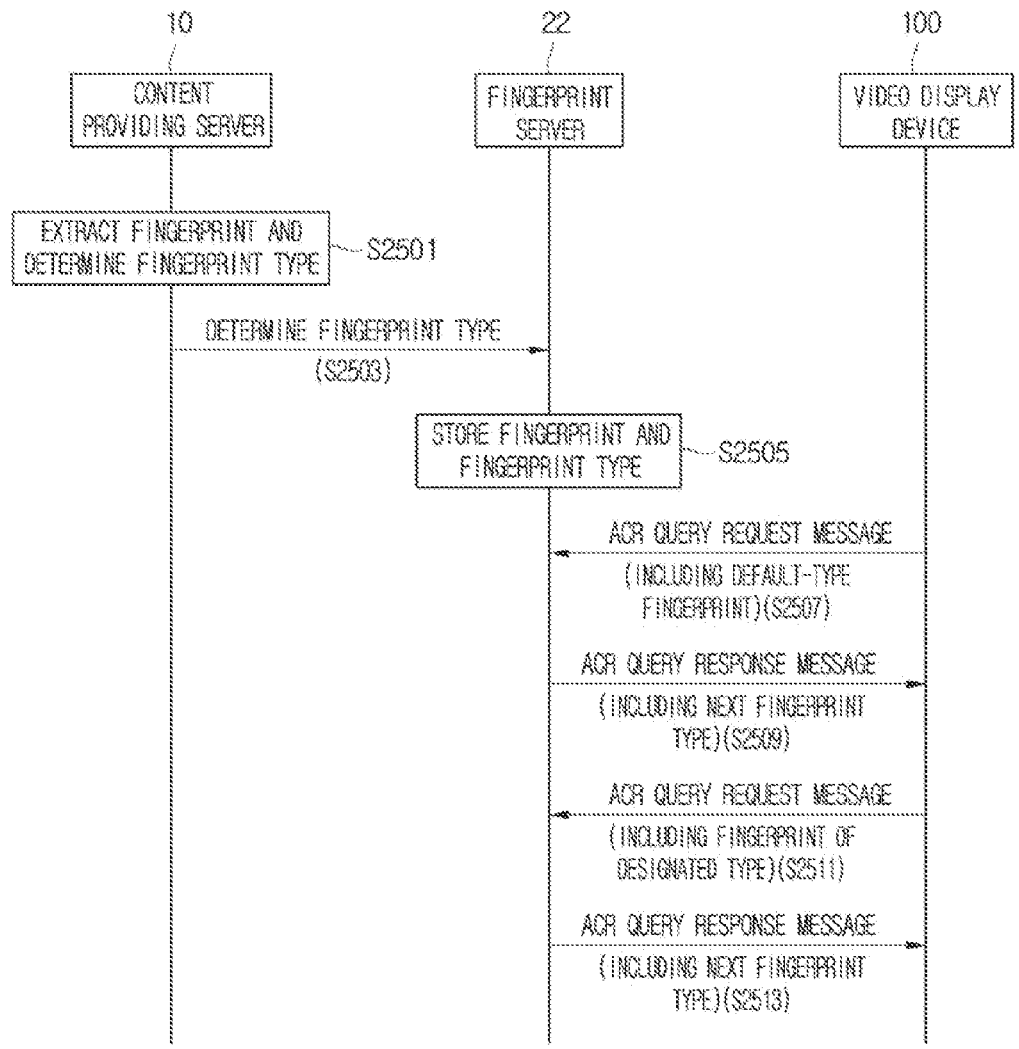
[Fig. 36]
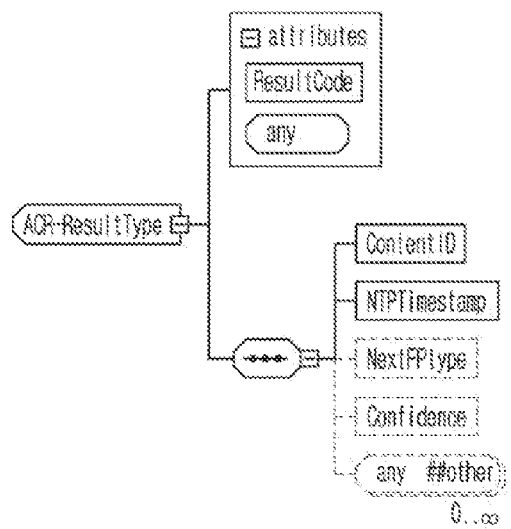

[Fig. 37]
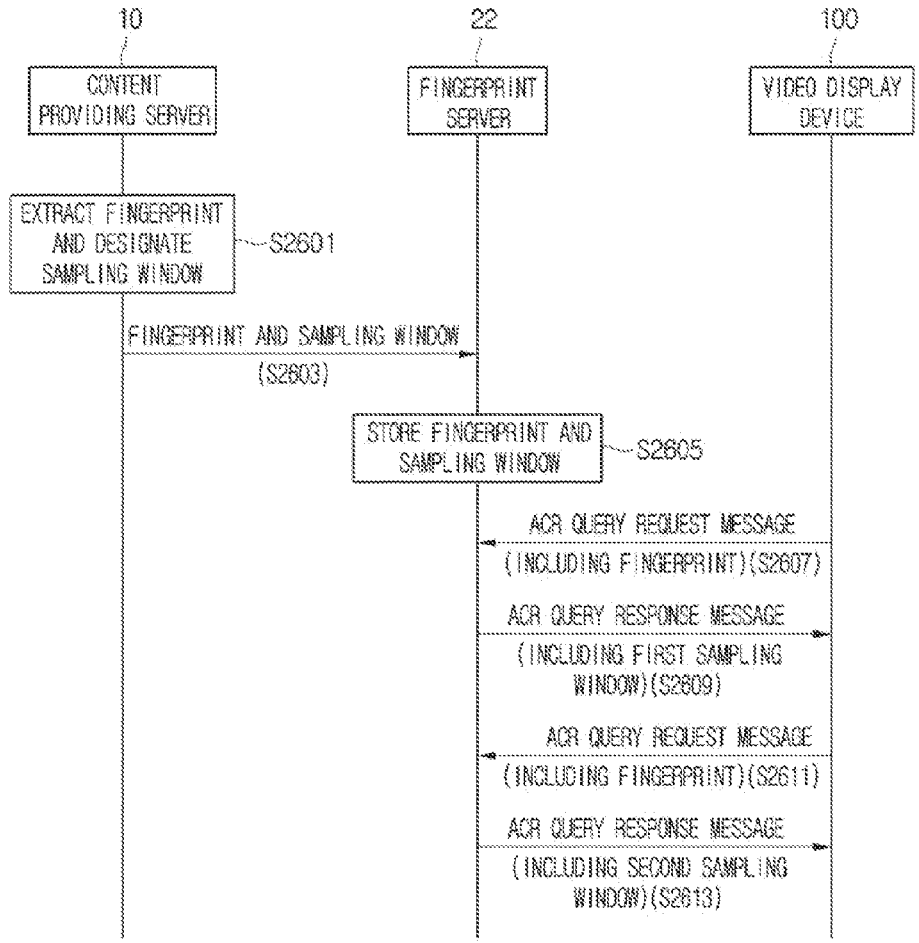
[Fig. 38]
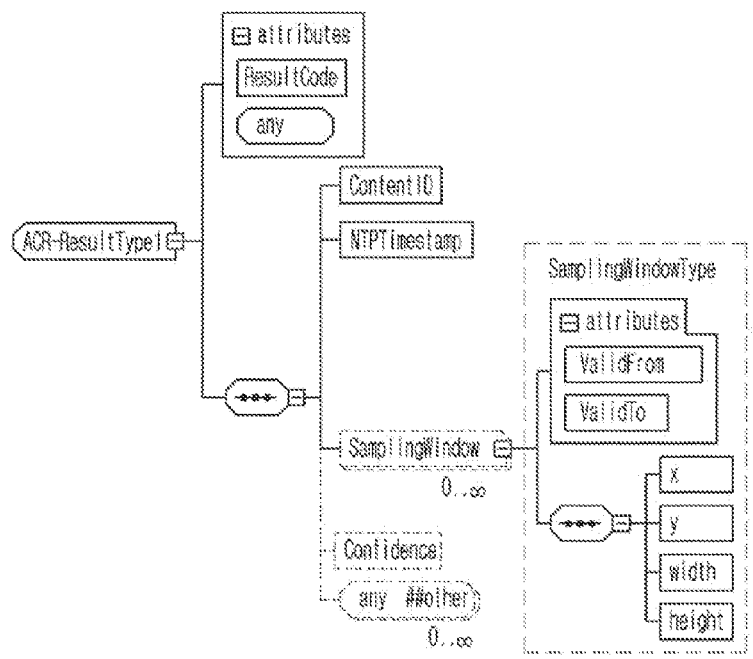

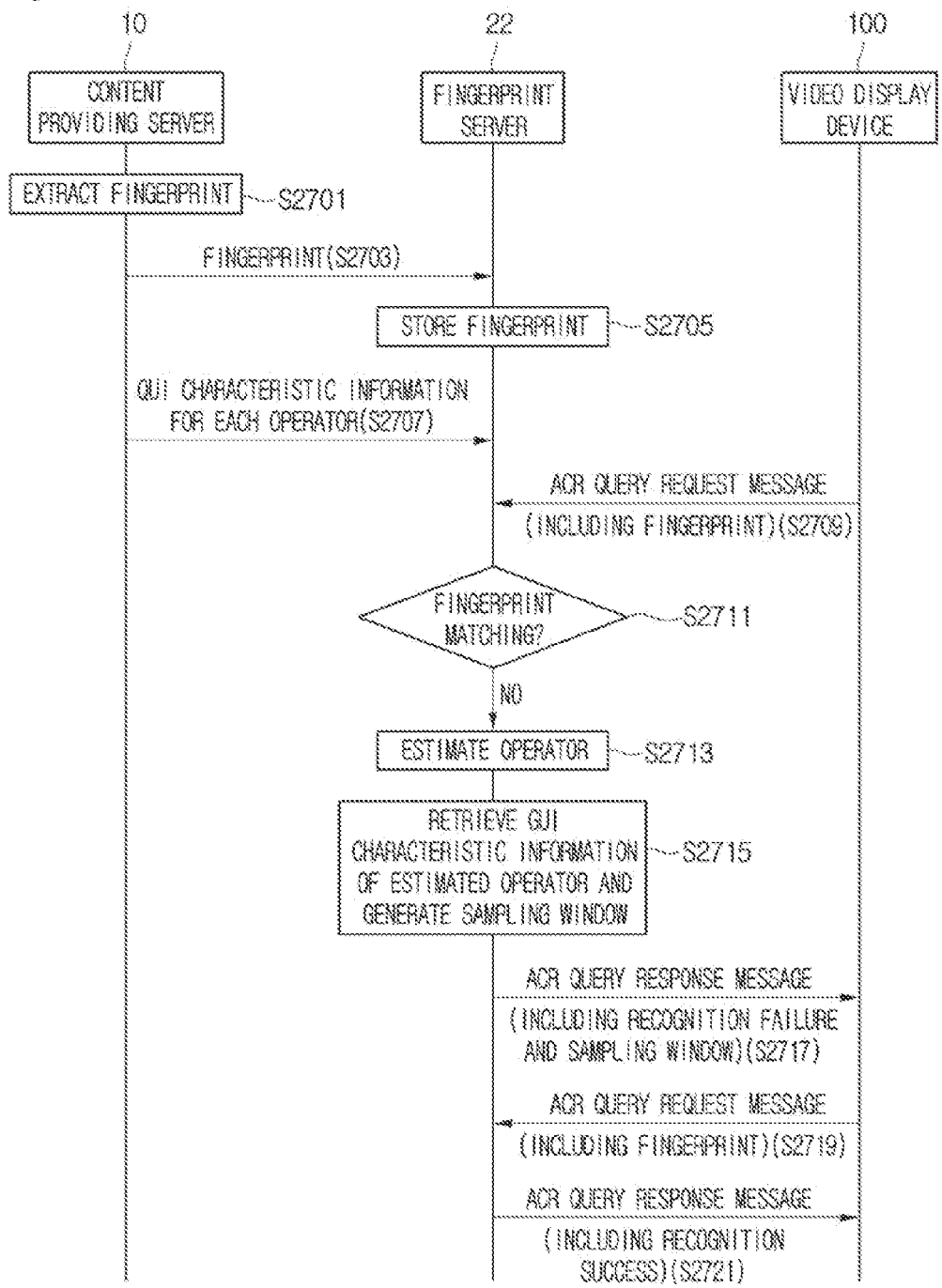

[Fig. 40]
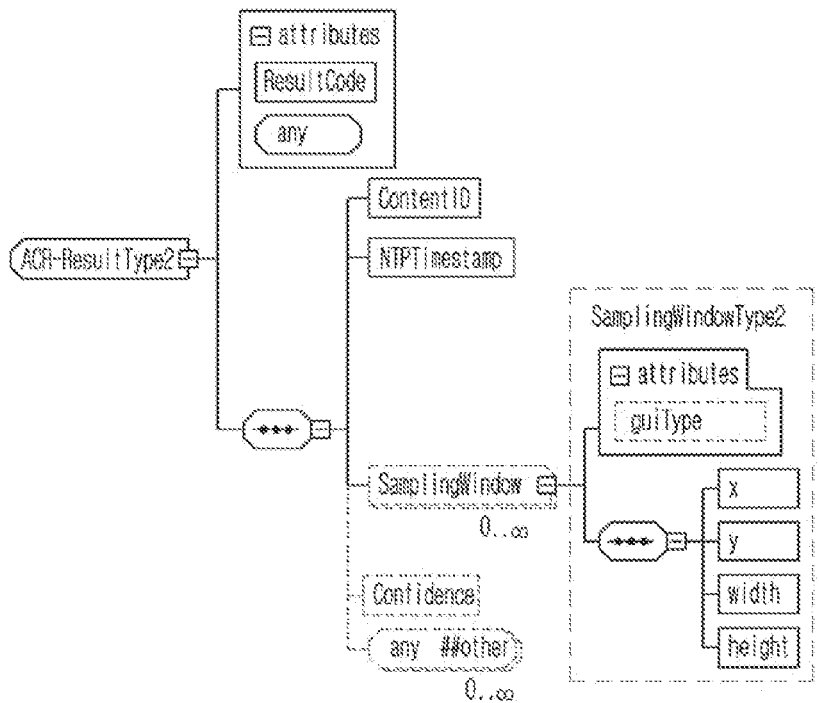
[Fig. 41]
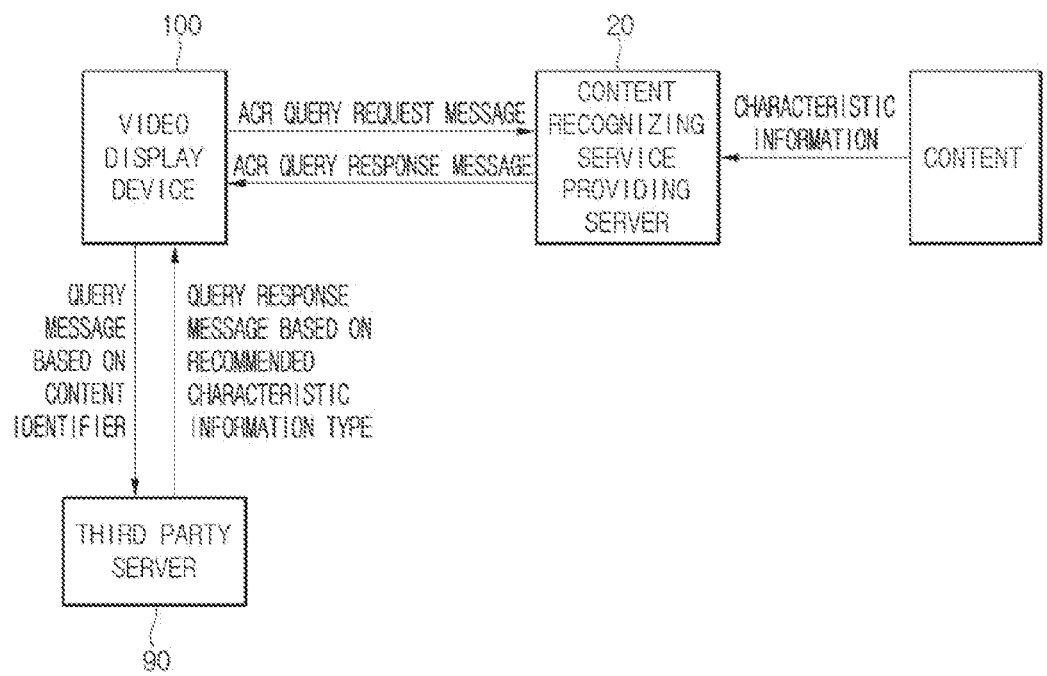

[Fig. 42]
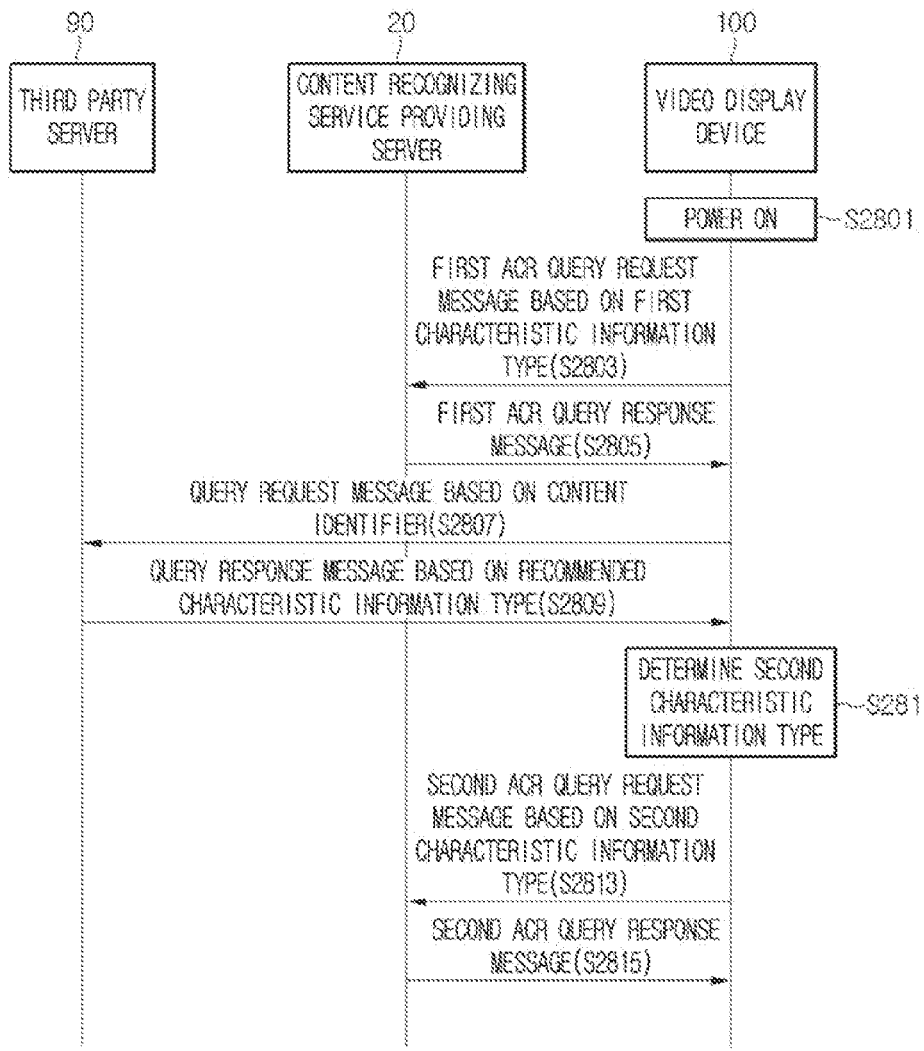
[Fig. 43]
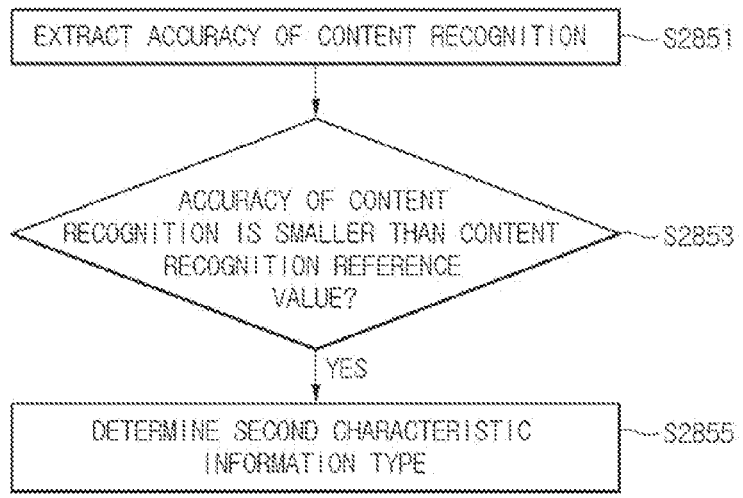

[Fig. 44]
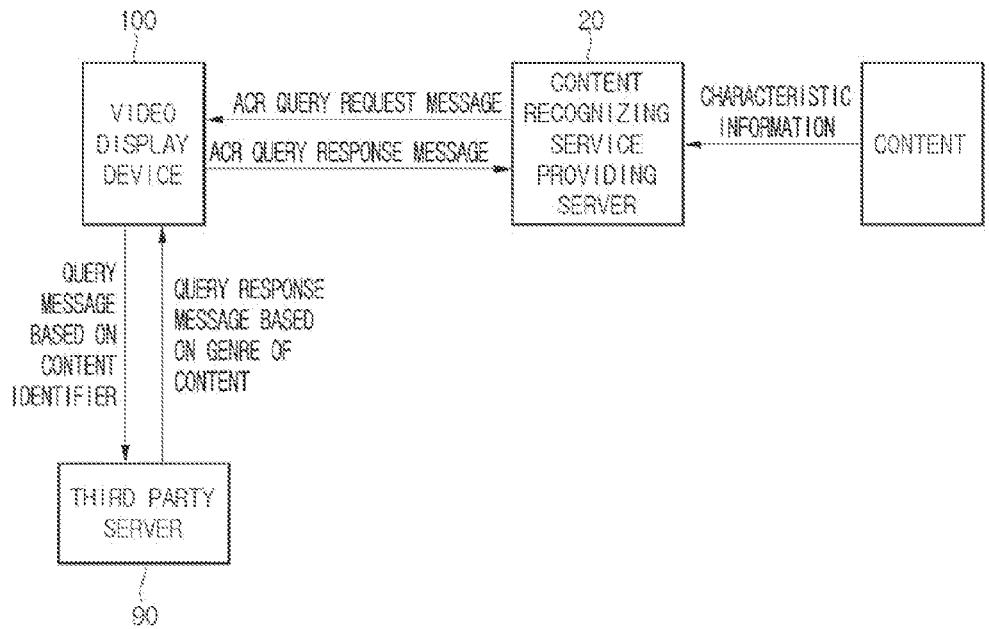
[Fig. 45]
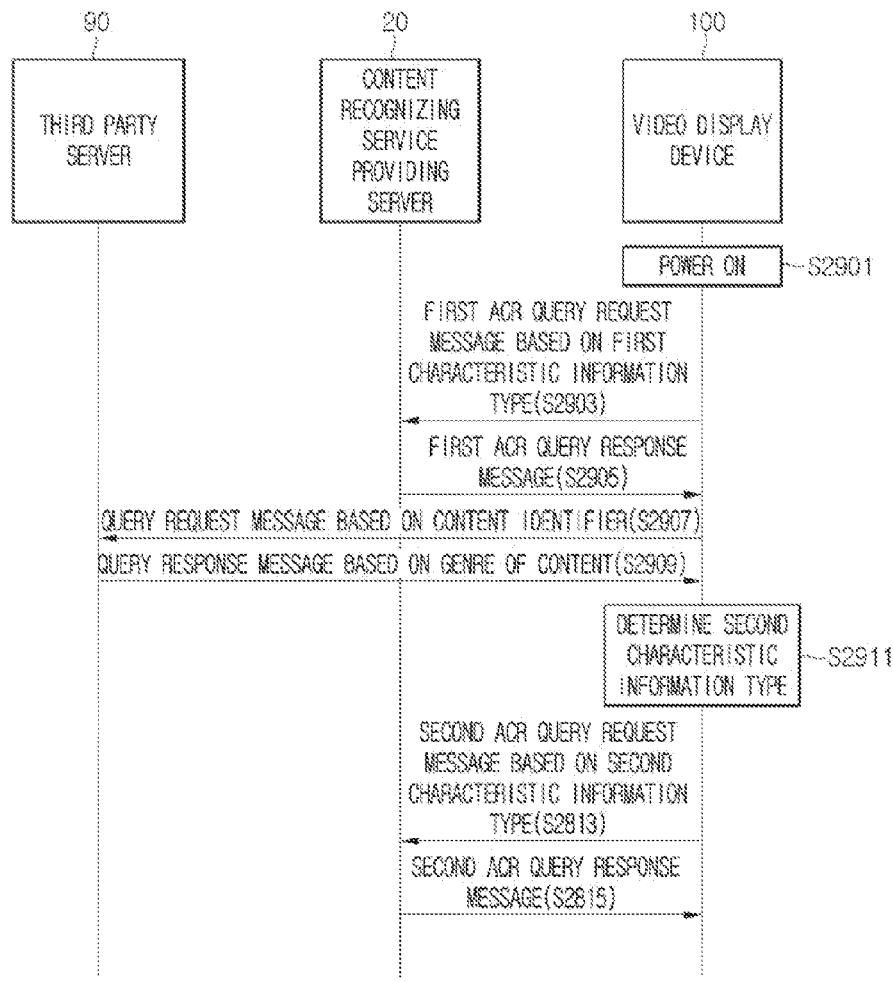

[Fig. 46]
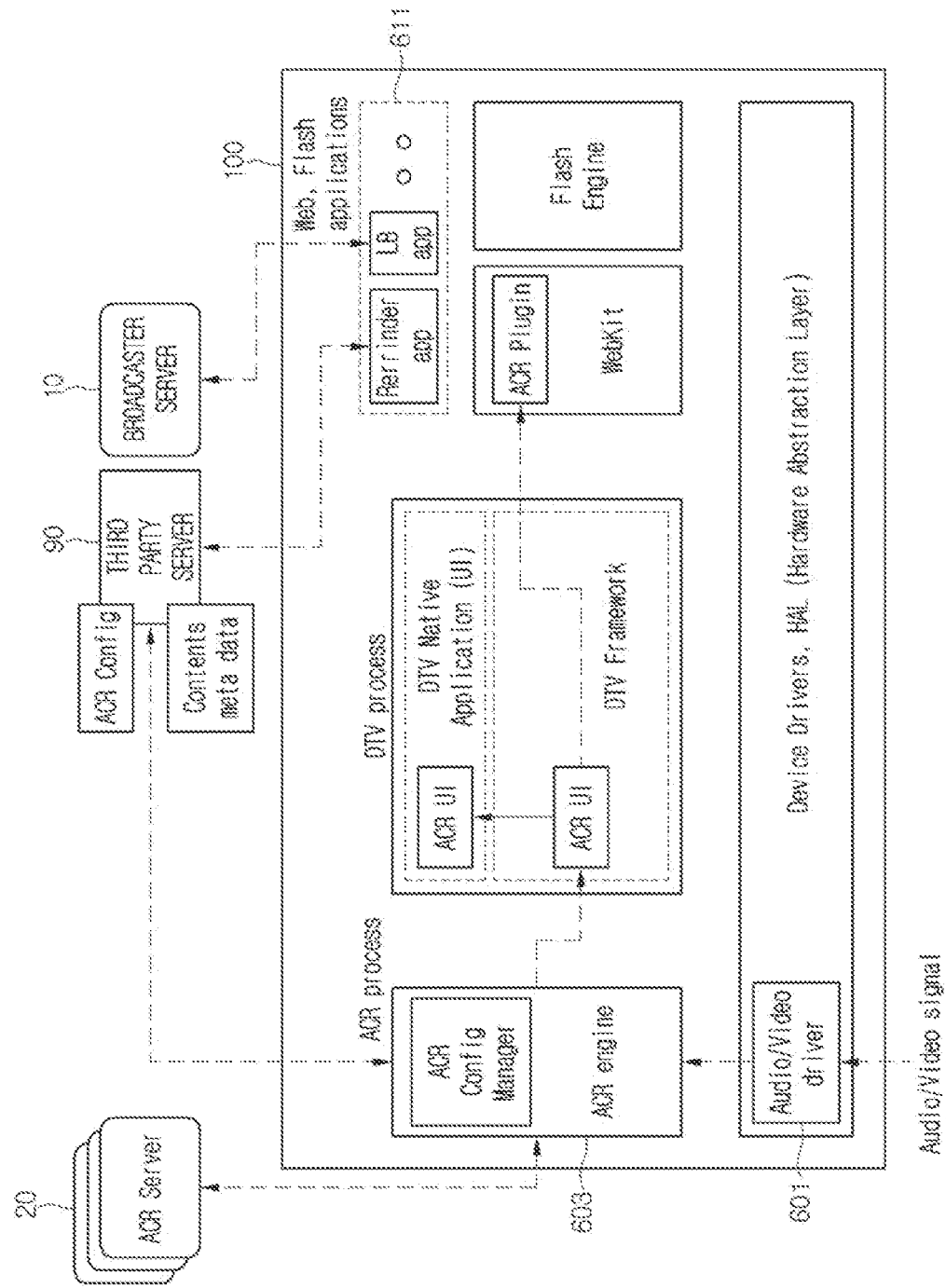

[Fig. 47]
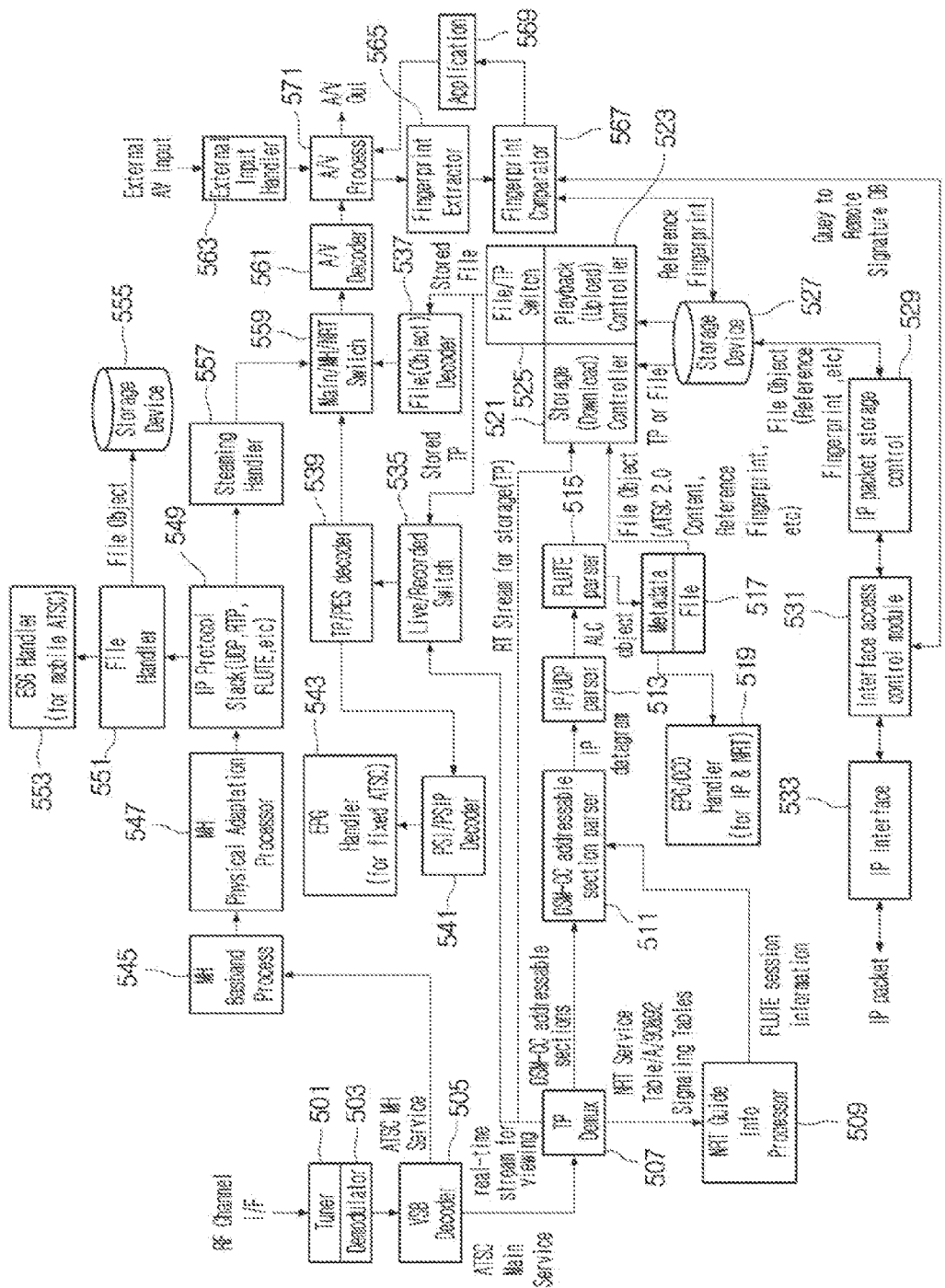

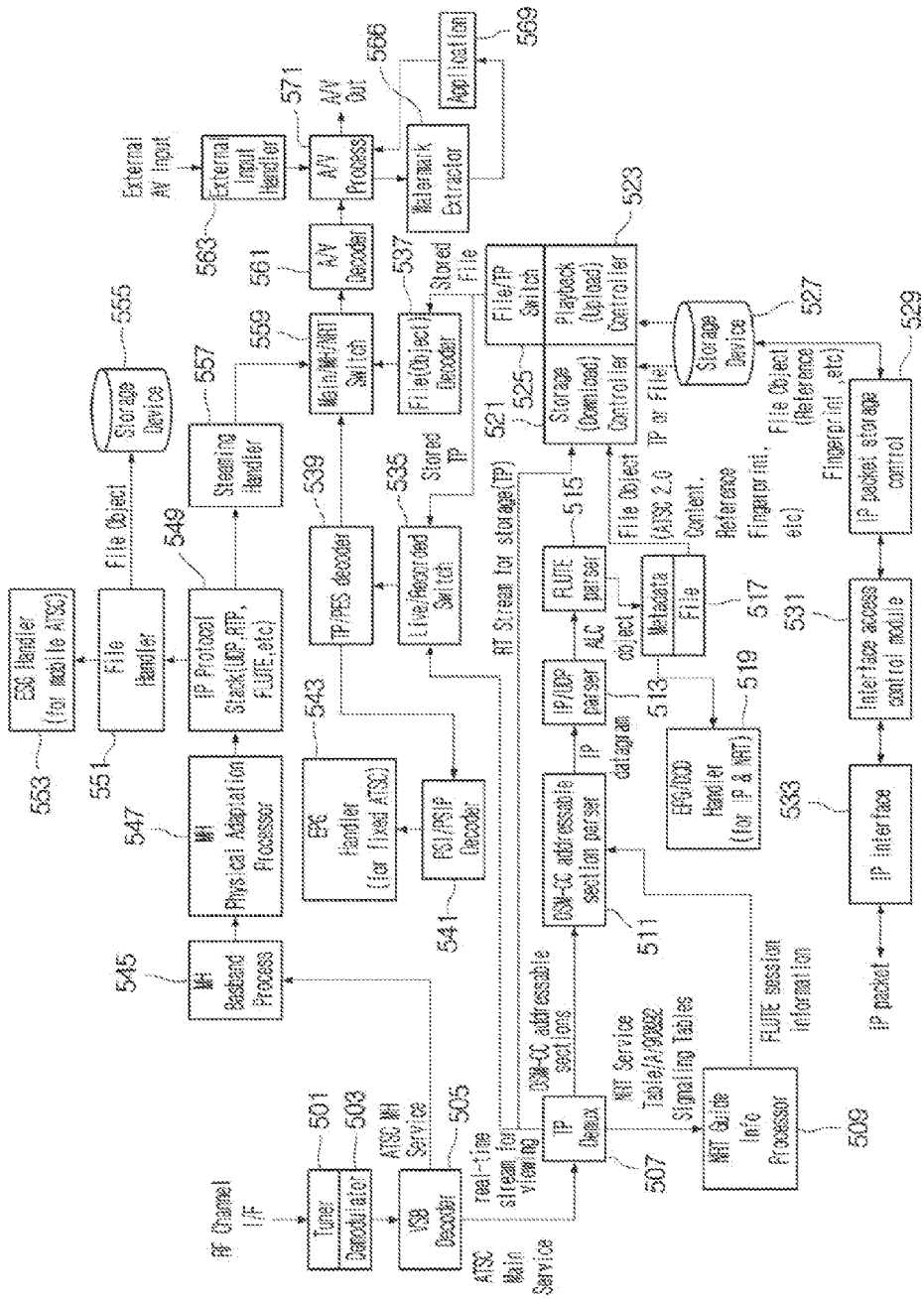
[Fig. 48]

VIDEO DISPLAY APPARATUS AND OPERATING METHOD THEREOF

CROSS REFERENCE TO RELATED APPLICATIONS

This application is the National Phase of PCT/KR2014/001354 filed on Feb. 19, 2014, which claims priority under 35 U.S.C. §119(e) to U.S. Provisional Application No. 61/767,256 filed on Feb. 21, 2013, all of which are hereby expressly incorporated by reference into the present application.

TECHNICAL FIELD

The present disclosure relates to a video display device and a method of operating the same.

BACKGROUND ART

As digital broadcasting is paving the way for its extensive spread, a broadcasting station transmits both main audio-visual (AV) contents and enhanced service data, which may be linked to the main audio and video contents to provide information and services or may be separately provided for other purposes.

However, a video display device in each home may unlikely receive broadcast signals directly through air under a current broadcasting environment. Rather, most of cases, a video display device in each home is connected to a broadcast receiving device to display uncompressed audio-visual contents that the broadcast receiving device provides.

Additionally, the broadcast receiving device receives contents from a server (called a Multichannel Video Programming Distributor (MVPD)). The MVPD receives a broadcast signal from a broadcasting station, extracts contents from the received broadcast signal, converts the extracted content into signals having a proper format for transmission, and provides the converted signals to a broadcast receiving device. During these processes, the MVPD may exclude extracted enhanced service data or may add another enhanced service data, so that the broadcasting receiving device is compelled to receive an enhanced service dependent on the MVPD.

The MVPD provides a plurality of channels, which are provided by contents providers, to a broadcast receiving device.

Since the broadcast receiving device extracts main AV data from signal received from the MVPD and provides only uncompressed audio-visual data to a video display device, only enhanced services provided from the broadcast receiving device not the video display device are available.

DISCLOSURE OF INVENTION

Technical Problem

Embodiments provide a video display device enabling correct content recognition and a method for operating the same.

Solution to Problem

In one embodiment, a operating method of a video display device including a display unit, the method comprising: obtaining an uncompressed audio and video content; extracting a first characteristic information corresponding to a first characteristic information type from the uncompressed audio and video content; receiving a first response to a first query which includes the first characteristic information; determining a second characteristic information type based on the first response; extracting a second characteristic information corresponding to the second characteristic information type from the uncompressed audio and video content; and receiving a second response to a second query which includes the second characteristic information.

The second characteristic information type may be determined based on a genre of the uncompressed audio and video content.

The first response to the first query may include a content identifier of the uncompressed audio and video and the genre of the uncompressed audio and video content may be obtained based on the content identifier.

The determining the second characteristic information type may comprises transmitting a third query which includes the content identifier and determining the second characteristic information type based on the a third response to the third query.

The third response to the third query may include the genre of the uncompressed audio and video content, and the determining the second characteristic information type based on the a third response to the third query may comprise determining the second characteristic information type based on the genre of the uncompressed audio and video content.

Advantageous Effects of Invention

A video display device according to an embodiment may correctly identify content by changing a characteristic information type included in an ACR query based on a genre of the content.

A video display device according to an embodiment may correctly identify content by changing a characteristic information type included in an ACR query based on a content recognition accuracy.

A video display device according to an embodiment may correctly identify content by changing a characteristic information type included in an ACR query based on a constraint on the video display device.

BRIEF DESCRIPTION OF DRAWINGS

FIG. 1 is a block diagram illustrating the network topology according to the embodiment.

FIG. 2 is a block diagram illustrating a watermark based network topology according to an embodiment.

FIG. 3 is a ladder diagram illustrating a data flow in a watermark based network topology according to an embodiment.

FIG. 4 is view illustrating a watermark based content recognition timing according to an embodiment.

FIG. 5 is a block diagram illustrating a fingerprint based network topology according to an embodiment.

FIG. 6 is a ladder diagram illustrating a data flow in a fingerprint based network topology according to an embodiment.

FIG. 7 is a view illustrating an XML schema diagram of ACR-Resulttype containing a query result according to an embodiment.

FIG. 8 is a block diagram illustrating a watermark and fingerprint based network topology according to an embodiment.

FIG. 9 is a ladder diagram illustrating a data flow in a watermark and fingerprint based network topology according to an embodiment.

FIG. 10 is a block diagram illustrating the video display device according to the embodiment.

FIG. 11 is a flowchart illustrating a method of synchronizing a playback time of a main audio and video content with a playback time of an enhanced service according to an embodiment.

FIG. 12 is a conceptual diagram illustrating a method of synchronizing a playback time of a main audio and video content with a playback time of an enhanced service according to an embodiment.

FIG. 13 is a screen when an auto playing application is executed according to an embodiment.

FIG. 14 is a screen when a content provider application is executed according to an embodiment.

FIG. 15 is a view of a user interface for controlling an ACR function according to an embodiment.

FIG. 16 is a flowchart illustrating a method of controlling a video display device according to the embodiment.

FIG. 17 is a view illustrating a network topology according to an embodiment of the present invention.

FIG. 18 is a view illustrating a Live+ app according to various embodiments of the present invention.

FIG. 19 is a view illustrating a method of executing a Live+ app according to various embodiments of the present invention.

FIG. 20 is a view illustrating a tab function of a Live+ app according to an embodiment of the present invention.

FIG. 21 is a view illustrating an architecture of the third party server 90 according to an embodiment of the present invention.

FIG. 22 is a ladder diagram illustrating an operation of a video display device for an automatic execution application according to an embodiment of the present invention.

FIG. 23 is a ladder diagram illustrating an operation of a video display device for a channel-independent application according to an embodiment of the present invention.

FIG. 24 is a ladder diagram illustrating an operation of a video display device for a channel-independent application according to another embodiment of the present invention.

FIG. 25 is a conceptual diagram illustrating a video display device according to an embodiment of the present invention.

FIG. 26 is a ladder diagram illustrating an operation of a video display device according to another embodiment of the present invention.

FIG. 27 is an XML schema diagram of ACR configuration information according to an embodiment of the present invention.

FIG. 28 is a ladder diagram illustrating an operation of a video display device according to another embodiment of the present invention.

FIG. 29 is an XML schema diagram of ACR configuration information according to an embodiment of the present invention.

FIG. 30 is a view of an EPG window displaying the MVPD logo of Dish Network, a satellite operator, according to an embodiment of the present invention.

FIG. 31 is a view of an EPG window displaying the MVPD logo of Comcast, a Cable operator, according to an embodiment of the present invention.

FIG. 32 is a view of an EPG window displaying the MVPD logo of Comcast, a Cable operator, according to an embodiment of the present invention.

FIG. 33 is a view of a menu window displaying the MVPD logo of DirecTV, a satellite operator, according to an embodiment of the present invention.

FIG. 34 is a view of channel map processing according to an embodiment of the present invention.

FIG. 35 is a view of channel map processing according to an embodiment of the present invention.

FIG. 36 is a conceptual diagram of a video display device according to an embodiment of the present invention.

FIG. 37 is a conceptual diagram of a video display device according to an embodiment of the present invention.

FIG. 38 is a block diagram illustrating a structure of a fingerprint based video display device according to another embodiment.

FIG. 39 is a block diagram illustrating a structure of a watermark based video display device according to another embodiment.

FIG. 40 is an XML schema diagram of ACR-Resulttype containing a query result according to another embodiment.

FIG. 41 is a diagram illustrating a network topology in which a video display device determines a characteristic information type according to an embodiment.

FIG. 42 is a ladder diagram illustrating that a video display device determines a characteristic information type according to an embodiment.

FIG. 43 is a flowchart illustrating that a video display device changes the characteristic information type based on the accuracy of content recognition according to an embodiment.

FIG. 44 is a diagram illustrating a network topology in which a video display device determines a characteristic information type according to another embodiment.

FIG. 45 is a ladder diagram illustrating that a video display device determines a characteristic information type according to another embodiment.

FIG. 46 is a conceptual diagram illustrating a video display device according to an embodiment.

FIG. 47 is a block diagram illustrating a structure of a fingerprint based video display device according to another embodiment.

FIG. 48 is a block diagram illustrating a structure of a fingerprint based video display device according to another embodiment.

BEST MODE FOR CARRYING OUT THE INVENTION

Hereinafter, a mobile terminal relating to the present invention will be described in more detail with reference to the accompanying drawings. Noun suffixes such as "engine", "module", and "unit" for components in description below are given or mixed in consideration of easiness in writing the specification. That is, the noun suffixes themselves does not have respectively distinguishable meanings or roles.

A network topology will be described with reference to FIGS. 1 to 9 according to an embodiment.

FIG. 1 is a block diagram illustrating the network topology according to the embodiment.

As shown in FIG. 1, the network topology includes a content providing server 10, a content recognizing service providing server 20, a multi channel video distributing server 30, an enhanced service information providing server 40, a plurality of enhanced service providing servers 50, a broadcast receiving device 60, a network 70, and a video display device 100.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, additional data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 100 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts characteristic information from some frames or audio samples of the main audio-visual content and stores it. This characteristic information is called signature.

The multi channel video distributing server 30 receives and multiplexes broadcast signals from a plurality of broadcasting stations and provides the multiplexed broadcast signals to the broadcast receiving device 60. Especially, the multi channel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multi channel video distributing server 30 may exclude the extracted enhanced service or may add another enhanced service, a broadcasting station may not provide services led by it. There may be at least one multi channel video distributing server.

The broadcasting device 60 may tune a channel selected by a user and receives a signal of the tuned channel, and then, performs demodulation and channel decoding on the received signal to extract a main audio-visual content. The broadcasting device 60 decodes the extracted main audio-visual content through H.264/Moving Picture Experts Group-4 advanced video coding (MPEG-4 AVC). Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main audio and video content to the video display device 100 through its external input port.

The enhanced service information providing server 40 provides enhanced service information on at least one available enhanced service relating to a main audio and video content in response to a request of a video display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main audio and video content in response to a request of a video display device. There may be at least one enhanced service providing server.

The video display device 100 may be a television, a notebook computer, a hand phone, and a smart phone, each including a display unit. The video display device 100 may receive an uncompressed main audio and video content from the broadcast receiving device 60 or a broadcast signal including an encoded main audio and video content from the contents providing server 10 or the multi channel video distributing server 30. The video display device 100 may receive a content recognizing service from the content recognizing service providing server 20 through the network 70, an address of at least one available enhanced service relating to a main audio and video content from the enhanced service information providing server 40 through the network 70, and at least one available enhanced service relating to a main audio and video content from the enhanced service providing server 50.

At least two of the content providing server 10, the content recognizing service providing server 20, the multi channel video distributing server 30, the enhanced service information providing server 40, and the plurality of enhanced service providing servers 50 may be combined in a form of one server and may be operated by one provider.

FIG. 2 is a block diagram illustrating a watermark based network topology according to an embodiment.

As shown in FIG. 2, the watermark based network topology may further include a watermark server 21.

As shown in FIG. 2, the watermark server 21 edits a main audio and video content to insert content information into it. The multi channel video distributing server 30 may receive and distribute a broadcast signal including the modified main audio and video content. Especially, a watermark server may use a digital watermarking technique described below.

A digital watermark is a process for inserting information, which may be almost undeletable, into a digital signal. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include additional information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

FIG. 3 is a ladder diagram illustrating a data flow in a watermark based network topology according to an embodiment.

First, the content providing server 10 transmits a broadcast signal including a main audio and video content and an enhanced service in operation S101.

The watermark server 21 receives a broadcast signal that the content providing server 10 provides, inserts a visible watermark such as a logo or watermark information as an invisible watermark into the main audio and video content by editing the main audio and video content, and provides the watermarked main audio and video content and enhanced service to the MVPD 30 in operation S103.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main audio and video content, main audio and video content identification information, time information of a content section used in content information acquisition, names of channels through which main audio and video content is broadcasted, logos of channels through which main audio and video content is broadcasted, descriptions of channels through which main audio and video content is broadcasted, a usage information reporting period, the minimum usage time for usage information acquisition, and available enhanced service information relating to main audio and video content.

If the video display device 100 uses a watermark to acquire content information, the time information of a content section used for content information acquisition may be the time information of a content section into which a watermark used is embedded. If the video display device 100 uses a fingerprint to acquire content information, the time information of a content section used for content information acquisition may be the time information of a content section where characteristic information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main audio and video content watching information reporting address and an enhanced service usage information reporting address. The usage information reporting period may include at least one of a main audio and video content watching information reporting period and an enhanced service usage information reporting period. A minimum usage time for usage information acquisition may include at least one of a minimum watching time for a main audio and video content watching information acquisition and a minimum usage time for enhanced service usage information extraction.

On the basis that a main audio and video content is watched for more than the minimum watching time, the video display device 100 acquires watching information of the main audio and video content and reports the acquired watching information to the main audio and video content watching information reporting address in the main audio and video content watching information reporting period.

On the basis that an enhanced service is used for more than the minimum usage time, the video display device 100 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with IP or Advanced Television Systems Committee-Mobile/Handheld (ATSC M/H). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main audio and video content.

For example, the watermark server 21 may insert a barcode at a predetermined position of a logo. At this point, the predetermined position of the logo may correspond to the first line at the bottom of an area where the logo is displayed. The video display device 100 may not display a barcode when receiving a main audio and video content including a logo with the barcode inserted.

For example, the watermark server 21 may insert a barcode at a predetermined position of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main audio and video content and enhanced service and generates a multiplexed signal to provide it to the broadcast receiving device 60 in operation S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main audio and video content, and then, provides the generated uncompressed main audio and video content to the video display device 100 in operation S106.

Moreover, the content providing server 10 also broadcasts a broadcast signal including a main audio and video content through a wireless channel in operation S107.

Additionally, the MVPD 30 may directly transmit a broadcast signal including a main audio and video content to the video display device 100 without going through the broadcast receiving device 60 in operation S108.

The video display device 100 may receive an uncompressed main audio and video content through the broadcast receiving device 60. Additionally, the video display device 100 may receive a broadcast signal through a wireless channel, and then, may demodulate and decode the received broadcast signal to obtain a main audio and video content. Additionally, the video display device 100 may receive a broadcast signal from the MVPD 30, and then, may demodulate and decode the received broadcast signal to obtain a main audio and video content. The video display device 100 extracts watermark information from some frames or a section of audio samples of the obtained main audio and video content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main audio and video content only with the logo. Additionally, when the watermark information does not include content information, the video display device 100 cannot identify the main audio and video content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main audio and video content the video display device 100 only with the watermark information, it accesses the watermark server 21 corresponding to the obtained watermark server address to transmit a first query in operation S109.

The watermark server 21 provides a first reply to the first query in operation Sill. The first reply may include at least one of content information, enhanced service information, and an available enhanced service.

If the watermark information and the first reply do not include an enhanced service address, the video display device 100 cannot obtain enhanced service. However, the watermark information and the first reply may include an enhanced service address providing server address. In this manner, the video display device 100 does not obtain a service address or enhanced service through the watermark information and the first reply. If the video display device 100 obtains an enhanced service address providing server address, it accesses the enhanced service information providing server 40 corresponding to the obtained enhanced service address providing server address to transmit a second query including content information in operation S119.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S121.

If the video display device 100 obtains at least one available enhanced service address through the watermark information, the first reply, or the second reply, it accesses the at least one available enhanced service address to request enhanced service in operation S123, and then, obtains the enhanced service in operation S125.

FIG. 4 is a view illustrating a watermark based content recognition timing according to an embodiment.

As shown in FIG. 4, when the broadcast receiving device 60 is turned on and tunes a channel, and also, the video display device 100 receives a main audio and video content of the turned channel from the broadcast receiving device 60 through an external input port 111, the video display device 100 may sense a content provider identifier (or a broadcasting station identifier) from the watermark of the main audio and video content. Then, the video display device 100 may sense content information from the watermark of the main audio and video content on the basis of the sensed content provider identifier.

At this point, as shown in FIG. 4, the detection available period of the content provider identifier may be different from that of the content information. Especially, the detection available period of the content provider identifier may be shorter than that of the content information. Through this, the video display device 100 may have an efficient configuration for detecting only necessary information.

FIG. 5 is a block diagram illustrating a fingerprint based network topology according to an embodiment.

As shown in FIG. 5, the network topology may further include a fingerprint server 22.

As shown in FIG. 5, the fingerprint server 22 does not edit a main audio and video content, but extracts characteristic information from some frames or a section of audio samples of the main audio and video content and stores the extracted characteristic information. Then, when receiving the characteristic information from the video display device 100, the fingerprint server 22 provides an identifier and time information of an audio and video content corresponding to the received characteristic information.

FIG. 6 is a ladder diagram illustrating a data flow in a fingerprint based network topology according to an embodiment.

First, the content providing server 10 transmits a broadcast signal including a main audio and video content and an enhanced service in operation S201.

The fingerprint server 22 receives a broadcast signal that the content providing server 10, extracts a plurality of pieces of characteristic information from a plurality of frame sections or a plurality of audio sections of the main audio and video content, and establishes a database for a plurality of query results corresponding to the plurality of characteristic information in operation S203. The query result may include at least one of content information, enhanced service information, and an available enhanced service.

The MVPD 30 receives broadcast signals including a main audio and video content and enhanced service and generates a multiplexed signal to provide it to the broadcast receiving device 60 in operation S205. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main audio and video content, and then, provides the generated uncompressed main audio and video content to the video display device 100 in operation S206.

Moreover, the content providing server 10 also broadcasts a broadcast signal including a main audio and video content through a wireless channel in operation S207.

Additionally, the MVPD 30 may directly transmit a broadcast signal including a main audio and video content to the video display device 100 without going through the broadcast receiving device 60.

The video display device 100 may receive an uncompressed main audio and video content through the broadcast receiving device 60. Additionally, the video display device 100 may receive a broadcast signal through a wireless channel, and then, may demodulate and decode the received broadcast signal to obtain a main audio and video content. Additionally, the video display device 100 may receive a broadcast signal from the MVPD 30, and then, may demodulate and decode the received broadcast signal to obtain a main audio and video content. The video display device 100 extracts characteristic information from some frames or a section of audio samples of the obtained main audio and video content in operation S213.

The video display device 100 accesses the fingerprint server 22 corresponding to the predetermined fingerprint server address to transmit a first query including the extracted characteristic information in operation S215.

The fingerprint server 22 provides a query result as a first reply to the first query in operation S217. If the first reply corresponds to fail, the video display device 100 accesses the fingerprint server 22 corresponding to another fingerprint server address to transmit a first query including the extracted characteristic information.

The fingerprint server 22 may provide Extensible Markup Language (XML) document as a query result. Examples of the XML document containing a query result will be described with reference to FIG. 7 and Table 1.

FIG. 7 is a view illustrating an XML schema diagram of ACR-Resulttype containing a query result according to an embodiment.

As shown in FIG. 7, ACR-Resulttype containing a query result includes ResultCode attributes and ContentID, NTP-Timestamp, SignalingChannel Information, and ServiceInformation elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value.

The ServiceInformation element includes ServiceName, ServiceLogo, and ServiceDescription elements.

Table 1 illustrates an XML schema of ACR-ResultType containing the query result.

TABLE 1

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL" maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle" type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
            <xs:complexType>
                <xs:sequence>
                    <xs:element name="ServiceName" type="xs:string"/>
                    <xs:element name="ServiceLogo" type="xs:anyURI" minOccurs="0"/>
                    <xs:element name="ServiceDescription" type="xs:string"
```

TABLE 1-continued

```
          minOccurs="0" maxOccurs="unbounded"/>
                </xs:sequence>
              </xs:complexType>
            </xs:element>
            <xs:any namespace="##other" processContents="skip" minOccurs="0"
maxOccurs ="unbounded"/>
          </xs:sequence>
          <xs:attribute name="ResultCode" type="xs:string" use="required"/>
          <xs:anyAttribute processContents="skip"/>
        </xs:complexType>
```

As the ContentID element, an ATSC content identifier may be used as shown in Table 2.

TABLE 2

| Syntax | The Number of bits | format |
| --- | --- | --- |
| ATSC_content_identifier( ) { | | |
| TSID | 16 | uimsbf |
| reserved | 2 | bslbf |
| end_of_day | 5 | uimsbf |
| unique_for | 9 | uimsbf |
| content_id | var | |
| } | | |

As shown in Table 2, the ATSC content identifier has a structure including TSID and a house number.

The 16 bit unsigned integer TSID carries a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content identifier. The video display device 100 reduces unique_for by 1 in a corresponding time to end_of_day daily and presumes that content_id is unique if unique_for is not 0.

Moreover, as the ContentID element, a global service identifier for ATSC-M/H service may be used as described below.

The global service identifier has the following form.
 urn:oma:bcast:iauth:atsc:service:<region>:<xsid>:<serviceid>

Here, <region> is an international country code including two characters regulated by ISO 639-2. <xsid> for local service is a decimal number of TSID as defined in <region>, and <xsid> (regional service) (major >69) is "0". <serviceid> is defined with <major> or <minor>. <major> represent a Major Channel number, and <minor> represents a Minor Channel Number.

Examples of the global service identifier are as follows.
 urn:oma:bcast:iauth:atsc:service:us:1234:5.1
 urn:oma:bcast:iauth:atsc:service:us:0:100.200

Moreover, as the ContentID element, an ATSC content identifier may be used as described below.

The ATSC content identifier has the following form.
 urn:oma:bcast:iauth:atsc:content:<region>:<xsidz>:<contentid>:<unique_for>:<end_of_day>

Here, <region> is an international country code including two characters regulated by ISO 639-2. <xsid> for local service is a decimal number of TSID as defined in <region>, and may be followed by "."<serviceid>. <xsid> for (regional service) (major >69) is <serviceid>. <content_id> is a base64 sign of a content_id field defined in Table 2, <unique_for> is a decimal number sign of an unique_for field defined in Table 2, and <end_of_day> is a decimal number sign of an end_of_day field defined in Table 2.

Hereinafter, FIG. 6 is described again.

If the query result does not include an enhanced service address or enhanced service but includes an enhanced service address providing server address, the video display device 100 accesses the enhanced service information providing server 40 corresponding to the obtained enhanced service address providing server address to transmit a second query including content information in operation S219.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S221.

If the video display device 100 obtains at least one available enhanced service address through the first reply or the second reply, it accesses the at least one available enhanced service address to request enhanced service in operation S223, and then, obtains the enhanced service in operation S225.

When the UpdateMode attribute has a Pull value, the video display device 100 transmits an HTTP request to the enhanced service providing server 50 through SignalingChannelURL and receives an HTTP reply including a PSIP binary stream from the enhanced service providing server 50 in response to the request. In this case, the video display device 100 may transmit the HTTP request according to a Polling period designated as the PollingCycle attribute. Additionally, the SignalingChannelURL element may have an update time attribute. In this case, the video display device 100 may transmit the HTTP request according to an update time designated as the update time attribute.

If the UpdateMode attribute has a Push value, the video display device 100 may receive update from a server asynchronously through XMLHTTPRequest API. After the video display device 100 transmits an asynchronous request to a server through XMLHTTPRequest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

FIG. 8 is a block diagram illustrating a watermark and fingerprint based network topology according to an embodiment.

As shown in FIG. 8, the watermark and fingerprint based network topology may further include a watermark server 21 and a fingerprint server 22.

As shown in FIG. 8, the watermark server 21 inserts content provider identifying information into a main audio and video content. The watermark server 21 may insert content provider identifying information as a visible watermark such as a logo or an invisible watermark into a main audio and video content.

The fingerprint server 22 does not edit a main audio and video content, but extracts characteristic information from some frames or a certain section of audio samples of the main audio and video content and stores the extracted characteristic information. Then, when receiving the characteristic information from the video display device 100, the fingerprint server 22 provides an identifier and time information of an audio and video content corresponding to the received characteristic information.

FIG. 9 is a ladder diagram illustrating a data flow in a watermark and fingerprint based network topology according to an embodiment.

First, the content providing server 10 transmits a broadcast signal including a main audio and video content and an enhanced service in operation S301.

The watermark server 21 receives a broadcast signal that the content providing server 10 provides, inserts a visible watermark such as a logo or watermark information as an invisible watermark into the main audio and video content by editing the main audio and video content, and provides the watermarked main audio and video content and enhanced service to the MVPD 30 in operation S303. The watermark information inserted through an invisible watermark may include at least one of content information, enhanced service information, and an available enhanced service. The content information and enhanced service information are described above.

The MVPD 30 receives broadcast signals including watermarked main audio and video content and enhanced service and generates a multiplexed signal to provide it to the broadcast receiving device 60 in operation S305. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main audio and video content, and then, provides the generated uncompressed main audio and video content to the video display device 100 in operation S306.

Moreover, the content providing server 10 also broadcasts a broadcast signal including a main audio and video content through a wireless channel in operation S307.

Additionally, the MVPD 30 may directly transmit a broadcast signal including a main audio and video content to the video display device 100 without going through the broadcast receiving device 60 in operation S308.

The video display device 100 may receive an uncompressed main audio and video content through the broadcast receiving device 60. Additionally, the video display device 100 may receive a broadcast signal through a wireless channel, and then, may demodulate and decode the received broadcast signal to obtain a main audio and video content. Additionally, the video display device 100 may receive a broadcast signal from the MVPD 30, and then, may demodulate and decode the received broadcast signal to obtain a main audio and video content. The video display device 100 extracts watermark information from audio samples in some frames or periods of the obtained main audio and video content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main audio and video content only with the logo. Additionally, when the watermark information does not include content information, the video display device 100 cannot identify the main audio and video content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main audio and video content the video display device 100 only with the watermark information, it accesses the watermark server 21 corresponding to the obtained watermark server address to transmit a first query in operation S309.

The watermark server 21 provides a first reply to the first query in operation S311. The first reply may include at least one of a fingerprint server address, content information, enhanced service information, and an available enhanced service. The content information and enhanced service information are described above.

If the watermark information and the first reply include a fingerprint server address, the video display device 100 extracts characteristic information from some frames or a certain section of audio samples of the main audio and video content in operation S313.

The video display device 100 accesses the fingerprint server 22 corresponding to the fingerprint server address in the first reply to transmit a second query including the extracted characteristic information in operation S315.

The fingerprint server 22 provides a query result as a second reply to the second query in operation S317.

If the query result does not include an enhanced service address or enhanced service but includes an enhanced service address providing server address, the video display device 100 accesses the enhanced service information providing server 40 corresponding to the obtained enhanced service address providing server address to transmit a third query including content information in operation S319.

The enhanced service information providing server 40 searches at least one available enhanced service relating to the content information of the third query. Later, the enhanced service information providing server 40 provides to the video display device 100 enhanced service information for at least one available enhanced service as a third reply to the third query in operation S321.

If the video display device 100 obtains at least one available enhanced service address through the first reply, the second reply, or the third reply, it accesses the at least one available enhanced service address to request enhanced service in operation S323, and then, obtains the enhanced service in operation S325.

Then, referring to FIG. 10, the video display device 100 will be described according to an embodiment.

FIG. 10 is a block diagram illustrating the video display device according to the embodiment.

As shown in FIG. 10, the video display device 100 includes a broadcast signal receiving unit 101, a demodulation unit 103, a channel decoding unit 105, a demultiplexing unit 107, an AV decoding unit 109, an external input port 111, a play controlling unit 113, a play device 120, an enhanced service management unit 130, a data transmitting/receiving unit 141, and a memory 150.

The broadcast signal receiving unit 101 receives a broadcast signal from the content providing server 10 or MVPD 30.

The demodulation unit 103 demodulates the received broadcast signal to generate a demodulated signal.

The channel decoding unit 105 performs channel decoding on the demodulated signal to generate channel-decoded data.

The demultiplexing unit 107 separates a main audio and video content and enhanced service from the channel-decoded data. The separated enhanced service is stored in an enhanced service storage unit 152.

The AV decoding unit 109 performs AV decoding on the separated main audio and video content to generate an uncompressed main audio and video content.

Moreover, the external input port 111 receives an uncompressed main audio and video content from the broadcast receiving device 60, a digital versatile disk (DVD) player, a Blu-ray disk player, and so on. The external input port 11 may include at least one of a DSUB port, a High Definition Multimedia Interface (HDMI) port, a Digital Visual Interface (DVI) port, a composite port, a component port, and an S-Video port.

The play controlling unit 113 controls the play device 120 to play at least one of an uncompressed main audio and video content that the AV decoding unit 109 generates and an uncompressed main audio and video content received from the external input port 111 according to a user's selection.

The play device 120 includes a display unit 121 and a speaker 123. The display unit 21 may include at least one of a liquid crystal display (LCD), a thin film transistor-liquid crystal display (TFT LCD), an organic light-emitting diode (OLED), a flexible display, and a 3D display.

The enhanced service management unit 130 obtains content information of the main audio and video content and obtains available enhanced service on the basis of the obtained content information. Especially, as described above, the enhanced service management unit 130 may obtain the identification information of the main audio and video content on the basis of some frames or a certain section of audio samples the uncompressed main audio and video content. This is called automatic contents recognition (ACR) in this specification.

The data transmitting/receiving unit 141 may include an Advanced Television Systems Committee-Mobile/Handheld (ATSC-M/H) channel transmitting/receiving unit 141a and an IP transmitting/receiving unit 141b.

The memory 150 may include at least one type of storage medium such as a flash memory type, a hard disk type, a multimedia card micro type, a card type memory such as SD or XD memory, Random Access Memory (RAM). Static Random Access Memory (SRAM), Read-Only Memory (ROM). Electrically Erasable Programmable Read-Only Memory (EEPROM), Programmable Read-Only Memory (PROM), magnetic memory, magnetic disk, and optical disk. The video display device 100 may operate in linkage with a web storage performing a storage function of the memory 150 in the Internet.

The memory 150 may include a content information storage unit 151, an enhanced service storage unit 152, a logo storage unit 153, a setting information storage unit 154, a bookmark storage unit 155, a user information storage unit 156, and a usage information storage unit 157.

The content information storage unit 151 stores a plurality of content information corresponding to a plurality of characteristic information.

The enhanced service storage unit 152 may store a plurality of enhanced services corresponding to a plurality of characteristic information or a plurality of enhanced services corresponding to a plurality of content information.

The logo storage unit 153 stores a plurality of logos. Additionally, the logo storage unit 153 may further store content provider identifiers corresponding to the plurality of logos or watermark server addresses corresponding to the plurality of logos.

The setting information storage unit 154 stores setting information for ACR.

The bookmark storage unit 155 stores a plurality of bookmarks.

The user information storage unit 156 stores user information. The user information may include at least one of at least one account information for at least one service, regional information, family member information, preferred genre information, video display device information, and a usage information range. The at least one account information may include account information for a usage information measuring server and account information of social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once the usage information range is set, the video display device 100 collects and reports main audio and video content watching information and enhanced service usage information within the set range. The usage information range may be set in each virtual channel. Additionally, the usage information measurement allowable range may be set over an entire physical channel.

The usage information providing unit 157 stores the main audio and video content watching information and the enhanced service usage information, which are collected by the video display device 100. Additionally, the video display device 100 analyzes a service usage pattern on the basis of the collected main audio and video content watching information and enhanced service usage information, and stores the analyzed service usage pattern in the usage information storage unit 157.

The enhanced service management unit 130 may obtain the content information of the main audio and video content from the fingerprint server 22 or the content information storage unit 151. If there is no content information or sufficient content information, which corresponds to the extracted characteristic information, in the content information storage unit 151, the enhanced service management unit 130 may receive additional content information through the data transmitting/receiving unit 141. Moreover, the enhanced service management unit 130 may update the content information continuously.

The enhanced service management unit 130 may obtain available enhanced service from the enhanced service providing server 50 or the enhanced service storage unit 153. If there is no enhanced service or sufficient enhanced service in the enhanced service storage unit 153, the enhanced service management unit 130 may update enhanced service through the data transmitting/receiving unit 141. Moreover, the enhanced service management unit 130 may update the enhanced service continuously.

The enhanced service management unit 130 may extracts a logo from the main audio and video content, and then, may make a query to the logo storage unit 155 to obtain a content provider identifier or watermark server address, which is corresponds to the extracted logo. If there is no logo or a sufficient logo, which corresponds to the extracted logo, in the logo storage unit 155, the enhanced service management unit 130 may receive an additional logo through the data transmitting/receiving unit 141. Moreover, the enhanced service management unit 130 may update the logo continuously.

The enhanced service management unit 130 may compare the logo extracted from the main audio and video content with the plurality of logos in the logo storage unit 155 through various methods. The various methods may reduce the load of the comparison operation.

For example, the enhanced service management unit 130 may perform the comparison on the basis of color characteristics. That is, the enhanced service management unit 130 may compare the color characteristic of the extracted logo with the color characteristics of the logos in the logo storage unit 155 to determine whether they are identical or not.

Moreover, the enhanced service management unit 130 may perform the comparison on the basis of character recognition. That is, the enhanced service management unit 130 may compare the character recognized from the extracted logo with the characters recognized from the logos in the logo storage unit 155 to determine whether they are identical or not.

Furthermore, the enhanced service management unit 130 may perform the comparison on the basis of the contour of the logo. That is, the enhanced service management unit 130 may compare the contour of the extracted logo with the contours of the logos in the logo storage unit 155 to determine whether they are identical or not.

Then, referring to FIGS. 11 and 12, a method of synchronizing a playback time of a main audio and video content with a playback time of an enhanced service according to an embodiment will be described.

FIG. 11 is a flowchart illustrating a method of synchronizing a playback time of a main audio and video content with a playback time of an enhanced service according to an embodiment.

Enhanced service information may include a start time of an enhanced service. At this point, the video display device 100 may need to start the enhanced service at the start time. However, since the video display device 100 receives a signal transmitting an uncompressed main audio and video content with no time stamp, the reference time of a plying time of the main audio and video content is different from that of a start time of the enhanced service. Although the video display device 100 receives a main audio and video content having time information, the reference time of a plying time of the main audio and video content may be different from that of a start time of the enhanced service, like rebroadcasting. Accordingly, the video display device 100 may need to synchronize the reference time of the main audio and video content with that of the enhanced service. Especially, the video display device 100 may need to synchronize the playback time of the main audio and video content with the start time of the enhanced service.

First, the enhanced service management unit 130 extracts a certain section of a main audio and video content in operation S801. The section of the main audio and video content may include at least one of some video frames or a certain audio section of the main audio and video content. Time that the enhanced service management unit 130 extracts the section of the main audio and video content is designated as Tn.

The enhanced service management unit 130 obtains content information of a main audio and video content on the basis of the extracted section. In more detail, the enhanced service management unit 130 decodes information encoded with invisible watermark in the extracted section to obtain content information. Additionally, the enhanced service management unit 130 may extract characteristic information in the extracted section, and obtain the content information of the main audio and video content from the fingerprint server 22 or the content information storage unit 151 on the basis of the extracted characteristic information. Time that the enhanced service management unit 130 obtains the content information is designated as Tm.

Moreover, the content information includes a start time Ts of the extracted section. After the content information acquisition time Tm, the enhanced service management unit 130 synchronizes the playback time of the main audio and video content with the start time of the enhanced service on the biases of Ts, Tm, and Tn. In more detail, the enhanced service management unit 130 regards the content information acquisition time Tm as a time Tp calculated by the following Equation 1.

$$Tp=Ts+(Tm-Tn) \qquad \text{[Equation 1]}$$

Additionally, the enhanced service management unit 130 regards a time of when Tx elapses after the content information acquisition time as Tp+Tx.

Then, the enhanced service management unit 130 obtains an enhanced service and its start time Ta on the obtained content information in operation S807.

If the synchronized playback time of the main audio and video content is identical to the start time Ta of the enhanced service, the enhanced service management unit 130 starts the obtained enhanced service in operation S809. In more detail, the enhanced service management unit 130 may start the enhanced service when the following Equation 2 is satisfied.

$$Tp+Tx=Ta \qquad \text{[Equation 2]}$$

FIG. 12 is a conceptual diagram illustrating a method of synchronizing a playback time of a main audio and video content with a playback time of an enhanced service according to an embodiment.

As shown in FIG. 12, the video display device 100 extracts an AV sample during a system time Tn.

The video display device 100 extracts characteristic information from the extracted AV sample, and transmits a query including the extracted characteristic information to the fingerprint server 22 to receive a query result. The video display device 100 confirms whether a start time Ts of the extracted AV sample corresponds to 11000 ms at Tm by parsing the query result.

Accordingly, the video display device 100 regards the time of when the start time of the extracted AV sample is confirmed according to Equation 1 as Ts+(Tm−Tn), so that, after that, the playback time of the main audio and video content may be synchronized with the start time of the enhanced service.

Next, an ACR application will be described according to various embodiments with reference to FIGS. 13 to 14.

The ACR application may include an auto playing application, a content provider application, and a video display manufacturer application.

FIG. 13 is a screen when an auto playing application is executed according to an embodiment.

The auto playing application automatically plays an enhanced service even when a user makes no action. In this sense, the auto playing application is designated as a lean back application in this specification.

The auto playing application automatically plays an enhanced service such as scene related information that a content provider or broadcasting station provides during playing of the main audio and video content according to a playback time of the main audio and video content, without a user's input. That is, a content provider or broadcasting station entirely controls the auto playing application. For example, when an auto playing application relates to a specific channel or a specific content, as the video display device 100 enters a channel or content relating to the auto playing application, the video display device 100 may automatically execute a corresponding auto playing application without a user input. Then, when the video display device 100 becomes out of a channel or content relating to an auto playing application, it may automatically terminate a corresponding auto playing application without a user input. In this sense, an auto playing application will be referred to as a channel-dependent application or a content-dependent application in this specification.

As shown in FIG. 13, once the auto playing application is executed, the screen 200 may include a sub screen 210 where a reduced main audio and video content is played and a sub screen 220 where additional information is displayed. The sub screen 200 where additional information is displayed may be spatially separated from the sub screen 210 where a main audio and video content is played.

Moreover, when an auto playing application is executed, an area where additional information is displayed may be semi-transparent. In this case, the area where additional information is displayed may overlay on an area where a main audio and video content played.

FIG. 14 is a screen when a content provider application is executed according to an embodiment.

In this specification, the content provider application is designated as a full interactive application.

As shown in FIG. 14 (A), the video display device 100 downloads and stores a plurality of applications. FIG. 14 (A) illustrates icons 230 of the applications. A content provider application among the plurality of applications is an application created and distributed by a content provider, and thus, may be under control of the content provider.

A user of the video display device 100 may download a content provider application from an application store and determines whether to execute the downloaded content provider application.

FIG. 14 (B) is a screen when a content provider application is executed. As shown in FIG. 14 (B), the screen 200 may include the sub screen 210 where a reduced main audio and video content is played and the sub screen 220 where additional information is displayed.

Hereinafter, a video display device manufacturer application will be described according to an embodiment with reference to FIGS. 23 to 50.

The video display device manufacturer application is created and controlled by a video display device manufacturer, and may be stored in advance when the video display device 100 is manufactured. That is, the video display device manufacturer application may provide the same service and user interface regardless of a content provider or content.

The video display device manufacturer application may include an area where an enhanced service that a content provider provides is displayed and an area where an enhanced service that a video display device manufacturer provides is displayed, separately. A user of the video display device 100 may determine whether to execute the video display device manufacturer application.

The video display device manufacturer application may have two types.

The video display device manufacturer application of the first type has a resizing user interface. The video display device manufacturer application having the resizing user interface reduces the size of an area where a main audio and video content is displayed to display all the main audio and video content in a reduced area. Additionally, the video display device manufacturer application having the resizing user interface reshapes an area where an application is displayed with an L or inverse-L shaped structure.

The video display device manufacturer application of the second type has an overlay user interface. The video display device manufacturer application having the overlay user interface maintains the size of an area where a main audio and video content is displayed, and overlaps an area where an application is displayed on the main audio and video content. Since the area where an application is displayed covers the main audio and video content, an application area may be semi-transparent.

Like this, a video display device manufacturer application is not dependent on any single contents provider or any single channel. Although it is described that such an application is manufactured by a video display device manufacturer, the present invention is not limited thereto. An application not dependent on any single contents provider or any single channel is not executed by a channel change or is not terminated by a channel change. For convenience of description in this specification, an application not dependent on any single content provider or any single channel may be referred to as a channel-independent application, a video display device manufacturer application or a Live+ app.

Then, an on/off control of an ACR function will be described according to an embodiment with reference to FIGS. 15 and 16.

FIG. 15 is a view of a user interface for controlling an ACR function according to an embodiment.

As shown in FIG. 15, the play controlling unit 113 displays an ACR function setting window. A user may activate or deactivate the ACR function through the ACR function setting window.

When the ACR function is activated, a user may select an ACR mode. The ACR mode may be set with one of an auto playing application mode, a content provider application mode, and a video display manufacturer application mode.

When the ACR function mode is set in the above manner, the play controlling unit 113 stores setting information on a setting information storage unit 154.

FIG. 16 is a flowchart illustrating a method of operating a video display device according to the embodiment.

The enhanced service management unit 130 confirms whether the ACR function is turned on in operation S1901.

If the ACR function is deactivated, the enhanced service management unit 130 does not perform a content information obtaining procedure any more.

If the ACR function is activated, the enhanced service management unit 130 extracts a certain section of a main audio and video content in operation S1902.

The enhanced service management unit 130 obtains content information of the main audio and video content on the basis of the extracted section in operation SI 903.

The enhanced service management unit 130 synchronizes the reference time of the main audio and video content with the reference time of an alternative advertisement in operation S1905.

The enhanced service management unit 130 obtains an enhanced service on the basis of the obtained content information in operation S1907. The enhanced service management unit 130 obtains enhanced service information on the basis of the content information, and then obtains an enhanced service on the basis of the enhanced service information.

Then, the enhanced service management unit 130 confirms the ACR mode in operation S1909.

The enhanced service management unit 130 plays the enhanced service according to the ACR mode in operation S1911.

In more detail, if the ACR mode is an automatic play application mode, the enhanced service management unit 130 executes an automatic play application, and the executed automatic play application plays the obtained enhanced service.

If the ACR mode is the content provider application mode, the enhanced service management unit 130 executes a content provider application corresponding to the obtained content information in background. The enhanced service management unit 130 displays a content provider application when receiving a user input corresponding to an enhanced service use. This content provider application may play the obtained enhanced service. Instead that the content provider application is automatically executed in background, it may be executed by a user input.

If the ACR mode is the video display device manufacturer application mode, the enhanced service management unit 130 executes its video display device manufacturer application in background. The enhanced service management unit 130 displays the video display device manufacturer application when receiving a user input corresponding to an enhanced service use. This video display device manufacturer application may play the obtained enhanced service. Instead that the video display device manufacturer application is automatically executed in background, it may be executed by a user input.

Next, third party enhanced service will be described according to an embodiment of the present invention with reference to FIGS. 17 to 42.

FIG. 17 is a view illustrating a network topology according to an embodiment of the present invention.

As shown in FIG. 17, the network topology includes a contents providing server 10 such as a Broadcaster/CP Backend server, a third party server 90 such as the enhanced service providing server 50, a contents recognition service providing server 20 such as an ACR server, and a video display device 100 such as an ACR Smart TV.

The video display device 100 may obtain broadcaster enhanced service from the contents providing server 10 by using a channel-dependent application or a Leanback app such as a contents-dependent application, and may obtain third party enhanced service from the third party server 90 by using a Live+ app such as a channel-independent application.

The Leanback app such as a channel-dependent application is an application that a broadcaster or a CP provides, and also provides a service synchronized by a program unit or a scene unit. Since a broadcaster is a subject to produce a program, it knows well which scene is in a program. Thus, the broadcaster may display the most suitable contents for a specific scene. Once the video display device 100 recognizes a program, it downloads a Leanback app from the contents providing server 10 of the corresponding program, and then, automatically executes the downloaded Leanback app. However, when the video display device 100 changes the current channel to another channel unrelated to the executed Leanback app, it automatically terminates the corresponding Leanback app, and if there is a Leanback app of the changed channel, it executes the corresponding Leanback app.

A Live+ app is an application that a third party provides (for example, a manufacturer), is pre-installed in a TV, and may be executed always regardless of a channel or program that a user currently watches, unlike the Leanback app. In relation to an ACR architecture that the present invention suggests, a Live+ app displays program related enhanced information and contents synchronized by a scene unit. The Live+ app has a consistent user interface and is always executed regardless of a program. The Live+ app may provide various services by using program related metadata even when a broadcaster does not provide program related additional information. For example, the Live+ app may provide basic information on a program and recommendation on movies in which a program actor appears. Since the Live+ app has an area assigned to a broadcaster/CP, it may display corresponding program related enhancement data on a corresponding area when the broadcaster provides program related additional information. For example, enhancement data that a broadcaster provides may include the replay of the previous broadcast of the program that a user currently watches and scene synchronized contents (for example, product purchase, place reservation, music source purchase and download, and product ad).

The video display device 100 includes an ACR module to extract a signature from uncompressed audio and video content and queries the contents recognition service providing server 20 through the extracted signature in order to recognize a program. Also, the video display device 100 drives a program related application on the basis of the recognized program. The Leanback app may be downloaded after the program recognition and then executed. The Live+ app may be pre-installed by a manufacturer when a TV is released, or may be downloaded from an app store and installed.

The contents recognition service providing server 20 stores the signatures of audio and/or video of a broadcasted program. The contents recognition service providing server 20 may extract and store the signature of a real-time broadcast by using a signature capture system, and may receive an ACR DB including a signature corresponding to a specific program from a broadcaster and then may store it. The ACR DB of the contents recognition service providing server 20 stores the content ID, signature, timestamp, and URL of a program. In this specification, two types of content IDs may be used.

The first type of content ID, as an ID that a broadcaster directly assigns, is an identifier that uniquely identifies a program in a broadcaster. The broadcaster may assign the content ID to the program in its desired format. The content ID may be used when program related enhancement data are requested to the content providing server 10.

The second type of content ID, as a global unique content ID, is an identifier that uniquely identifies a program nationally or globally. Since programs are transmitted through national broadcast channels, local broadcast channels, cable broadcasts, or satellite broadcasts, in order to extract the signatures of all the programs, a plurality of signature capture equipment may be installed in a plurality of areas. Also, in order to uniquely identify and distinguish each program nationally or globally, a global unique content ID may be assigned to each program. In order to map each program into a global unique content ID, a metadata database may be used. Since the metadata database includes program schedule information in addition to metadata such as program related additional information, the signature delivered from a capture system may be mapped into a certain program by using the metadata database. The capture system knows which area, channel, and time the extracted signature relates to, and thus, when the metadata database is searched with this information, a program may be found. The contents recognition service providing server 20 and the third party server 90 may share the metadata database, and may recognize a program through a global unique content ID by using the metadata database. The format of the global unique content ID may be designated by a third party operating a server, or may be provided from the metadata database.

All services that a Live+ app provides are provided from the third party server 90. The third party server 90 may receive a global unique content ID that the contents recognition service providing server 20 delivers, from the video display device 100. The third party server 90 may extract program related metadata corresponding to the global unique content ID from the metadata database through the global unique content ID, and on the basis of the extracted metadata, may provide program related various services to the video display device 100. Additionally, if there is additional information on the recognized program that a broadcaster provides, the third party server 90 accesses the broadcaster server in order to receive program related enhancement data, and processes and provides them to the video display device 100. The program related enhancement data that a broadcaster provides through a Live+ app have the same contents as but a different user interface from the enhancement data that a Leanback app. However, in another embodiment, according to broadcasters, the program related enhancement data that a broadcaster provides through a Live+ app may be different from those that a Leanback app provides.

There may be a plurality of contents providing servers 10 for a plurality of broadcasters or a plurality of CPs. The contents providing server 10 has a program targeted Leanback app and program related enhancement data that the Leanback app outputs.

FIG. 18 is a view illustrating a Live+ app according to various embodiments of the present invention.

The Live+ app may resize main AV media content in order to display it on the upper left area of the screen, may display program related additional information on the right area of the screen, and may display a program related ad on the bottom area of the screen. The Live+ app may display a plurality of tabs on the top area of the contents area in the right area. The plurality of tabs may include a program tab, a recommends tab, a talk tab, and a plus tap.

FIG. 19 is a view illustrating a method of executing a Live+ app according to various embodiments of the present invention.

The video display device 100 may display a home screen or a My Apps screen. The My Apps screen is a screen displaying a list of application installed in the video display device 100.

On receiving a user input selecting a Live+ app from a plurality of applications shown on the home screen or the My Apps screen, the video display device 100 may execute the Live+ app.

Additionally, while playing a broadcast, the video display device 100 may display a graphic notifying that there is a Live+ app at a predetermined time interval through a timer, and when receiving a user input relating to this graphic, may execute the Live+ app.

FIG. 20 is a view illustrating a tab function of a Live+ app according to an embodiment of the present invention.

The program tab provides basic information on a program that a viewer currently watches and the replay service of the program. The video display device 100 may fetch the program basic information from the Meta DB of the third party server 90. The video display device 100 may bring the information on the program replay service from the contents providing server 10 that creates a corresponding program, through the third party server 90.

The recommends tab may recommend another audio and video content relating to a current program, i.e. a movie or a video (for example, Youtube) or an app relating to the current program. The third party server 90 may determine a movie or a video for recommendation on the basis of the title, genre, or cast of the current program, and then may process the information about this to provide the recommendation tab of the Live+ app of the video display device 100.

The Talk tab provides a twitter article corresponding to the current program related conversation content. The third party server 90 may searches for the current program related twitter article on the basis of the title, genre, or cast of the current program, and then may process the searched article to provide the Talk tab of the Live+ app of the video display device 100.

The Plus tab is an area where a broadcaster displays the program related data. The Plug tab may provide information received from the broadcaster as it is, or may provide information that is received from a broadcaster server and processed by the third party server 90. There is no limit to the type and number of data that the Plus tab provides. The Plus tab may provide various enhancement data such as product purchase, place reservation, music source purchase, and product ad. However, when the information from a broadcaster server is provided to the Plus tab as it is, the third party server 90 processes the information from the broadcaster server to be fit for the position and size of the contents area of the Live+ app, and then provides the processed information to the video display device 100

FIG. 21 is a view illustrating an architecture of the third party server 90 according to an embodiment of the present invention.

As shown in FIG. 21, the third party server 90 includes an Application Layer, a Service Component Layer, a Back-end System Layer, and a Data Component Layer.

The application layer may communicate with various devices including the video display device 100 through a delivery interface. The application layer may include an AppStore component. The AppStore component may support an interface through which a developer registers an app, and also may support an interface through which a general user searches for, downloads, and installs an app. Additionally, the Live+ app may receive services such as ad, search, and recommendation in the third part server 90 through the AppStore component.

A service component layer may communicate with the application layer through a service integration interface. The service component layer includes an ad service component, an integration search component, a recommendation component, and an ACR component. The service component layer receives the processed data from the back-end system layer and delivers them to the application layer. The ACR component may obtain program related basic additional information through the metadata component of the back-end system layer by using the received Content ID, Global Content ID, timestamp, and broadcaster server URL from the video display device 100. Additionally, the ACR component may deliver the information on a program title and actors obtained from the metadata to the integration search component in order to a program related search result.

The back-end system layer reads original data from the data component layer and processes and delivers the data to the service component layer. The back-end system layer may include a search engine security component, a DRAM component, a metadata component, an ad platform component, and an ACR component.

The data component layer may have actual data. Here, the data component layer may include a file repository, an integrated DB, a user profile repository, a user profile repository, a metadata repository, and an ad data storage. The user profile repository may store information on a viewer or user's gender, age, region, income, family member, preferred genre, preferred channel, and preferred program. The metadata repository may include information on content's title, episode, director, synopsis, casts, genre, channel, and air time. The third party server 90 may receive information on a content from a metadata provider or real-time broadcast guide information (for example, in the case of ATSC terrestrial waves, PSIP), and then may store the received information in the metadata repository.

FIG. 22 is a ladder diagram illustrating an operation of a video display device for an automatic execution application according to an embodiment of the present invention.

First, the video display device 100 extracts characteristic information from some frames of the main audio and video content or a section of audio samples of the main audio and video content, and transmits an ACR query request message including the extracted characteristic information to a fingerprint server 22 corresponding to an ACR server in operation S2105.

The fingerprint server 22 queries characteristic information in the ACR query request message from an ACR DB to identify a program corresponding to the characteristic information, and provides an ACR query response message including contents information on the identified program to the video display device 100 in operation S2107. At this point, the ACR query response message may include information on whether program recognition is successful, contents information, and the URL of a Leanback app. As mentioned above, the content information may include the content ID and timestamp of the recognized program. Here, the format of the content ID may be a format that only a corresponding broadcaster recognizes. Especially, this is the case that a broadcaster provides the ACR DB of the corresponding program to the contents recognition service providing server 20.

When the program identification is successful and the Leanback app URL is valid, the video display device 100 requests a Leanback app through a corresponding Leanback app URL in operation S2109.

The contents providing server 10 provides the Leanback app that the video display device 100 requests to the video display device 100 in operation S2111. Consequently, the video display device 100 may download the Leanback app.

When the video display device 100 successfully downloads the Leanback app, it automatically executes a corresponding Leanback app in operation S2113.

The Leanback app executed in the video display device 100 obtains a content ID and a timestamp periodically from an ACR engine in the video display device 100, and transmits an enhancement data request message including the obtained content ID and timestamp to the contents providing server 10 in operation S2115, and then requests the enhancement data relating to a scene corresponding to the content ID and the timestamp.

The contents providing server 10 delivers the requested enhancement data to the Leanback app. Since the Leanback app is an application that a broadcaster provides, an interface of the contents providing server 10 of one broadcaster may be different from that of the contents providing server 10 of another broadcaster. When there is scene related additional information, the Leanback app may perform operations S2113 and S2117 repeatedly.

FIG. 23 is a ladder diagram illustrating an operation of a video display device for a channel-independent application according to an embodiment of the present invention.

On receiving a user input to execute an installed Live+ app, the video display device 100 executes the Live+ app in operation S2201.

When an ACR function is turned off, the Live+ app executed in the video display device 100 turns on the ACR module in operation S2203.

The video display device 100 extracts characteristic information from some frames of the main audio and video content or a section of audio samples of the main audio and video content, and transmits an ACR query request message including the extracted characteristic information to the ACR server corresponding to the fingerprint server 22 in operation S2205.

The fingerprint server 22 queries characteristic information in the ACR query request message from an ACR DB to identify a program corresponding to the characteristic information, and provides an ACR query response message including contents information on the identified program to the video display device 100 in operation S2207. At this point, the ACR query response message may include information on whether program recognition is successful and contents information. As mentioned above, the content information may include the global unique content ID and timestamp of the recognized program.

The Live+ app executed in the video display device 100 receives a user input for service type selection in operation S2209. At this point, the service type may correspond to at least one of a program type, a recommendation type, a conversation type, and a plus type. For example, enhancement data corresponding to the selected service type may be a real-time news article relating to cast members and a service recommending a movie in which a program cast member appears as a leading role.

The Live+ app executed in the video display device 100 obtains contents information on the currently recognized program from the ACR engine in the video display device 100, and transmits a program related content request message to the third party server 90 in operation S2211 in order to request enhancement data corresponding to the selected service type. At this point, the program related content request message may include content information on the currently recognized program and information on the selected service type.

The Live+ app may transmit an HTTP based request to the third party server 90 through ajax call. Parameters delivered at this point may include a service type, a Content ID, a Global Content ID, a timestamp, and a broadcaster server URL. The HTTP request may deliver a HTTP GET based parameter using the following syntax.

```
[HTTP GET syntax]
?service=<service name>&contentId=<Content ID>
&globalContentId=<Global Content ID>&ts=<timestamp>
[&url=<broadcaster server URL>]
```

<service name> is the name of a service that a Live+ app requests. In this embodiment, the following <service name> may be used.

"getProgram": is a service name for receiving program related basic information and previous episodes, and is used for a program tab of a Live+ app.

"getRecommends": is a service name for receiving data of program related recommendation (VOD recommendation and App recommendation), and is used for a recommends tab of a Live+ app.

"getTalk": is a service name for receiving program related article/twitter, and is used for a talk tab of a Live+ app.

"getPlus": is a service name for receiving program related enhancement data that a broadcaster provides, and is used for a plus tab of a Live+ app.

<Content ID> is a value that a broadcaster delivers to the contents recognition service providing server 20, and is a content ID that is internally used by a broadcaster in order to uniquely identify a program.

<Global Content ID> is used for uniquely and globally identifying a program, and for this, the contents recognition service providing server 20 and the third party server 90 may need to use the same Meta DB. The Global Content ID may follow the content id format of the Meta DB.

<timestamp> notifies the current watching time of the recognized program and is a value delivered from the contents recognition service providing server 20.

<broadcaster server URL> is delivered when a broadcaster provides program related enhancement data, and with this value, the third party server 90 may access a broadcaster server.

In order to locate enhancement data of a program corresponding to the delivered Global Content ID, the third party server 90 searches the metadata repository in operation S2213. The metadata repository returns a search result on the enhancement data of a program corresponding to the delivered Global Content ID, to the third party server 90.

The third party server 90 processes the received program enhancement data from the metadata repository and provides the processed enhancement data to the Live+ app executed in the video display device 100 in operation S2221. The third party server 90 may transmit the processed enhancement data in an HTTP based response through ajax call.

FIG. 24 is a ladder diagram illustrating an operation of a video display device for a channel-independent application according to another embodiment of the present invention.

On receiving a user input to execute an installed Live+ app, the video display device 100 executes the Live+ app in operation S2301.

When an ACR function is turned off, the Live+ app executed in the video display device 100 turns on the ACR module in operation S2203.

The ACR engine of the video display device 100 extracts characteristic information from some frames of the main audio and video content or a section of audio samples of the main audio and video content, and transmits an ACR query request message including the extracted characteristic information to the ACR server corresponding to the fingerprint server 22 in operation S2305.

The fingerprint server 22 queries characteristic information in the ACR query request message from an ACR DB to identify a program corresponding to the characteristic information, and provides an ACR query response message including contents information on the identified program to the ACR engine of the video display device 100 in operation S2307. At this point, the ACR query response message may include information on whether program recognition is successful, contents information, and the URL of the contents providing server 10. As mentioned above, the content information may include the global unique content ID of the recognized program and the content ID and timestamp that the broadcaster of the recognized program identifies. In another embodiment, the video display device 100 may have the URL of the contents providing server 10 in advance, not obtaining the URL from the ACR query response message.

The Live+ app executed in the video display device 100 receives a user input for service type selection in operation S2309. At this point, the service type may correspond to at least one of a program type, a recommendation type, a conversation type, and a plus type. For example, enhancement data corresponding to the selected service type may be a real-time news article relating to cast members and a service recommending a movie in which a program cast member appears as a leading role.

The Live+ app executed in the video display device 100 obtains contents information on the currently recognized program from the ACR engine in the video display device 100, and transmits a program related content request message to the third party server 90 in operation S2311 in order to request enhancement data corresponding to the selected service type. At this point, the program related content request message may include content information on the currently recognized program, information on the selected service type, and the URL of the broadcaster contents providing server 10.

In order to locate enhancement data of a program corresponding to the delivered Global Content ID, the third party server 90 searches the metadata repository in operation S2313. The metadata repository returns a search result on the enhancement data of a program corresponding to the delivered Global Content ID, to the third party server 90.

The third party server 90 accesses the delivered URL of the broadcaster contents providing server 10, and transmits a metadata request message including the delivered broadcaster content ID and timestamp to the contents providing server 10 in operation 2317 in order to request the current scene related enhancement data to the contents providing server 10.

The third party server 90 receives the current scene related enhancement data from the contents providing server 10 in operation S2319.

The third party server 90 processes one or a combination of the received program enhancement data from the metadata repository and the received program enhancement data from the contents providing server 10 and provides the processed enhancement data to the Live+ app executed in the video display device 100 in operation S2321.

FIG. 25 is a conceptual diagram illustrating a video display device according to an embodiment of the present invention.

As shown in FIG. 25, the video display device 100 includes an Audio/Video driver 601, an ACR engine 603, an ACR middleware 605, an ACR user interface 607, and an ACR Plugin 609.

The audio/video driver 601 captures an audio/vide signal from an external input of a TV and delivers it to the ACR engine 603. The audio/video driver 601 may provide API to allow the ACR engine 603 to access an audio/video buffer. The audio/video driver 601 may also provide characteristic information on audio/video inputted from an external input such as HDMI. For example, the audio/video driver 601 may provide information such as a sample depth, a sampling rate, the number of channels (mono/stereo 등), the number of samples, and a sample time, in the case of audio. In the case of video, the audio/video driver 601 may provide information such as a video format, and the width, height, stride, stream time, input type (HDMI1, HDMI2, composite, component, etc), and the number of frames per second of video.

The ACR engine 603 may be executed as an additional process, and may recognize a program by using the above mentioned various methods. The ACR engine 603 extracts a signature from an audio/video sample, and delivers the extracted signature to the ACR server to recognize content. As described above, the ACR engine 603 may call API to access an audio/video buffer depending on the implementation of a platform, and may deliver the audio/video stream captured by the audio/video driver 601 to an ACR process through a method such as a socket ACR engine 603 sends an ACR query request in addition to the signature to the ACR server, and receives an ACR query response including whether the content recognition is successful, a Content ID, a Global Content ID, a timestamp, a Leanback app URL, and a broadcaster server URL, from the ACR server. The ACR engine 603 may deliver the result from the ACR server to the ACR middleware 605.

The ACR middleware 605 is a module corresponding to the middleware of a DTV process, and processes an ACR control and an ACR query response from the ACR engine 603. The ACR middleware 605 controls ACR by executing or terminating an ACR process or starting or stopping the ACR engine 603. Additionally, the ACR middleware 605 stores values such as a Content ID, a Global Content ID, and a timestamp by parsing the ACR query response. The ACR middleware 605 may provide API to transmit the stored value to an ACR UI or may transmit the stored value to the ACR user interface 607 through a message queue and a global variable. Additionally, in order to deliver data such as a Content ID, a Global Content ID, and a timestamp to an ACR application such as a Live+ app or a Leanback app, the ACR middleware 605 may deliver the data to a web browser through Inter-Process Communication (IPC) of a shared memory and socket.

The ACR user interface 607 may display a UI to a user for ACR control of ACR On/Off, or may display information on the name and time of a recognized program to a user through a status bar UI of a TV.

When the ACR middleware 605 delivers data such as a Content ID, a Global Content ID, and a timestamp, which are to be delivered to an ACR application, to a browser, the ACR plugin 609 receives the data. The ACR plugin 609 may deliver a corresponding value to an ACR application through a Plugin Object Interface. An interface of the ACR plugin 609 according to an embodiment is shown below.

| | Name |
|---|---|
| Property | Readonly ACRMetadata metadata |
| | Readonly String backendURL |
| Method | backendURL getACRMetadata( ) |
| | String getBackendURL( ) |
| | Void NotifyACRAppLaunched(Boolean bApp, String url, String desc) |
| | Void SetAppInfo(String state, String url) |
| Event | function onContentChanged(String contentId) |
| | function onMediaTimeUpdated(Number mediaTime) |
| | function onAppShow(String state) |
| | function onAppHide( ) |

As mentioned above, the metadata provide basic metadata on a recognized program.

backendURL represents the URL of a broadcaster/CP server.

getACRMetadata( ) is a function for obtaining basic metadata on a recognized program and returns the same value as metadata Property.

getBackendURL( ) is a function for returning the URL of a broadcaster/CP server.

NotifyACRAppLaunched( ) is a function for notifying an application of a 2nd screen when the 2nd screen such as a mobile terminal and a TV are paired and an ACR application executes a specific URL or app on a TV.

SetAppInfo( ) is a function for notifying the current state of an ACR application and the app URL of a 2nd screen version of a corresponding application.

onContentChanged( ) is a callback function called when a recognized program is changed.

onMediaTimeUpdated( ) is a callback function called each time a timestamp is changed through ACR.

onAppShow( ) is a callback function called when an application in a 2nd screen moves to a TV, with the TV and 2nd screen paired.

onAppHide( ) is a callback function called when an application in a TV moves to a 2nd screen, with the TV and 2nd screen paired.

FIG. 26 is a block diagram illustrating a fingerprint based network topology according to another embodiment.

As shown in FIG. 26, the network topology further includes a video fingerprint server 23 and an audio fingerprint server 24.

The video fingerprint server 23 as shown in FIG. 26 does not edit a main audio and video content, but extracts visual video characteristic information from the main audio and video content and stores the extracted visual video characteristic information. Then, upon receiving video characteristic information from the video display device 100, the video fingerprint server 23 provides an identifier and time information of an audio and video content corresponding to the received video characteristic information.

The audio fingerprint server 24 as shown in FIG. 26 does not edit the main audio and video content, but extracts auditory audio characteristic information from the main audio and video content and stores the extracted auditory audio characteristic information. Then, upon receiving audio characteristic information from the video display device 100, the audio fingerprint server 24 provides an identifier and time information of an audio and video content corresponding to the received audio characteristic information.

Here, when the video characteristic information and the audio characteristic information are simultaneously used, the video display device 100 as shown in FIG. 26 may separately access the video fingerprint server 23 or the audio fingerprint server 24.

FIG. 27 is a block diagram illustrating a fingerprint based network topology according to another embodiment.

As illustrated in FIG. 27, the network topology further includes a fingerprint server 22 that stores video characteristic information and audio characteristic information.

The fingerprint server 22 as shown in FIG. 27 does not edit a main audio and video content, but extracts visual video characteristic information or auditory audio characteristic information from the main audio and video content and stores the extracted visual video characteristic information or auditory audio characteristic information. Then, upon receiving video characteristic information from the video display device 100, the fingerprint server 22 provides an identifier and time information of an audio and video content corresponding to the received video characteristic information, or, upon receiving audio characteristic information from the video display device 100, the fingerprint server 22 provides an identifier and time information of an audio and video content corresponding to the received audio characteristic information.

Here, even though the video characteristic information and the audio characteristic information are simultaneously used, the video display device 100 as illustrated in FIG. 27 may access the single fingerprint server 22.

FIG. 28 is a block diagram illustrating a structure of a fingerprint based video display device according to another embodiment.

Referring to FIG. 28, a tuner/demodulator/demux 301 restores an analog audio video signal from a received terrestrial broadcast signal (RF), and transmits the restored analog audio video signal to an ADC/AV decoder 303.

The ADC/AV decoder 303 converts an analog audio video signal, an analog video signal or an analog audio signal into a digital analog audio video signal, a digital video signal or a digital audio signal, and then decodes the digital signals.

The analog audio video signal may be, for example, the analog audio video signal restored by the tuner/demodulator/demux 301. The analog video signal may be, for example, an analog video signal (Composite/S-video/Component/RGB) transmitted from an external input device. The analog audio signal may be, for example, an analog audio signal (Audio) transmitted from the external input device.

A digital signal processor 305 processes a digital audio video signal, a digital video signal or a digital audio signal.

The digital signal processor 305 may process the digital audio video signal, the digital video signal or the digital audio signal decoded by the ADC/AV decoder 303. Furthermore, the digital signal processor 305 may process at least one of a digital audio video signal, a digital video signal and a digital audio signal transmitted from an external input device through a high definition multimedia interface (HDMI) or a digital video interactive (DVI).

The digital signal processor 305 captures an audio stream to generate an audio sample, and then transmits the generated audio sample to an audio FP module 307. The digital signal processor 305 captures a video stream to generate a video sample, and then transmits the generated video sample to a video FP module 309. The digital signal processor 305 transmits screen information to a display 321.

The audio FP module 307 analyzes and processes the audio sample to extract audio characteristic information (Audio Signature).

The video FP module 309 analyzes and processes the video sample to extract video characteristic information (Video Signature).

A network I/F 311 makes a query on content information of a main audio and video content that is currently played while transmitting the audio characteristic information (Audio Signature) to the above-described audio fingerprint server 24 or fingerprint server 22 capable of providing an audio fingerprint service, and receives a result of the query from the audio fingerprint server 24 or the fingerprint server 22 (Query/Response).

A network I/F 313 makes a query on content information of a main audio and video content that is currently played while transmitting the video characteristic information (Video Signature) to the above-described video fingerprint server 23 or fingerprint server 22 capable of providing a video fingerprint service, and receives a result of the query from the video fingerprint server 23 or the fingerprint server 22 (Query/Response).

The audio query result parser 315 analyzes a query result transmitted from the audio fingerprint server 24 or the fingerprint server 22 capable of providing the audio fingerprint service, and extracts metadata required by the video display device 100.

The video query result parser 317 analyzes a query result transmitted from the video fingerprint server 23 or the fingerprint server 22 capable of providing the video fingerprint service, and extracts metadata required by the video display device 100.

The metadata storage 319 stores the extracted metadata.

The display 321 displays scene related information on a screen.

FIG. 29 illustrates a user interface for controlling a fingerprint function according to an embodiment.

As shown in FIG. 29, the play controlling unit 113 displays a fingerprint function setting window. A user may activate or deactivate the fingerprint function through the fingerprint function setting window.

When the fingerprint function is activated, the user may select a fingerprint setting mode. The fingerprint setting mode according to an embodiment may be set as one of a manual setting mode and an automatic setting mode.

When the manual setting mode is activated, the user may select a signature mode. The signature mode according to an embodiment may be set as one of an audio signature mode, a video signature mode, and an audio and video signature mode.

Furthermore, when the manual setting mode is activated, the user may select a signature transmission period. The signature transmission period may be changed according to a function of the video display device 100, and the video display device 100 may automatically set the signature transmission period. In the case where the video display device 100 automatically sets the signature transmission period, the video display device 100 may set a predetermined default value as the signature transmission period, or may set the signature transmission period according to a state of an environment of a network where a signature is transmitted.

When the automatic setting mode is activated, the user may select a signature mode. The signature mode according to an embodiment may be set as one an audio preferred mode, a video preferred mode, and a concurrent audio and video mode.

According to the audio preferred mode, a query including video characteristic information is transmitted when a result of a query on audio characteristic information is a failure (Audio first, then Video Fingerprinting). According to the video preferred mode, a query including audio characteristic information is transmitted when a result of a query on video characteristic information is a failure (Video first, then Audio Fingerprinting). According to the concurrent audio and video mode, the query including the audio characteristic information and the query including the video characteristic information are concurrently transmitted (Fingerprinting concurrently). The signature transmission period at the signature mode according to an embodiment may be automatically set by the video display device 100 as described above, but is not limited thereto.

When a mode of the fingerprint function is set as described above, the play controlling unit 113 stores setting information in the setting information storage unit 154.

In the case where the query including the audio characteristic information and the query including the video characteristic information are concurrently transmitted, the use of resources of the video display device 100 may increase, degrading the performance of the device. In order to prevent the performance degradation of the video display device 100, the signature transmission period may need to be changed according to a state of an environment of a network. Hereinafter, the change of the signature transmission period according to an embodiment will be described with reference to FIGS. 30 and 31.

FIG. 30 is a graph illustrating a change of a fingerprint period according to an embodiment.

Referring to FIG. 30, the video display device 100 sets a period of A fingerprint (A FP) and a period of B fingerprint (B FP) so that both the periods are short when content is not recognized, and increases the period of the B fingerprint (B FP) when the content is recognized so as to reduce the use of resources of the video display device 100. Here, the A fingerprint (A FP) or the B fingerprint (B FP) may represent the audio characteristic information or the video characteristic information, and the period of the A fingerprint (A FP) and the period of the B fingerprint (B FP) may represent the signature transmission period.

FIG. 31 is a graph illustrating a change of a fingerprint period according to another embodiment.

Referring to FIG. 31, the video display device 100 may increase both the period of the A fingerprint (A FP) and the period of the B fingerprint (B FP) after recognition of content, and then may decrease only the period of the A fingerprint (A FP) if B fingerprinting fails. Here, the B fingerprinting may represent transmission of a query including the audio characteristic information or the video characteristic information, and the failure of the B fingerprinting may represent a failure of a result of a query on the audio characteristic information or the video characteristic information.

As a result, according to the change of the fingerprint period according to an embodiment, the video display device 100, to which a plurality of fingerprinting operations are applied, reduces the use of resources for failed fingerprinting and increases the use of resources for successful fingerprinting, thereby improving the efficiency of recognizing content.

When a fingerprint is used to obtain content information, various factors may affect the use of the fingerprint, and various settings may be applied according to situations. To this end, setting information for fingerprint based ACR may also be stored in the above-described storage unit 154. In the case where the video characteristic information and the audio characteristic information are concurrently used based on the setting information for ACR, a method of combining the video characteristic information and the audio characteristic information may be derived. The setting formation for ACR may be obtained through user input or detection of the video display device 100, or may be provided from the content recognition service providing server 20 such as the content providing server or the fingerprint server.

The play controlling unit 113 may operate based on the setting information for ACR stored in the setting information storage unit 154. Alternatively, the play controlling unit 113 may operate based on information that affects ACR operation, wherein the information is provided from the outside, for example, the content providing server 10 or the fingerprint server 22.

The setting information for ACR may include information on signal input according to a type of an external input interface, information on a period of signature transmission, information on a sampling window that is a video characteristic information extraction region, and information on priority determination for the case where a query result corresponding to the audio characteristic information is different from that corresponding to the video characteristic information.

The information on the signal input according to the type of the external input interface may include information indicating whether signals respectively inputted through a plurality of external input interfaces include audio signals and video signals and format information on each of the audio signals and the video signals.

The video display device 100 may operate based on the information indicating whether the signals respectively inputted through the plurality of external input interfaces include the audio signals and the video signals. For example, the video display device 100 may extract and use only the video characteristic information from a signal received from a first external input interface, based on information indicating that the signal inputted through the first external input interface does not include an audio signal. Furthermore, the video display device 100 may more rapidly perform content recognition operation using the format information on each of the audio signals and the video signals stored in the setting information storage unit 154.

The video display device 100 may collect and store, according to the type of the external input interface, the information on the signal input according to the type of the external input interface, and may store information on a most recently inputted signal. Furthermore, in the case where an external input device connected to the external input interface is identifiable, the video display device 100 may also store information on signal input according to a type of each external input device. For example, since the video display device 100 may obtain information on an external input device connected through an HDMI, the video display device 100 may store information on the external input device according to a type of the external input device. In the case where information on an external input device is unobtainable, the video display device 100 may store information on a most recently inputted signal.

The information on the period of signature transmission may represent information indicating how frequently signature transmission is performed, and may be set as a time period such as 5 seconds. The signature transmission period may include not only a basic signature transmission period but also a period of combining and using the video characteristic information and the audio characteristic information in the case where the video characteristic information and the audio characteristic information are concurrently used. When the video characteristic information is used as a signature, a content recognition speed of the video display device 100 is high. On the contrary, consumption of resources such as CUP usage increases due to processing of a large amount of data. Therefore, the signature transmission period may be dynamically set in order to appropriately control the content recognition speed and the resource consumption of the video display device 100, and information on the signature transmission period setting may be stored as the setting information for ACR.

The information on the signature transmission period may include, for example, information indicating that the video characteristic information is used or the video characteristic information and the audio characteristic information are concurrently used for initial content recognition, information indicating that a transmission period of the video characteristic information is gradually increased after content recognition provided that it is confirmed that the same service or the same content is being viewed through the audio characteristic information, and information indicating that correct content recognition is immediately attempted through the video characteristic information or the video characteristic information and the audio characteristic information when a change of the service or the content that is being viewed is detected through the audio characteristic information. Here, the transmission period of the video characteristic information may be increased in such a manner that, for example, the period is 5 seconds within 5 minutes from the time of viewing the same content, the period is increased to 10 seconds within 10 minutes after a lapse of 5 minutes from the time of viewing the same content, the period is increased to 20 seconds within 15 minutes after a lapse of 10 minutes from the time of viewing the same content, and the period is increased two times as a viewing time increases by 5 minutes after a lapse of 15 minutes from the time of viewing the same content. However, the transmission period of the video characteristic information is not limited thereto.

The information on the sampling window that is the video characteristic information extraction region may be designated according to GUI characteristic information on broadcast receiving devices that are different from each other according to business operators. That is, when the query result corresponding to the video characteristic information transmitted from the video display device 100 is a failure, the fingerprint server 22 may analyze a pattern history of the video display device 100 to estimate an operator of a broadcast receiving device or multichannel video distributor, and may designate the sample window in consideration of the GUI characteristic information on the broadcast receiving device or the multichannel video distributor of the operator. Therefore, the video display device 100 may use different sampling windows according to a type of the video display device 100 and a type of the broadcast receiving device or the multichannel video distributor. The video display device 100 may store information on the sampling window as the setting information for ACR, and then may request a query including the sampling window.

The information on the priority determination for the case where the query result corresponding to the audio characteristic information is different from that corresponding to the video characteristic information may include a method of pre-designating information to be determined as a priority or a method of calculating information to be determined as a priority through an algorithm. In particular, in the case where the method of pre-designating one piece of information is different from the method of determining priority information through an algorithm, the video display device 100 may determine any one type of information as a signature based on the information on the priority determination stored as the setting information for ACR.

FIG. 32 is a ladder diagram illustrating a data flow for content recognition in a fingerprint based network topology according to an embodiment.

The content providing server 10 such as a broadcaster/CP extracts a fingerprint of content and determines an ACR query period in operation S2401.

The broadcaster/CP may establish an ACR DB for all programs possessed by the broadcaster/CP, or may establish the ACR DB for a specific program. In the case where the ACR DB is established for a specific program, for example, a popular program possessed by the broadcaster/CP, a server maintaining cost may be reduced, and a time taken for making an inquiry for program identification may be reduced.

The broadcaster/CP may extract a fingerprint of a program using a tool provided by an ACR operator, may determine the ACR query period of the program, and then may store the ACR query period with the extracted fingerprint.

The ACR query period of the program may be determined according to a characteristic of content.

For example, the ACR query period may be determined according to whether an additional service related to the content exists. In the case where the additional service related to the service does not exist, the ACR query period may be determined as a time at which the program is finished. On the contrary, in the case where the additional service related to the service exists, the ACR query period may be more shortened. It there is no additional service related to the content, the ACR query is transmitted only when the program is finished so as not to transmit an unnecessary ACR query, and thus, the cost may be reduced. On the contrary, if there is the additional service related to the content, the ACR query period is set to be short so as to provide the additional service synchronized with the program.

For another example, the ACR query period may be determined according to a purpose of the ACR query, such as audience measurement of a broadcaster. Therefore, even though there is no additional service related to the content, the broadcaster may determine the ACR query period as a short time, for example, 3 seconds, in order to perform the audience measurement.

As described above, the content providing server 10 may differently determine the ACR query period so that the ACR query period is suitable for the purpose of using the ACR query of a broadcaster or characteristics of content, for each channel or each content.

Thereafter, the content providing server 10 transmits the extracted fingerprint and the determined ACR query period to the fingerprint server 22 in operation S2403. Here, the content providing server 10 maps a content ID for the program to the fingerprint in order to transmit the fingerprint.

The content providing server 10 may transmit the fingerprint and the ACR query period before the program is broadcasted or at the same time as the extraction of the fingerprint. For example, the broadcaster/CP may transmit the fingerprint for a pre-produced program and the ACR query period to the fingerprint server 22 before the program is broadcasted. Alternatively, in the case where a live program is broadcasted, the broadcaster/CP may extract the fingerprint for the live program in real time, and then may transmit the extracted fingerprint and the ACR query period to the fingerprint server 22.

The fingerprint server 22 stores the received fingerprint and the ACR query period in operation S2405. The fingerprint server 22 may store the content ID, the time stamp, the fingerprint and the ACR query period of the program in the ACR DB.

Thereafter, the video display device 100 extracts a fingerprint from an audio sample of a partial frame or a partial interval of the main audio and video content, and transmits an ACR query request message including the extracted fingerprint to the fingerprint server 22 corresponding to an ACR server in operation S2407.

The fingerprint server 22 queries the fingerprint included in the ACR query request message from the ACR DB to identify a program corresponding to the fingerprint, and provides an ACR query response message including a first ACR query period for the identified program to the video display device 100 in operation S2409. Here, the ACR query response message may include various types of content information in addition to the first ACR query period. Hereinafter, examples of the content information on the program included in the ACR query response message will be described with reference to FIG. 33 and Table 5.

FIG. 33 is an XML schema diagram of ACR-Resulttype containing a query result according to another embodiment.

As shown in FIG. 33, ACR-Resulttype containing a query result includes ResultCode attributes and Content ID, NTP-Timestamp, QueryInterval and Confidence elements.

For example, if the ResultCode attribute has a value of 200, this may mean that the query result is successful. If the ResultCode attribute has a value of 404, this may mean that the query result is unsuccessful.

The NTPTimestamp element may include at least one of a start time and an end time of a content section from which a fingerprint is extracted.

The QueryInterval element represents the ACR query period, and indicates a transmission time of a next ACR query. The next ACR query time may represent an absolute time or a relative time. The absolute ACR query time may represent a time at which the next ACR query is to be transmitted, and the relative ACR query time may represent a wait time until the next ACR query is transmitted.

The Confidence element represents the accuracy of content recognition. The Confidence element may have a value of one of 0 to 100 according to a degree of mapping. For example, when it is confirmed that a fingerprint is correctly mapped to a program, the Confidence element may have a value of 100.

Table 5 illustrates an XML schema of ACR-ResultType containing the query result.

Hereinafter, FIG. 32 is described again.

Thereafter, after a lapse of the time corresponding to the first ACR query period, if the video display device 100 extracts a fingerprint from an audio sample of another partial frame or another partial section of the main audio and video content, and transmits an ACR query request message including the extracted fingerprint to the fingerprint server 22 corresponding to an ACR server in operation S2411, the fingerprint server 22 queries the fingerprint included in the ACR query request message from the ACR DB to identify a program corresponding to the fingerprint, and provides an ACR query response message including a second ACR query period for the identified program to the video display device 100 in operation S2413.

Furthermore, after a lapse of the time corresponding to the second ACR query period, if the video display device 100 extracts a fingerprint from an audio sample of another partial frame or another partial section of the main audio and video content, and transmits an ACR query request message including the extracted fingerprint to the fingerprint server 22 corresponding to an ACR server in operation S2415, the fingerprint server 22 queries the fingerprint included in the ACR query request message from the ACR DB to identify a program corresponding to the fingerprint, and provides an ACR query response message including a third ACR query period for the identified program to the video display device 100 in operation S2417.

Here, the first to third ACR query periods may be the same or different from each other.

Hereinafter, a method of determining an ACR query period according to an embodiment will be described with reference to FIG. 34 and Tables 6 and 7.

FIG. 34 is a diagram illustrating a fingerprint period of each of a plurality of video display devices included in a fingerprint based network topology according to an embodiment.

Referring to FIG. 34, program A represents a one-hour program without a related additional service, and program B represents a 30-minute program with a related additional service. A broadcaster accordingly establishes an ACR DB for the program A and the program B, wherein an ACR query frequency for the program A is set to be minimum, whereas the ACR query frequency for the program B that is a popular program is set higher.

Referring to FIG. 34, when a channel is changed at a first time point t1 to start playback of the program A, a first video display device (device 1) receives an ACR query response as illustrated in Table 6 from the fingerprint server 22.

TABLE 5

```
<?xml version="1.0" encoding="UTF-8"?>
<xs:schema xmlns:xs="http://www.w3.org/2001/XMLSchema"elementFormDefault="qualified"
    attributeFormDefault="unqualified">
    <xs:complexType name="ACR-ResultType">
        <xs:sequence>
            <xs:element name="ContentID" type="xs:anyURI"/>
            <xs:element name="NTPTimestamp" type="xs:unsignedLong"/>
            <xs:element name="QueryInterval" type="xs:unsignedInt" minOccurs="0"/>
            <xs:element name="Confidence" Type="xs:unsignedInt" minOccurs="0"/>
            <xs:element name="##other" processContents="skip" minOccurs="0" maxOccurs="unbounded"/>
        </xs:sequence>
        <xs:attribute name="ResultCode" type="xs:string" use="required"/>
        <xs:anyAttribute processContents="skip"/>
    </xs:complexType>
</xs:schema>
```

TABLE 6

```
<ACR-Result ResultCode= "200" >
    <ContentID>ProgramA</ContentID>
    <NTPTimestamp>900000</NTPTimestamp>
    <QueryInterval>2700</QueryInterval>
    <Confidence>100</Confidence>
</ACR-Result>
```

Referring to Table 6, QueryInterval represents a relative ACR query time to wait until a next ACR query is transmitted, and has a unit of second. NTPTimestamp which represents a current playback time of content may be displayed as a relative time with respect to a start time of the content and has a unit of millisecond. The representations and units of QueryInterval and NTPTimestamp are the same in Table 7 and FIG. 9.

Referring to Table 6, the first video display device (device 1) may request a next ACR query at a time point t3a at which 2700 seconds, i.e., 45 minutes, elapse after reception of an ACR query response. It may be understood that 900000 milliseconds, i.e., 15 minutes, elapse at a current view time point of the first video display device (device 1) from the start time of the program A.

Referring back to FIG. 34, when a channel is changed at a second time point t2 to start playback of the program A, a second video display device (device 2) receives an ACR query response as illustrated in Table 7 from the fingerprint server 22.

TABLE 7

```
<ACR-Result ResultCode= "200" >
    <ContentID>ProgramA</ContentID>
    <NTPTimestamp>2700000</NTPTimestamp>
    <QuetyInterval>905</QueryInterval>
    <Confidence>100</Confidence>
</ACR-Result>
```

Referring to Table 7, the second video display device (device 2) may request a next ACR query at a time point t3b at which 905 seconds, i.e., 15 minutes and 5 seconds, elapse after reception of an ACR query response. It may be understood that 2700000 milliseconds, i.e., 45 minutes, elapse at a current view time point of the second video display device (device 2) from the start time of the program A.

Here, in order to prevent a plurality of ACR queries from being concurrently transmitted from the plurality of video display devices, a broadcaster may differently determines ACR query periods for the video display devices. For example, as shown in Tables 6 and 7, the ACR query periods may be set so that there is a time difference of 5 seconds between the time at which the first video display device (device 1) transmits a next ACR query and the time at which the second video display device (device 2) transmits a next ACR query.

Referring back to FIG. 34, when the first video display device (device 1) requests a next ACR query at the time point t3a, the first video display device (device 1) receives an ACR query response as shown in Table 8 from the fingerprint server 22. Here, the time point t3a may be a playback start time point of the program B.

TABLE 8

```
<ACR-Result ResultCode= "200" >
    <ContentID>ProgramB</ContentID>
```

TABLE 8-continued

```
    <NTPTimestamp>0</NTPTimestamp>
    <QueryInterval>300</QueryInterval>
    <Confidence>100</Confidence>
</ACR-Result>
```

Referring to Table 8, the first video display device (device 1) may request a next ACR query at a fourth time point t4 at which 300 seconds, i.e., 5 minutes, elapse after reception of an ACR query response. It may be understood that a current view time point of the first video display device (device 1) is a start time point of the program B.

Referring back to FIG. 34, when the second video display device (device 2) requests a next ACR query at the time point t3b, the second video display device (device 2) receives an ACR query response as shown in Table 9 from the fingerprint server 22. Here, 5 seconds may elapse at the time point t3b after start of playback of the program B.

TABLE 9

```
<ACR-Result ResultCode= "200" >
    <ContentID>ProgramB</ContentID>
    <NTPTimestamp>5000</NTPTimestamp>
    <QueryInterval>300</QueryInterval>
    <Confidence>100</Confidence>
</ACR-Result>
```

Referring to Table 9, the second video display device (device 2) may request a next ACR query at a time point (not illustrated) at which 300 seconds, i.e., 5 minutes, elapse after reception of an ACR query response. It may be understood that 5000 milliseconds, i.e., 5 minutes, elapse at a current view time point of the first video display device (device 1) from the start time of the program B.

FIG. 35 is a ladder diagram illustrating a data flow for content recognition in a fingerprint based network topology according to another embodiment.

The content providing server 10 such as a broadcaster/CP extracts a fingerprint of content and determines a fingerprint type in operation S2501.

The broadcaster/CP may extract a fingerprint of a program using a tool provided by an ACR operator, may determine the fingerprint type of the program, and then may store the fingerprint type with the extracted fingerprint.

The fingerprint type of the program may be determined as a type including at least one of a video fingerprint and an audio fingerprint.

Thereafter, the content providing server 10 transmits the extracted fingerprint and the determined fingerprint type to the fingerprint server 22 in operation S2503. Here, the content providing server 10 maps a content ID for the program to the fingerprint in order to transmit the fingerprint.

The content providing server 10 may transmit the fingerprint and the fingerprint type before the program is broadcasted or at the same time as the extraction of the fingerprint. For example, the broadcaster/CP may transmit the fingerprint for a pre-produced program and the fingerprint type to the fingerprint server 22 before the program is broadcasted. Alternatively, in the case where a live program is broadcasted, the broadcaster/CP may extract the fingerprint for the live program in real time, and then may transmit the extracted fingerprint and the fingerprint type to the fingerprint server 22.

The fingerprint server 22 stores the received fingerprint and the fingerprint type in operation S2505. The fingerprint server 22 may store the content ID, the time stamp, the fingerprint and the fingerprint type of the program transmitted from the broadcaster in an ACR DB.

Thereafter, the video display device 100 extracts a fingerprint from an audio sample of a partial frame or a partial interval of the main audio and video content, and transmits an ACR query request message including the extracted fingerprint to the fingerprint server 22 corresponding to an ACR server in operation S2507.

Here, the fingerprint extracted by the video display device 100 may be a default-type fingerprint. The default type of the fingerprint extracted by the video display device 100 may be different according to a broadcaster possessing the corresponding content, and the default types of the fingerprints extracted by the plurality of video display devices included in a network may be different from each other.

The fingerprint server 22 queries the fingerprint included in the ACR query request message from the ACR DB to identify a program corresponding to the fingerprint, and provides an ACR query response message including a next fingerprint type for the identified program to the video display device 100 in operation S2509.

Here, the ACR query response message may include various types of content information in addition to the next fingerprint type. Hereinafter, examples of the content information on the program included in the ACR query response message will be described with reference to FIG. 36 and Table 10.

FIG. 36 is an XML schema diagram of ACR-Resulttype containing a query result according to another embodiment.

As shown in FIG. 36, ACR-Resulttype containing a query result includes ResultCode attributes and Content ID, NTP-Timestamp, NextFPType and Confidence elements.

For example, if the ResultCode attribute has a value of 200, this may mean that the query result is successful. If the ResultCode attribute has a value of 404, this may mean that the query result is unsuccessful.

The NTPTimestamp element may include at least one of a start time and an end time of a content section from which a fingerprint is extracted.

The NextFPType element represents a next fingerprint type, i.e., a type of a fingerprint to be extracted by the video display device 100 and mapped in the fingerprint server 22. The NextFPType element may represent a fingerprint type of a corresponding program predetermined by a broadcaster according to a characteristic of content, in operation S2501. Here, the next fingerprint type may be a type including at least one of a video fingerprint and an audio fingerprint. According to the characteristic of content, a single fingerprint type may be determined for a single piece of content, or a plurality of different fingerprint types may be determined according to a time stamp for a single piece of content.

The Confidence element represents the accuracy of content recognition. The Confidence element may have a value of one of 0 to 100 according to a degree of mapping. For example, when it is confirmed that a fingerprint is correctly mapped to a program, the Confidence element may have a value of 100.

Table 10 illustrates an XML schema of ACR-ResultType containing the query result.

TABLE 10

```
<?xml version="1.0" encoding="UTF-8"?>
<xs:schema
xmlns:xs="http://www.w3.org/2001/XMLSchema"elementFormDefault
="qualified" attributeFormDefault="unqualified">
    <xs:complexType name="ACR-ResultType">
        <xs:sequence>
            <xs:element name="ContentID"type="xs:anyURI"/>
            <xs:element
            name="NTPTimestamp"type="xs:unsignedLong"/>
            <xs:element name="NextFptype"type="xs:string"
            minOCCurs="0"/>
            <xs:element
            name="Confidence"type=type="xs:unsignedIat"
            minOCCurs="0"/>
            <xs:any namespace="##other" processContents="skip"
            minOccurs="0"
maxOccurs="unbounded"/>
        </xs:sequence>
        <xs:attribute name="ResultCode" type="xs:string"
        use="required"/>
        <xs:anyAttribute processContents="skip"/>
    </xs:complexType>
</xs:schema>
```

Hereinafter, FIG. 35 is described again.

Thereafter, the video display device 100 extracts a fingerprint from an audio sample of a partial frame or a partial interval of the main audio and video content, and transmits an ACR query request message including the extracted fingerprint to the fingerprint server 22 corresponding to an ACR server in operation S2511.

Here, the fingerprint extracted by the video display device 100 may be a fingerprint of the next fingerprint type included in the ACR query response message received in operation S2509.

The fingerprint server 22 queries the fingerprint included in the ACR query request message received in operation S2511 from the ACR DB to identify a program corresponding to the fingerprint, and provides an ACR query response message including a next fingerprint type for the identified program to the video display device 100 in operation S2513.

Hereinafter, a criterion for determining a fingerprint type and an ACR query response according to an embodiment will be described with reference to FIGS. 13 to 15.

Firstly, in the case where similar videos are broadcasted through various channels, such as sports broadcast, it is difficult to identify a program using the video characteristic information. However, since the similar videos may have different audio signals due to different sports commentaries of broadcasters, a program may be identified using the audio characteristic information. Therefore, each broadcaster may predetermine the fingerprint type as an audio fingerprint.

In this first case, if a program becomes a subject of viewing due to start of the program or channel switch, the video display device 100 such as a TV transmits an ACR query request message including a fingerprint extracted from the program to the fingerprint server 22. Here, the video display device 100 may extract a fingerprint of a predetermined default type or may extract both an audio fingerprint and a vide fingerprint.

The fingerprint server 22 that has received the ACR query request message queries the fingerprint included in the ACR query request message from an ACR DB to identify a program corresponding to the fingerprint, and provides an ACR query response message including a predetermined next fingerprint type of the identified program to the video display device 100. Table 11 illustrates the ACR query response provided from the fingerprint server 22 to the video display device 100 in the first case.

TABLE 11

```
<ACR-Result ResultCode= "200" >
    <ContentID>Program1</ContentID>
    <NTPTimestamp>900000</NTPTimestamp>
    <NextFPType>audio</NextFPType>
    <Confidence>100</Confidence>
</ACR-Result>
```

As shown in Table 11, the next fingerprint type of the first case is an audio fingerprint type.

Secondly, in the case where a ceremony of a national holiday or a speech is broadcasted or a syndicated program purchased from another broadcaster that has produced and broadcasted the program is broadcasted, the content itself may be identified through an audio signal. However, since a broadcaster cannot be identified, the content according to the broadcaster cannot be identified.

For this second case, it may be necessary to identify content and a broadcaster logo using a video fingerprint. Alternatively, the content may be identified using an audio fingerprint and the broadcaster logo may be additionally identified using a video fingerprint. However, an embodiment is not limited thereto.

Table 12 illustrates the ACR query response provided from the fingerprint server 22 to the video display device 100 in the second case.

TABLE 12

```
<ACR-Result ResultCode= "200" >
    <ContentID>Program2</ContentID>
    <NTPTimestamp>900000</NTPTimestamp>
    <NextFPType>audioandvideo</NextFPType>
    <Confidence>100</Confidence>
</ACR-Result>
```

As shown in Table 12, the next fingerprint type of the second case is an audio and video fingerprint type.

Thirdly, content may not be identified when background music is played in a soap opera or a movie. In this third cased, if the fingerprint type is changed according to a time line of the content, the content may be more clearly identified. Here, if the video display device 100 transmits an ACR query request according to a predetermined period, the fingerprint server 22 may send an ACR query response including a predetermined fingerprint type at a predetermined time according to a type of the content. Here, the video display device 100 may extract a fingerprint of the fingerprint type included in the received ACR query response and may include the extracted fingerprint in a next ACR query request.

Table 13 illustrates the ACR query response provided from the fingerprint server 22 to the video display device 100 in the third case.

TABLE 13

```
<ACR-Result ResultCode= "200" >
    <ContentID>Program3</ContentID>
    <NTPTimestamp>300000</NTPTimestamp>
    <NextFPType>audio</NextFPType>
    <Confidence>100</Confidence>
</ACR-Result>
<ACR-Result ResultCode= "200" >
```

TABLE 13-continued

```
    <ContentID>Program3</ContentID>
    <NTPTimestamp>900000</NTPTimestamp>
    <NextFPType>video</NextFPType>
    <Confidence>100</Confidence>
</ACR-Result>
```

As shown in Table 13, the next fingerprint type of the third case may be changed according to a current playback time (NTPTimestamp) of the content. For example, when the current playback time of the content is 300000 seconds, i.e., 5 minutes, the next fingerprint type may be an audio fingerprint type, and, when the current playback time of the content is 900000 seconds, i.e., 15 minutes, the next fingerprint type may be a video fingerprint type.

In the case where a video fingerprint is used to identify content including caption or subtitle information, the content identification may fail according to a video fingerprint algorithm if the subtitle information is overlaid on a video image.

If the content identification is successful even in this case, this means noise included content identification. Therefore, a false positive may occur. The false positive represents the case where different pieces of content are recognized as identical pieces of content. For example, when similar scenes appear between different programs, the programs may be identified as identical programs.

A fingerprint technique using a sampling window for preventing the error due to a video fingerprint will be described with reference to FIGS. 37 to 40.

FIG. 37 is a ladder diagram illustrating a data flow for content recognition in a fingerprint based network topology according to another embodiment.

The content providing server 10 such as a broadcaster/CP extracts a fingerprint of content and designates a sampling window in operation S2601.

The sampling window represents a region for extracting a video fingerprint from the entire screen of the content. Here, the sampling window may be a video region designated away from a space where the subtitle information is outputted in a program. The broadcaster/CP not only generates content but also determines a location where the subtitle information is outputted on a video image. Therefore, the broadcaster/CP may notice a region to be sampled for a video fingerprint.

The broadcaster/CP may extract a fingerprint of a program using a tool provided by an ACR operator, may designate the sampling window according to a subtitle information output location of the program, and then may store the sampling window with the extracted fingerprint.

In the case where the subtitle information is outputted to the same location over the entire section of the program, the sampling window may be always designated the same for the program. On the contrary, in the case where the subtitle information is outputted to different regions according to a time section of the program, the sampling window may be differently designated according to a section of the program.

Thereafter, the content providing server 10 transmits the extracted fingerprint and the designated sampling window to the fingerprint server 22 in operation S2603. Here, the content providing server 10 maps a content ID for the program to the fingerprint in order to transmit the fingerprint.

The content providing server 10 may transmit the fingerprint and the sampling window before the program is broadcasted or at the same time as the extraction of the fingerprint. For example, the broadcaster/CP may transmit the fingerprint for a pre-produced program and the designated sampling window to the fingerprint server 22 before the program is broadcasted. Alternatively, in the case where a live program is broadcasted, the broadcaster/CP may extract the fingerprint for the live program in real time, and then may transmit the extracted fingerprint and the sampling window to the fingerprint server 22.

The fingerprint server 22 stores the received fingerprint and the designated sampling window in operation S2605. The fingerprint server 22 may store the content ID, the time stamp, the fingerprint and the sampling window of the program transmitted from the broadcaster in an ACR DB.

Thereafter, the video display device 100 extracts a fingerprint from an audio sample of a partial frame or a partial interval of the main audio and video content, and transmits an ACR query request message including the extracted fingerprint to the fingerprint server 22 corresponding to an ACR server in operation S2607.

The fingerprint server 22 queries the fingerprint included in the ACR query request message from the ACR DB to identify a program corresponding to the fingerprint, and provides an ACR query response message including a first sampling window for the identified program to the video display device 100 in operation S2609.

Here, the ACR query response message may include various types of content information in addition to the sampling window. Hereinafter, examples of the content information on the program included in the ACR query response message will be described with reference to FIG. 38 and Table 14.

The SamplingWindow element represents a valid time, location, and size of a sampling window required for an ACR query.

The SamplingWindow element may include an x element, a y element, a width element and a height element, wherein a unit of each element is a pixel. The x element may be an x coordinate of an upper left side of the sampling window. The y element may be a y coordinate of the upper left side of the sampling window. The width element may be a width of the sampling window. The height element may be a height of the sampling window.

Furthermore, the SamplingWindow element of FIG. 38 may include a ValidFrom element and a ValidTo element. The ValidFrom element may be a valid sampling start time point of the sampling window. The ValidTo element may be a valid sampling end time point of the sampling window. The video display device 100 may use the sampling window corresponding to a valid time of the sampling window, i.e., a time between the valid sampling start time of the sampling window and the valid sampling end time of the sampling window.

The Confidence element represents the accuracy of content recognition. The Confidence element may have a value of one of 0 to 100 according to a degree of mapping. For example, when it is confirmed that a fingerprint is correctly mapped to a program, the Confidence element may have a value of 100.

Table 14 illustrates an XML schema of ACR-ResultType containing the query result.

TABLE 14

```
<?xml version="1.0" encoding="UTF-8"?>
<xs:schema xmlns:xs="http://www.w3.org/2001/XMLSchema" elementFormDefault="qualified" attributeFormDefault="unqualified">
    <xs:complexType name="ACR-ResultType1">
        <xs:sequence>
            <xs:element name="ContentID"type="xs:anyURI"/>
            <xs:element name="NTPTimestamp"type="xs:unsignedLong"/>
            <xs:element name="SamplingWindow"type="SamplingWindowType" minOccurs="0" maxOccurs="unbounded"/>
            <xs:element name="Confidence"type="xs:unsignedInt" minOccurs="0"/>
            <xs:any namespace="##other" processContents="skip" minOccurs="0" maxOccurs="unbounded"/>
        </xs:sequence>
        <xs:attribute name="ResultCode"type="xs:string" use="required"/>
        <xs:anyAttribute processContents=skip"/>
    </xs:complexType>
</xs:complexType name="SamplingWindowType">
        <xs:sequence>
            <xs:element name="x" type="xs:unsignedLong"/>
            <xs:element name="y" type="xs:unsignedLong"/>
            <xs:element name="width" type="xs:unsignedLong"/>
            <xs:element name="height" type="xs:unsignedLong"/>
        </xs:sequence>
        <xs:attribute name="ValidFrom" type="xs:unsignedLong" use="required"/>
        <xs:attribute name="ValidTo" type=" type="xs:unsignedLong" use="required"/>
    </xs:complexType>
</xs:schema>
```

FIG. 38 is an XML schema diagram of ACR-Resulttype containing a query result according to another embodiment.

As shown in FIG. 38, ACR-Resulttype containing a query result includes ResultCode attributes and Content ID, NTP-Timestamp, SamplingWindow and Confidence elements.

For example, if the ResultCode attribute has a value of 200, this may mean that the query result is successful. If the ResultCode attribute has a value of 404, this may mean that the query result is unsuccessful.

The NTPTimestamp element may include at least one of a start time and an end time of a content section from which a fingerprint is extracted.

Hereinafter, FIG. 37 is described again.

Thereafter, the video display device 100 extracts a fingerprint from an audio sample of a partial frame or a partial interval of the main audio and video content, and transmits an ACR query request message including the extracted fingerprint to the fingerprint server 22 corresponding to an ACR server in operation S2611.

Here, the fingerprint extracted by the video display device 100 may be a fingerprint by the sampling window included in the ACR query response message received in operation S2609.

The fingerprint server 22 queries the fingerprint included in the ACR query request message received in operation S2611 from the ACR DB to identify a program corresponding to the fingerprint, and provides an ACR query response message including a second sampling window for the identified program to the video display device 100 in operation S2613.

Here, the SamplingWindow elements of the first sampling window and the second sampling window may be the same or different from each other according to whether programs are the same, whether a program has the subtitle information, and whether a location of the subtitle information is changed.

In the case where a video fingerprint is used to identify content, the content identification may fail according to a video fingerprint algorithm, if an on screen display (OSD) is overlaid on a program video transmitted to the video display device 100. The on screen display may include a menu, an electronic program guide (EPG), a channel bar and a widget. The on screen display may represent information provided from an operator excepting the content providing server 10 and the fingerprint server 22. Hereinafter, the operator may represent an operator excepting the content providing server 10 and the fingerprint server 22, such as the MVPD operator 30 or the broadcast receiving device 60. Due to the on screen display, the above-mentioned false positive may occur.

Hereinafter, a method, in which the MVPD 30 connected to the video display device 100 is estimated and a sampling window is designated according to GUI characteristic information on the estimated MVPD 30 in order to prevent the occurrence of the false positive, will be described with reference to FIGS. 39 and 40.

FIG. 39 is a ladder diagram illustrating a data flow for content recognition in a fingerprint based network topology according to another embodiment.

The content providing server 10 such as a broadcaster/CP extracts a fingerprint of content in operation S2701.

The broadcaster/CP may extract a fingerprint of a program using a tool provided by an ACR operator, and may store the extracted fingerprint with a content ID and a time stamp of the program.

Thereafter, the content providing server 10 transmits the extracted fingerprint to the fingerprint server 22 in operation S2703. Here, the content providing server 10 maps a content ID for the program to the fingerprint in order to transmit the fingerprint.

The content providing server 10 may transmit the fingerprint before the program is broadcasted or at the same time as the extraction of the fingerprint. For example, the broadcaster/CP may transmit the fingerprint for a pre-produced program to the fingerprint server 22 before the program is broadcasted. Alternatively, in the case where a live program is broadcasted, the broadcaster/CP may extract the fingerprint for the live program in real time, and then may transmit the extracted fingerprint to the fingerprint server 22.

The fingerprint server 22 stores the received fingerprint in operation S2705. The fingerprint server 22 may store the content ID, the time stamp and the fingerprint of the program transmitted from the broadcaster in an ACR DB.

Furthermore, the fingerprint server 22 obtains GUI characteristic information for each operator from the content providing server 10 in operation S2707. The GUI characteristic information represents information on a location, a size and a shape with respect to an on screen display. The GUI characteristic information may be provided from a broadcaster, may be transferred from a third party operator, or may be directly detected by an ACR operator.

Thereafter, the video display device 100 extracts a fingerprint from an audio sample of a partial frame or a partial interval of the main audio and video content, and transmits an ACR query request message including the extracted fingerprint to the fingerprint server 22 corresponding to an ACR server in operation S2709.

The fingerprint server 22 queries the fingerprint included in the ACR query request message from an ACR DB to identify a program corresponding to the fingerprint in operation S2711.

When there is no program matched to the fingerprint, the fingerprint server 22 analyzes a list of failed fingerprints among fingerprints transmitted by the video display device 100, so as to estimate an operator that has provided the on screen display in operation S2713. The fingerprint server 22 compares pieces of the GUI characteristic information for each operator by analyzing the list of failed fingerprints, and, as a result of the comparison, estimates the operator that has provided the on screen display.

The fingerprint server 22 retrieves the GUI characteristic information of the estimated operator, and generates a sampling window according to the retrieved GUI characteristic information in operation S2715.

Thereafter, the fingerprint server 22 transmits an ACR query request message including recognition failure and the generated sampling window to the video display device 100 in operation S2717.

Here, the ACR query response message may include various types of content information in addition to the recognition failure and the sampling window. Hereinafter, examples of the content information on the program included in the ACR query response message will be described with reference to FIG. 40 and Table 15.

FIG. 40 is an XML schema diagram of ACR-Resulttype containing a query result according to another embodiment.

As shown in FIG. 40, ACR-Resulttype containing a query result includes ResultCode attributes and Content ID, NTPTimestamp, SamplingWindow and Confidence elements.

For example, if the ResultCode attribute has a value of 200, this may mean that the query result is successful. If the ResultCode attribute has a value of 404, this may mean that the query result is unsuccessful. The ResultCode attribute included in the ACR query response message transmitted in operation S2717 of FIG. 39 may have a value of 404.

The NTPTimestamp element may include at least one of a start time and an end time of a content section from which a fingerprint is extracted.

The SamplingWindow element represents a location and a size of a sampling window required for an ACR query.

The SamplingWindow element may include an x element, a y element, a width element and a height element, wherein a unit of each element is a pixel. The x element may be an x coordinate of an upper left side of the sampling window. The y element may be a y coordinate of the upper left side of the sampling window. The width element may be a width of the sampling window. The height element may be a height of the sampling window.

Furthermore, the SamplingWindow element of FIG. 40 may include a guiType element. The guiType element may display a GUI type of an on screen display, such as a menu and an electronic program guide, as character strings. Here, the corresponding content may have a plurality of different sampling windows according to the guiType element.

The Confidence element represents the accuracy of content recognition. The Confidence element may have a value of one of 0 to 100 according to a degree of mapping. For example, when it is confirmed that a fingerprint is correctly mapped to a program, the Confidence element may have a value of 100.

Table 15 illustrates an XML schema of ACR-ResultType containing the query result.

characteristic information type based on the genre of content.

A video display device for determining characteristic information for efficiently recognizing content will be described with reference to FIGS. 41 to 46.

TABLE 15

```
<?xml version="1.0" encoding="UTF-8"?>
<xs:schema xmlns:xs="http://www.w3.org/2001/XMLSchema" elementFormDefault="qualified" attributeFormDefault="unqualified">
    <xs:complexType name="ACR-ResultType2">
        <xs:sequence>
            <xs:element name="ContentID"type="xs:anyURI"/>
            <xs:element name="NTPTimestamp"type="xs:unsignedLong"/>
            <xs:element name="SamplingWindow"type="SamplingWindowType2" minOccurs="0" maxOccurs="unbounded"/>
            <xs:element name="Confidence"type="xs:unsignedInt" minOccurs="0"/>
            <xs:any namespace="##other" processContents="skip" minOccurs="0" maxOccurs="unbounded"/>
        </xs:sequence>
        <xs:attribute name="ResultCode"type="xs:string" use="required"/>
        <xs:anyAttribute processContents=skip"/>
    </xs:complexType>
</xs:complexType name="SamplingWindowType2">
        <xs:sequence>
            <xs:element name="x" type="xs:unsignedLong"/>
            <xs:element name="y" type="xs:unsignedLong"/>
            <xs:element name="width" type="xs:unsignedLong"/>
            <xs:element name="height" type="xs:unsignedLong"/>
        </xs:sequence>
        <xs:attribute name="guiType" type="xs:string" use="optional">
    </xs:complexType>
</xs:schema>
```

Hereinafter, FIG. 39 is described again.

Thereafter, the video display device 100 extracts a fingerprint from an audio sample of a partial frame or a partial interval of the main audio and video content, and transmits an ACR query request message including the extracted fingerprint to the fingerprint server 22 corresponding to an ACR server in operation S2719.

Here, the fingerprint extracted by the video display device 100 may be a fingerprint by the sampling window included in the ACR query response message received in operation S2717.

The fingerprint server 22 queries the fingerprint included in the ACR query request message received in operation S2719 from the ACR DB to identify a program corresponding to the fingerprint, and provides an ACR query response message including recognition success to the video display device 100 in operation S2721.

Pieces of content may have different characteristics. Accordingly, pieces of content may have different characteristic information types for efficient recognition of content. For example, in the case of news content, broadcasters may broadcast different audios based on the same video material. In the case of sports content, the broadcasters may broadcast different sports commentaries based on the same video material Therefore, in the case of the news content and the sports content, it is efficient for a video display device to recognize content based on audio characteristic information. However, in the case of movie content, a plurality of audio tracks may be included. Therefore, even in the same movie, the audio characteristic information may be changed according to selection of an audio track. Therefore, in the case of the movie content, it is efficient for the video display device to recognize content based on video characteristic information. Therefore, it may be necessary to develop a video display device capable of determining characteristic information for efficiently recognizing content. In particular, such an issue may arise when genres of content are different from each other. Therefore, it may be necessary to determine the FIG. 41 is a diagram illustrating a network topology in which the video display device determines a characteristic information type according to an embodiment.

The network topology includes the video display device 100, the content recognizing service providing server 20, and the third party server 90.

The video display device 100 extracts characteristic information from broadcast content including at least one of an uncompressed video and an uncompressed audio obtained from an external input. Here, the video display device 100 may extract the characteristic information from the broadcast content including at least one of the uncompressed video and the uncompressed audio based on a first characteristic information type. The video display device 100 transmits a first ACR query request message to the content recognizing service providing server 20 based on the characteristic information. The video display device 100 receives a first ACR query response message for the first ACR query request message from the content recognizing service providing server 20. Here, the first ACR query response message includes content information. The content information may include at least one of a URL of a leanback application for the content, a content identifier, a content timestamp, and a content recognition accuracy. Here, the content information may have the same format as described above with reference to FIG. 33 or 38. The video display device 100 may determine a second characteristic information type based on the first ACR query response message. In detail, the video display device 100 may extract the content identifier from the first response message. The video display device 100 may obtain a genre of content based on the content identifier. In detail, the video display device 100 transmits a query request message based on the content identifier to the third party server 90. The video display device 100 receives a query response message based on a recommended characteristic information type from the third party server 90. The video display device 100 determines the second characteristic information type based on the recommended characteristic information type. The video display device 100 may extract the characteristic information from the broadcast content including at least one of the uncompressed video and the uncompressed audio based on the second characteristic information type. The video display device 100 transmits a second ACR query request message to the content recognizing service providing server 20 based on the second characteristic information type. In detail, the video display device 100 transmits the second ACR query request message including characteristic information corresponding to the second characteristic information type to the content recognizing service providing server 20. The video display device 100 receives a second ACR query response message from the content recognizing service providing server 20.

The content recognizing service providing server 20 stores the characteristic information of content. The content recognizing service providing server 20 receives the ACR query request message from the video display device 100. The content recognizing service providing server 20 transmits the ACR query response message based on the content characteristic information. In detail, the content recognizing service providing server 20 transmits the ACR query response message including the content information to the video display device 100.

The third party server 90 receives the query request message based on the content identifier to the video display device 100. In detail, the third party server may receives the query request message including the content identifier. The third party server 90 transmits the query response message to the video display device 100 based on the recommended characteristic information type. The third party server 90 may transmit the query response message including the recommended characteristic information type to the video display device 100.

Operations of the video display device 100, the content recognizing service providing server 20, and the third party server 90 will be described in more detail with reference to FIG. 43.

FIG. 42 is a ladder diagram illustrating that the video display device determines a characteristic information type according to an embodiment.

The video display device 100 is turned on to start to operate in operation S2801. The video display device 100 may obtain uncompressed audio and video content through an external input terminal. Here, the uncompressed audio and video content may include at least one of an uncompressed audio and an uncompressed video. The video display device 100 may display the uncompressed audio and video content through the display unit 121.

The video display device 100 transmits the first ACR query request message to the content recognizing service providing server 20 based on the first characteristic information type in operation S2803. In detail, the video display device 100 may extract characteristic information corresponding to the first characteristic information type from the uncompressed audio and video content input through an external input, and may transmit the ACR query request message including the characteristic information to the content recognizing service providing server 20. Here, the first characteristic information type may be a default characteristic information type.

The content recognizing service providing server 20 transmits the first ACR query response message to the video display device 100 in operation S2805. In detail, the content recognizing service providing server 20 may transmit the first ACR query response message including the content information to the video display device 100. Here, the content information may include at least one of a URL of a leanback application for the content, a content identifier, a content timestamp, and a content recognition accuracy. Here, the content information may have the same format as described above with reference to FIG. 33 or 38.

The video display device 100 transmits the query request message to the third party server 90 based on the content identifier in operation S2807. In detail, the video display device 100 may transmit the query request message including the content identifier to the third party server 90.

The video display device 100 obtains at least one of the genre of content and the second characteristic information type based on the content identifier.

The third party server 90 transmits the query response message to the video display device 100 based on the recommended characteristic information type of content in operation S2809. In detail, the third party server 90 may transmit the query response message including the recommended characteristic information type to the video display device 100. In a specific embodiment, the third party server 90 may include metadata of content. The third party server 90 may extracts the genre of content from the metadata of content corresponding to the content identifier.

Here, the content identifier may be TMS ID. A TMS is a service provider for providing metadata for content. A number of broadcasters and broadcast receiver companies provide enhanced services by using broadcast data provided by the TMS. In particular, the broadcasters and broadcast receiver companies provide an EPG service by using the TMS ID. The TMS ID is an identifier used by the TMS to identify content. If the TMS IDs of a plurality of pieces of content are the same, a broadcast receiver or a video display device may determine that the plurality of pieces of content are the same. In detail, the third party server 90 may obtain the genre of content from TMS data provided by the TMS based on the TMS ID. In another specific embodiment, the content identifier may be a content reference identifier (CRID). The CRID which is a content identifier defined by TV-Anytime is used by broadcasters and broadcast receiver companies of some countries to provide an EPG service and a scheduled recording service. In detail, the third party server 90 may obtain the genre of content from EPG data based on the CRID. Here, the EPG data may be EIT. In detail, the EPG data may be a genre descriptor defined by an ATSC standard. Alternatively, the EPG data may be a content descriptor defined by a DVB standard.

According to a specific embodiment, the third party server 90 may determine the recommended characteristic information type that serves as a basis for determining the second characteristic information based on the genre of content. In detail, the third party server 90 may determine the recommended characteristic information type with reference to the following table.

TABLE 16

| Genre | FP Type |
| --- | --- |
| News | Audio FP |
| Sports | |
| ... | |
| Music | Video FP |
| Documentary | |
| ... | |
| Drama | Audio FP + Video FP |
| ... | |

For example, in the case where the genre of content is news or sports, the third party server 90 may determine the recommended characteristic information type as audio characteristic information. For example, in the case where the genre of content is music or documentary, the third party server 90 may determine the recommended characteristic information type as video characteristic information. For example, in the case where the genre of content is a soap opera, the third party server 90 may determine that the recommended characteristic information type includes both the audio characteristic information and the video characteristic information. The third party server 90 may transmit the query response message based on the recommended characteristic information type. The video display device 100 may efficiently recognize each content through the recommended characteristic information type determined as described above. In another specific embodiment, the third party server 90 may transmit the query response message to the video display device 100 based on the genre of content, without determining the characteristic information type. This operation will be described in more detail with reference to FIGS. 44 and 45.

The video display device 100 determines the second characteristic information type based on at least one of recommended characteristic information, a constraint on extraction of characteristic information, and an accuracy of content recognition in operation S2811. The content recognizing service providing server 20 and a matching algorithm may be used in common, but hardware of the video display device 100 may be different depending on a manufacturer. Therefore, the video display device 100 may have a hardware constraint for the audio characteristic information and the video characteristic information during a manufacturing process. Furthermore, when a function that is not a characteristic information extracting function uses an audio driver or a video driver while the video display device 100 operates, the video display device 100 may be temporarily unable to extract the audio characteristic information or the video characteristic information. Therefore, in order to overcome this limitation, the video display device 100 may determine the second characteristic information type based on the constraint on extraction of the characteristic information of the video display device 100. In a specific embodiment, in the case where the characteristic information corresponding to the recommended characteristic information type is unable to be extracted, the video display device 100 may determine the second characteristic information type as a characteristic information type that enables extraction of the characteristic information. For example, in the case where the video characteristic information is unable to be extracted since all video drivers of the video display device 100 are currently used, and the recommended characteristic information type is video characteristic information, the video display device 100 may determine the second characteristic information type as audio characteristic information.

Although the second characteristic information type is the audio characteristic information, the video display device 100 may fail to recognize content based on the audio characteristic information in the case where a mute interval is included in the content or an interval that is represented by general voice information alone such as background music is long. Furthermore, although the second characteristic information type is designated as the video characteristic information, the video display device 100 may fail to recognize content in the case where there are few differences between frames of the content such as a still image. In order to overcome this limitation, in another specific embodiment, the video display device 100 may determine the second characteristic information type based on the accuracy of content recognition. This will be described in more detail with reference to FIG. 43. FIG. 43 is a flowchart illustrating that the video display device determines the characteristic information type based on the accuracy of content recognition according to an embodiment.

The video display device 100 extracts the accuracy of content recognition based on the first ACR query response message in operation S2851. In a specific embodiment, the first ACR query response message may include the accuracy of content recognition. In detail, the accuracy of content recognition may be included in the form of the confidence element as described above.

The video display device 100 determines whether the accuracy of content recognition is smaller than a preset recognition reference value in operation S2853. Here, the preset recognition reference value may be changed based on a user input.

If the accuracy of content recognition is smaller than the preset recognition reference value, the video display device 100 determines the second characteristic information type as a type different from the first characteristic information type in operation S2855. For example, in the case where the first characteristic information type is video characteristic information, the accuracy of content recognition is about 60%, and the preset recognition reference value is about 70%, the video display device 100 may determine the second characteristic information type as an audio characteristic information type.

The operation of determining the characteristic information type based on at least one of the constraint on extraction of characteristic information and the accuracy of content recognition may be repeatedly performed during a process of transmitting the ACR query request message and receiving the ACR query response message after transmitting the second ACR query request message.

The video display device 100 transmits the second ACR query request message based on the second characteristic information type in operation S2813. In detail, the video display device 100 may extract characteristic information corresponding to the second characteristic information type from the uncompressed audio and video content input through an external input, and may transmit the ACR query request message including the characteristic information to the content recognizing service providing server 20.

The content recognizing service providing server 20 transmits the second ACR query response message in operation S2815. In detail, the content recognizing service providing server 20 may transmit the second ACR query response message including the content information to the video display device 100. Here, the content information may include at least one of the URL of the leanback application for the content, the content identifier, the content timestamp, and the content recognition accuracy.

Here, the content recognizing service providing server 20 may transmit the second characteristic information type and the content information together. In particular, in the case where the second characteristic information type is not supported by the content recognizing service providing server 20, the content recognizing service providing server 20 may transmit the recommended characteristic information type as characteristic information supported by the content recognizing service providing server 20. Thereafter, the content recognizing service providing server 20 may transmit the recommended characteristic information type and the content information together. For example, in the case where the content recognizing service providing server 20 does not support the audio characteristic information even though the second characteristic information type is the audio characteristic information, the content recognizing service providing server 20 may transmit the video characteristic information as the recommended characteristic information.

It will be described that the third party server 90 transmits the query response message to the video display device 100 based on the genre of content, without determining the characteristic information type, with reference to FIGS. 44 and 45.

FIG. 44 is a diagram illustrating a network topology in which the video display device determines a characteristic information type according to another embodiment. The embodiment of FIG. 44 is only different from the embodiment of FIG. 41 in that the video display device 100 does not obtain the recommended characteristic information from the third party server 90 but receives the query response message based on the genre of content from the third party server 90. The same configurations and operations are thus omitted below.

The video display device 100 receives the content genre from the third party server 90. The video display device 100 may determine the second characteristic information type based on at least one of the content genre, the content recognition accuracy, and the constraint on extraction of characteristic information. The video display device 100 may determine the second characteristic information type according to the content genre in the same manner as the third parity server 90 of FIGS. 41 and 42 determines the recommended characteristic information type. Furthermore, in the same manner as described above with reference to FIGS. 41 and 42, the video display device 100 may determine the second characteristic information type based on the content recognition accuracy. In addition, the video display device 100 may determine the second characteristic information type based on the constraint on extraction of characteristic information of the video display device.

The third party server 90 transmits the first ACR query response message based on the content genre. In detail, the third party server 90 may transmit the first ACR query response message including the content genre.

FIG. 45 is a ladder diagram illustrating that the video display device determines the characteristic information type according to another embodiment. The embodiment of FIG. 45 is only different from the embodiment of FIG. 42 in that the video display device 100 does not obtain the recommended characteristic information from the third party server 90 but receives the query response message based on the genre of content from the third party server 90. The same configurations and operations are thus omitted below.

The third party server 90 transmits the query response message based on the content genre. In detail, the third party server 90 may transmit the query response message including the content genre.

The video display device 100 determines the second characteristic information type based on at least one of the content genre, the content recognition accuracy, and the constraint on extraction of characteristic information in operation S2911. The video display device 100 may determine the second characteristic information type according to the content genre in the same manner as the third parity server 90 of FIGS. 41 and 42 determines the recommended characteristic information type. Furthermore, in the same manner as described above with reference to FIGS. 41 and 42, the video display device 100 may determine the second characteristic information type based on the content recognition accuracy. In addition, the video display device 100 may determine the second characteristic information type based on the constraint on extraction of characteristic information of the video display device.

FIG. 46 is a conceptual diagram illustrating a video display device according to an embodiment.

As illustrated in FIG. 46, the video display device 100 according to an embodiment includes an audio/video driver 601, an ACR engine 603, ACR middleware 605, an ACR user interface 607, and an ACR plugin 609.

The audio/video driver 601 captures an audio/video signal input as an external input of a TV and transfers the audio/video signal to the ACR engine 603. The audio/video driver 601 may provide API so that the ACR engine 603 accesses an audio/video buffer. The audio/video driver 601 may also provide characteristic information of audio/video received as an external input such as HDMI. For example, in the case of audio, the audio/video driver 601 may provide information such as a sample depth, a sampling rate, the number of channels (mono/stereo etc.), the number of samples, and a sample time. In the case of video, the audio/video driver 601 may provide information such as a video format and a width, height, stride, stream time, input type (HDMI1, HDMI2, composite, component, etc.), and the number of frames per second of input video.

The ACR engine 603 may be executed as a separate process, and recognizes a program using the above-mentioned various methods. The ACR engine 603 may extract a signature from an audio/video sample, and may transfer the extracted signature to an ACR server so as to recognize content. As described above, the ACR engine 603 may call API capable of accessing the audio/video buffer according to platform implementation, and may transmit an audio/video stream captured by the audio/video driver 601 to an ACR process by using a socket. The ACR engine 603 sends an ACR query request to the ACR server with the signature, and receives, from the ACR sever, an ACR query response including information that indicates whether content recognition is successful, a content ID, a global content ID, a timestamp, a leanback application URL, a broadcaster server URL, a promotional application URL, and a content reminder application URL. The ACR engine 603 may transfer a result received from the ACR server to the ACR middleware 605.

The ACR middleware 605, which is a module corresponding to middleware of a DTV process, processes ACR control and processes the ACR query response from the ACR engine 603. The ACR middleware 605 controls the ACR by executing or terminating the ACR process or by starting or stopping the ACR engine 603. Furthermore, by parsing the ACR query response, the ACR middleware 605 stores values of the content ID, global content ID, and timestamp. The ACR middleware 605 may provide API so as to send the stored values to the ACR UI, or may send the stored values to the ACR user interface 607 by means of a message queue and global parameters. Furthermore, in order to transfer data such as the content ID, the global content ID, and the timestamp to an ACR application such as a Live+ application or a leanback application, the ACR middleware 605 may transfer the data to a web browser through inter-process communication (IPC) of a shared memory and a socket.

The ACR user interface (UI) 607 may represent UI for controlling ACR such as ACR on/off to a user, or may represent, to the user, information such as a name and time of a recognized program in a status bar UI of a TV.

When the ACR middleware 605 transfers, to a browser, the data such as the content ID, the global content ID, and the timestamp to be transferred to an ACR application, these values are received by the ACR plugin 609. The ACR plugin 609 may transfer the values to the ACR application through a plugin object interface.

According to an embodiment, the third party server 90 may include metadata of content as described above. The third party server 90 may include ACR configuration information. The third party server 90 may transmit at least one of the content genre and the recommended characteristic information type to the video display device 100. This operation has been described above in detail, and is thus omitted here.

Next, a structure of a video display device according to various embodiments will be described with reference to FIGS. 47 and 48.

FIG. 47 is a block diagram illustrating a structure of a fingerprint based video display device according to another embodiment.

As shown in FIG. 47 a tuner 501 extracts a symbol from an 8-VSB RF signal transmitted through an air channel.

An 8-VSB demodulator 503 demodulates the 8-VSB symbol that the tuner 501 extracts and restores meaningful digital data.

A VSB decoder 505 decodes the digital data that the 8-VSB demodulator 503 to restore an ATSC main service and ATSC M/H service.

An MPEG-2 TP Demux 507 filters a Transport Packet that the video display device 100 is to process from an MPEG-2 Transport Packet transmitted through an 8-VSB signal or an MPEG-2 Transport Packet stored in a PVR Storage to relay the filtered Transport Packet into a processing module.

A PES decoder 539 buffers and restores a Packetized Elementary Stream transmitted through an MPEG-2 Transport Stream.

A PSI/PSIP decoder 541 buffers and analyzes PSI/PSIP Section Data transmitted through an MPEG-2 Transport Stream. The analyzed PSI/PSIP data are collected by a Service Manager (not shown), and then, is stored in DB in a form of Service Map and Guide data.

A DSMCC Section Buffer/Handler 511 buffers and processes DSMCC Section Data for file transmission through MPEG-2 TP and IP Datagram encapsulation.

An IP/UDP Datagram Buffer/Header Parser 513 buffers and restores IP Datagram, which is encapsulated through DSMCC Addressable section and transmitted through MPEG-2 TP to analyze the Header of each Datagram. Additionally, an IP/UDP Datagram Buffer/Header Parser 513 buffers and restores UDP Datagram transmitted through IP Datagram, and then analyzes and processes the restored UDP Header.

A Stream component handler 557 may include ES Buffer/Handler, PCR Handler, STC module, Descrambler, CA Stream Buffer/Handler, and Service Signaling Section Buffer/Handler.

The ES Buffer/Handler buffers and restores an Elementary Stream such as Video and Audio data transmitted in a PES form to deliver it to a proper A/V Decoder.

The PCR Handler processes Program Clock Reference (PCR) Data used for Time synchronization of Audio and Video Stream.

The STC module corrects Clock values of the A/V decoders by using a Reference Clock value received through PCR Handler to perform Time Synchronization.

When scrambling is applied to the received IP Datagram, the Descrambler restores data of Payload by using Encryption key delivered from the CA Stream Handler.

The CA Stream Buffer/Handler buffers and processes Data such as Key values for Descrambling of EMM and ECM, which are transmitted for a Conditional Access function through MPEG-2 TS or IP Stream. An output of the CA Stream Buffer/Handler is delivered to the Descrambler, and then, the descrambler descrambles MPEG-2 TP or IP Datagram, which carriers A/V Data and File Data.

The Service Signaling Section Buffer/Handler buffers, restores, and analyzes NRT Service Signaling Channel Section Data transmitted in a form of IP Datagram. The Service Manager (not shown) collects the analyzed NRT Service Signaling Channel Section data and stores them in DB in a form of Service Map and Guide data.

The A/V Decoder 561 decodes the Audio/Video data received through an ES Handler to present them to a user.

An MPEG-2 Service Demux (not shown) may include an MPEG-2 TP Buffer/Parser, a Descrambler, and a PVR Storage module.

An MPEG-2 TP Buffer/Parser (not shown) buffers and restores an MPEG-2 Transport Packet transmitted through an 8-VSB signal, and also detects and processes a Transport Packet Header.

The Descrambler restores the data of Payload by using an Encryption key, which is delivered from the CA Stream Handler, on the Scramble applied Packet payload in the MPEG-2 TP.

The PVR Storage module stores an MPEG-2 TP received through an 8-VSB signal at the user's request and outputs an MPEG-2 TP at the user's request. The PVR storage module may be controlled by the PVR manager (not shown).

The File Handler 551 may include an ALC/LCT Buffer/Parser, an FDT Handler, an XML Parser, a File Reconstruction Buffer, a Decompressor, a File Decoder, and a File Storage.

The ALC/LCT Buffer/Parser buffers and restores ALC/LCT data transmitted through a UDP/IP Stream, and analyzes a Header and Header extension of ALC/LCT. The ALC/LCT Buffer/Parser may be controlled by an NRT Service Manager (not shown).

The FDT Handler analyzes and processes a File Description Table of FLUTE protocol transmitted through an ALC/LCT session. The FDT Handler may be controlled by an NRT Service Manager (not shown).

The XML Parser analyzes an XML Document transmitted through an ALC/LCT session, and then, delivers the analyzed data to a proper module such as an FDT Handler and an SG Handler.

The File Reconstruction Buffer restores a file transmitted through an ALC/LCT. FLUTE session.

If a file transmitted through an ALC/LCT and FLUTE session is compressed, the Decompressor performs a process to decompress the file.

The File Decoder decodes a file restored in the File Reconstruction Buffer, a file decompressed in the decompressor, or a film extracted from the File Storage.

The File Storage stores or extracts a restored file if necessary.

The M/W Engine (not shown) processes data such as a file, which is not an A/V Stream transmitted through DSMCC Section and IP Datagram. The M/W Engine delivers the processed data to a Presentation Manager module.

The SG Handler (not shown) collects and analyzes Service Guide data transmitted in an XML Document form, and then, delivers them to the EPG Manager.

The Service Manager (not shown) collects and analyzes PSI/PSIP Data transmitted through an MPEG-2 Transport Stream and Service Signaling Section Data transmitted through an IP Stream, so as to produce a Service Map. The Service Manager (not shown) stores the produced service map in a Service Map & Guide Database, and controls an access to a Service that a user wants. The Service Manager is controlled by the Operation Controller (not shown), and controls the Tuner 501, the MPEG-2 TP Demux 507, and the IP Datagram Buffer/Handler 513.

The NRT Service Manager (not shown) performs an overall management on the NRT service transmitted in an object/file form through a FLUTE session. The NRT Service Manager (not shown) may control the FDT Handler and File Storage.

The Application Manager (not shown) performs overall management on Application data transmitted in a form of object and file.

The UI Manager (not shown) delivers a user input to an Operation Controller through a User Interface, and starts a process for a service that a user requests.

The Operation Controller (not shown) processes a command of a user, which is received through a UI Manager, and allows a Manager of a necessary module to perform a corresponding action.

The Fingerprint Extractor 565 extracts fingerprint characteristic information from an AV stream.

The Fingerprint Comparator 567 compares the characteristic information extracted by the Fingerprint Extractor with a Reference fingerprint to find an identical content. The Fingerprint Comparator 567 may use a Reference fingerprint DB stored in local and may query a Fingerprint query server on the internet to receive a result. The matched result data obtained by a comparison result may be delivered to Application and used.

As an ACR function managing module or an application module providing an enhanced service on the basis of ACR, the Application 569 identifies a broadcast content in watching to provide an enhanced service related to it.

FIG. 48 is a block diagram illustrating a structure of a watermark based video display device according to another embodiment.

Although the watermark based video display device of FIG. 48 is similar to the fingerprint based video display device of FIG. 48, the fingerprint based video display device does not includes the Fingerprint Extractor 565 and the Fingerprint Comparator 567, but further includes the Watermark Extractor 566.

The Watermark Extractor 566 extracts data inserted in a watermark form from an Audio/Video stream. The extracted data may be delivered to an Application and may be used.

According to an embodiment, enhanced services not dependent on an MVPD are available. Especially, even when a broadcaster or a contents provider does not provide enhanced services, a third party server not dependent on the broadcaster or the contents provider may provide the enhanced services.

Moreover, according to embodiments, information search, chatting, news search, digital media download, product catalog download, and product purchase, which are related to main audio and video contents, are available without inconvenient text input using a remote controller.

Additionally, according to embodiments, enhanced services exceeding the bandwidth limitation of a wireless channel become available.

Moreover, the above methods of the present invention can also be embodied as computer readable codes on a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The configurations and methods of the above-described embodiments are applied to the video display device without any restriction, and all or some of the embodiments may be selectively combined to have various modifications.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An operating method of a video display device including a display, the operating method comprising:
obtaining an uncompressed content including audio data or video data;
extracting first fingerprint information from the uncompressed content according to a default type, wherein the first fingerprint information is a video frame or an audio sample;
receiving a first response including first content information for recognizing the uncompressed content, based on the first fingerprint information, from a first server, wherein the first content information includes a first content identifier, and
wherein the first content identifier is used for determining a genre of the uncompressed content;
transmitting a first query based on the first content identifier to a second server,
wherein the second server determines recommendation type information on the uncompressed content based on the genre of the uncompressed content;
obtaining the recommendation type information based on the first query, wherein the recommendation type information indicates an audio type or a video type;
determining a first type of second fingerprint information to be extracted from the uncompressed content according to the recommendation type information;
extracting the second fingerprint information from the uncompressed content according to the first type; and
receiving a second response to a second query which includes the second fingerprint information, wherein the second response includes second content information,
wherein the second content information includes identifier information on the uncompressed content, identification information on a content provider, time information of a content section used in the second content information acquisition, name of a channel which the uncompressed content is broadcasted, a logo of a channel which the uncompressed content is broadcasted, a description of a channel which the uncompressed content is broadcasted, a usage information reporting period, a minimum usage time for usage information acquisition, and an available enhanced service information for the uncompressed content, wherein the determining the first type of the second fingerprint information comprises determining a second type of the second fingerprint information, when the video display device cannot extract the second fingerprint information according to the recommendation type information because of hardware restriction of the video display device, wherein the second type is different from the first type, wherein the extracting the first fingerprint information according to the default type comprises:
  extracting the first fingerprint information from the audio data, when the default type indicates the audio type, or extracting the first fingerprint information from the video data, when the default type indicates the video type, wherein the extracting the second fingerprint information according to the first type comprises:
  extracting an audio fingerprint information from the audio data, when the first type of the second fingerprint information indicates the audio type, or extracting a video fingerprint information from the video data, when the first type of the second fingerprint information indicates the video type, and wherein a time point at which the first fingerprint information is extracted is different from a time point at which the second fingerprint information is extracted.

2. The operating method of claim 1, wherein the first content information includes an accuracy of recognition, and
  wherein the first type of the second fingerprint information is determined based on the accuracy of the recognition.

3. The operating method of claim 2, wherein the determining the first type of the second fingerprint information based on the accuracy of the recognition comprises determining the first type of the second fingerprint information based on whether the accuracy of the recognition is larger than a predetermined reference value.

4. The operating method of claim 1, wherein the first content information includes information of a sampling window,
  wherein the information of the sampling window is a region for extracting the second fingerprint information,
  wherein the region does not include a subtitle location, and
  wherein the first type of the second fingerprint information is determined based on the information of the sampling window.

5. A video display device, comprising:
  a receiver to obtain an uncompressed content including audio data or video data;
  a display to display the uncompressed content; and
  a content recognition configuration manager to:
    extract first fingerprint information from the uncompressed content according to a default type, wherein the first fingerprint information is a video frame or an audio sample,
    receive a first response including first content information for recognizing the uncompressed content, based on the first fingerprint information, from a first server,
    wherein the first content information includes a first content identifier being used for the determining a genre of the uncompressed content,
    transmit a first query based on the first content identifier to a second server,
    wherein the second server determines recommendation type information on the uncompressed content based on the genre of the uncompressed content,
    obtain the recommendation type information based on the first query, wherein the recommendation type information indicates at least one of an audio type or a video type,
    determine a first type of second fingerprint information to be extracted from the uncompressed content according to the recommendation type information,
    extract the second fingerprint information from the uncompressed content according to the first type, and
    receive a second response to a second query which includes the second fingerprint information, wherein the second response includes second content information,
    wherein the second content information includes identifier information on the uncompressed content, identification information on a content provider, time information of a content section used in the second content information acquisition, a name of a channel which the uncompressed content is broadcasted, a logo of a channel which the uncompressed content is broadcasted, a description of a channel which the uncompressed content is broadcasted, a usage information reporting period, a minimum usage time for usage information acquisition, and an available enhanced service information for the uncompressed content,
    wherein the determining the first type of the second fingerprint information includes determining a second type of the second fingerprint information, when the video display device cannot extract the second fingerprint information according to the recommendation type information because of hardware restriction of the video display device,
    wherein the second type is different from the first type,
    wherein the extracting the second fingerprint information according to the first type includes extracting the first fingerprint information from the audio data, when the default type indicates the audio type, or extracting the first fingerprint information from the video data, when the default type indicates the video type,
    wherein the extracting the second fingerprint information according to the first type includes extracting an audio fingerprint information from the audio data, when the first type of the first fingerprint information indicates the audio type, or extracting a video fingerprint information from the video data, when the first type of the first fingerprint information indicates the video type, and
    wherein a time point at which the first fingerprint information is extracted is different from a time point at which the second fingerprint information is extracted.

6. The video display device of claim 5, wherein the first content information includes an accuracy of recognition, and
  wherein the content recognition configuration manager determines the first type of the second fingerprint information based on the accuracy of the recognition.

7. The video display device of claim 6, wherein the content recognition configuration manager determines the first type of the second fingerprint information based on whether the accuracy of the recognition is larger than a predetermined reference value.

8. The video display device of claim 5, wherein the first content information includes an information of a sampling window,
wherein the information of the sampling window is a region for extracting the second fingerprint information,
wherein the region does not include a subtitle location, and
wherein the content recognition configuration manager determines the first type of the second fingerprint information based on the information of the sampling window.

* * * * *